(12) United States Patent
Kushihama et al.

(10) Patent No.: US 8,281,650 B2
(45) Date of Patent: Oct. 9, 2012

(54) MISFIRE DETERMINATION DEVICE AND MISFIRE DETERMINATION METHOD FOR INTERNAL COMBUSTION ENGINE

(75) Inventors: Kiyotaka Kushihama, Nagoya (JP); Yohei Moriyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 624 days.

(21) Appl. No.: 12/500,018

(22) Filed: Jul. 9, 2009

(65) Prior Publication Data

US 2010/0031736 A1    Feb. 11, 2010

(30) Foreign Application Priority Data

Jul. 9, 2008  (JP) ................................. 2008-179225
Jul. 11, 2008  (JP) ................................. 2008-181920
Jul. 15, 2008  (JP) ................................. 2008-183822

(51) Int. Cl.
*G01M 15/04* (2006.01)
(52) U.S. Cl. ................................... 73/114.04
(58) Field of Classification Search ............... 73/114.02, 73/114.04, 114.05
See application file for complete search history.

(56) References Cited

U.S. PATENT DOCUMENTS

| | | | | | |
|---|---|---|---|---|---|
| 5,539,644 | A | * | 7/1996 | Ichikawa et al. | 701/111 |
| 6,009,370 | A | * | 12/1999 | Minowa et al. | 701/102 |
| 6,240,340 | B1 | * | 5/2001 | Minowa et al. | 701/1 |
| 7,536,902 | B2 | * | 5/2009 | Tsukamoto et al. | 73/114.04 |
| 7,874,203 | B2 | * | 1/2011 | Suzuki | 73/114.04 |

FOREIGN PATENT DOCUMENTS

| | | |
|---|---|---|
| JP | 4171249 A | 6/1992 |
| JP | 10331707 A | 12/1998 |
| JP | 2004293350 A | 10/2004 |
| JP | 2006152971 A | 6/2006 |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

When a rotation fluctuation amount of an engine exceeds a predetermined threshold, it is determined that there is a possibility that a misfire has occurred. Then, when a rotation fluctuation pattern of the engine coincides with a first rotation fluctuation pattern, it is determined that a misfire has occurred; whereas, when the rotation fluctuation pattern does not coincide with the first rotation fluctuation pattern, it is determined whether the rotation fluctuation pattern coincides with a specific rotation fluctuation pattern in consideration of a lock-up state of a lock-up clutch or whether an engine rotational speed is lower than a threshold. When the determination is affirmative, occurrence of a misfire is determined on the basis of whether the rotation fluctuation pattern of the engine coincides with a second misfire determination pattern that is defined to be smaller in variation of a rotation fluctuation amount than the first rotation fluctuation pattern.

25 Claims, 16 Drawing Sheets

MISFIRE DETERMINATION DEVICE AND MISFIRE DETERMINATION METHOD FOR INTERNAL COMBUSTION ENGINE

INCORPORATION BY REFERENCE

The disclosure of Japanese Patent Applications No. 2008-179225 filed on Jul. 9, 2008, No. 2008-181920 filed on Jul. 11, 2008 and No. 2008-183822 filed on Jul. 15, 2008 including the specifications, drawings and abstracts are incorporated herein by references in their entireties.

BACKGROUND OF THE INVENTION

1. Field of the Invention

The invention relates to a misfire determination device and misfire determination method for an internal combustion engine. Particularly, the invention relates to measures for improving reliability of determination in a misfire determination device and misfire determination method that determine whether a misfire has occurred on the basis of a rotation fluctuation of an internal combustion engine.

2. Description of the Related Art

So far, for example, as a so-called "misfire" occurs, an unburned air-fuel mixture is exhausted to an exhaust passage. The misfire is a phenomenon that an air-fuel mixture fails to be ignited in an internal combustion engine for an automobile. The misfire may deteriorate exhaust emission or adversely influences an exhaust gas purification catalyst.

Then, a misfire determination device has been proposed. The misfire determination device focuses on that a fluctuation in engine rotational speed (hereinafter, simply referred to as rotation fluctuation) increases when the misfire occurs. The misfire determination device determines, on the basis of the rotation fluctuation, whether a misfire has occurred. The basic principle of misfire determination in the device of this type is as follows.

First, when a misfire occurs in one cylinder, an engine rotational speed in the expansion stroke of that cylinder gradually decreases. As a result, a duration required for a crankshaft to rotate a certain crank angle in the expansion stroke of the misfire cylinder is longer than a duration required for the crankshaft to rotate the certain crank angle in the expansion stroke of another cylinder. Thus, by measuring and comparing these periods of time, it is possible to determine whether a misfire has occurred.

Specifically, when a cylinder (for example, a third cylinder) is in the expansion stroke, a difference between a duration required for the crankshaft to rotate the certain crank angle in the expansion stroke of the third cylinder and a duration required for the crankshaft to rotate the certain crank angle in the expansion stroke of a cylinder (for example, a second cylinder) that is in the expansion stroke a predetermined crank angle before (for example, 360° before) the above expansion stroke is calculated (the latter duration is subtracted from the former duration). Then, when the calculated value exceeds a predetermined threshold, it is determined that the rotation fluctuation of the internal combustion engine has increased and then it is determined that a misfire occurs (misfire occurs in the third cylinder).

An automobile intended for countries that employ an on-board diagnostic system (OBD) is equipped with a misfire counter in a control circuit. The misfire counter is incremented each time a misfire determination is made. When the count value of the misfire counter per predetermined number of revolutions of the engine (for example, 1000 revolutions) exceeds a predetermined value (for example, 30), an MIL (warning lamp) lights up to warn a driver.

Thus, under a situation that a misfire determination is not accurately made, for example, a misfire may not be recognized despite occurrence of a misfire, so deterioration of exhaust emission continues. In addition, occurrence of a misfire may be erroneously determined despite no occurrence of a misfire, and the MIL early lights up even when an actual number of misfire occurrences is smaller than the predetermined value. This makes a user feel uncomfortable.

Then, to eliminate an erroneous misfire determination, there is known a technique in which it is determined that a misfire occurs when the temporal variation pattern of a rotation fluctuation coincides with a predetermined misfire pattern (for example, see the following Japanese Patent Application Publication No. 2006-152971 (JP-A-2006-152971)).

The technique described in JP-A-2006-152971 detects a duration required for a crankshaft to rotate a certain crank angle in an expansion stroke of each cylinder, calculates a difference in the duration between cylinders of which expansion strokes are sequentially carried out with an intervening expansion stroke (between cylinders of which expansion strokes are sequentially carried out at an interval of 360° crank angle in the case of a four-cylinder engine), and then determines that a misfire occurs when the calculated difference exceeds a threshold and the variation pattern of the difference coincides with a pattern specific to occurrence of a misfire. Specifically, when the rotation fluctuation amount in the expansion stroke of a misfire determination target cylinder exceeds a predetermined threshold, and the rotation fluctuation amount is particularly larger than the rotation fluctuation amount of a cylinder that is in the expansion stroke immediately before the expansion stroke of the misfire determination target cylinder and the rotation fluctuation amount of a cylinder that is in the expansion stroke immediately after the expansion stroke of the misfire determination target cylinder, it is determined that a misfire occurs in the misfire determination target cylinder.

In addition, Japanese Patent Application Publication No. 4-171249 (JP-A-4-171249), Japanese Patent Application Publication No. 10-331707 (JP-A-10-331707) and Japanese Patent Application Publication No. 2004-293350 (JP-A-2004-293350) describe a technique that, in an automobile that includes a torque converter equipped with a lock-up clutch, a threshold for engine misfire determination is varied between when the lock-up clutch is in a lock-up state and when the lock-up clutch is in a non-lock-up state.

However, the inventors of the invention found that an erroneous misfire determination may still possibly occur in the misfire determination techniques described in the above Patent Publications.

Specifically, in an automobile equipped with an automatic transmission, a torque converter includes a lock-up clutch, and an engine is directly coupled to the automatic transmission when the lock-up clutch is engaged (in a lock-up state). Under the above situation, as a misfire occurs to generate vibrations in the engine, the vibrations are transmitted to the automatic transmission. If the frequency of the vibrations coincide with the specific frequency of the automatic transmission, this causes a resonance phenomenon of an overall power train from the engine to the automatic transmission. Under the situation that the above resonance phenomenon occurs, it is difficult to accurately identify the rotation fluctuation, and there is a possibility that an erroneous misfire determination may be made.

An example of a situation under which an erroneous misfire determination occurs will be described. An engine rotational speed is measured in such a manner that a crank angle sensor formed of an electromagnetic pickup detects a passage of external teeth of an NE rotor that is integrated with the crankshaft. During then, if the resonance phenomenon occurs, a resonance also occurs in a stay that supports the crank angle sensor. This changes a relative position between the crank angle sensor and the NE rotor. For this reason, even when the crankshaft rotates at a certain rotational speed, a passage timing of the external teeth of the NE rotor detected by the crank angle sensor is unstable because of a change in relative position due to the resonance phenomenon. Conversely, although the rotational speed of the crankshaft fluctuates because of a misfire, the rotation fluctuation may not be accurately detected because of the resonance phenomenon. As described above, the resonance phenomenon causes amplification, cancellation, attenuation, or the like, of rotation fluctuation, and, therefore, the rotation fluctuation is not accurately detected by the crank angle sensor. This may cause an erroneous misfire determination.

In addition, the above described JP-A-4-171249, JP-A-10-331707 and JP-A-2004-293350 describe that a threshold for misfire determination is changed between when the lock-up clutch is in the lock-up state and when the lock-up clutch is in the non-lock-up state; however, an erroneous misfire determination due to a resonance phenomenon of the overall power train is not considered at all, and a misfire determination is simply made on the basis of whether the rotation fluctuation amount exceeds a predetermined threshold. Thus, there is still a possibility to make an erroneous misfire determination due to the resonance phenomenon in these JP-A-4-171249, JP-A-10-331707 and JP-A-2004-293350.

SUMMARY OF THE INVENTION

The invention provides a misfire determination device and misfire determination method that are able to avoid an erroneous misfire determination due to the resonance phenomenon.

An aspect of the invention provides a misfire determination device for an internal combustion engine that is coupled to a transmission via a hydraulic power transmission equipped with a lock-up clutch. The misfire determination device determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire. The misfire determination device includes: a first misfire determination unit that makes a first misfire determination in which a misfire determination is made on the basis of whether, when the lock-up clutch is in a non-lock-up state, the rotation fluctuation pattern of the internal combustion engine substantially coincides with a first rotation fluctuation pattern specific to occurrence of a misfire in the non-lock-up state; and a second misfire determination unit that makes a second misfire determination in which occurrence of a misfire is determined on the basis of whether, when the lock-up clutch is in a lock-up state, the rotation fluctuation pattern of the internal combustion engine substantially coincides with a second rotation fluctuation pattern specific to occurrence of a misfire in the lock-up state.

Another aspect of the invention provides a misfire determination method for an internal combustion engine that is coupled to a transmission via a hydraulic power transmission equipped with a lock-up clutch. The misfire determination method determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire. The misfire determination method includes: making a first misfire determination in which a misfire determination is made on the basis of whether, when the lock-up clutch is in a non-lock-up state, the rotation fluctuation pattern of the internal combustion engine substantially coincides with a first rotation fluctuation pattern specific to occurrence of a misfire in the non-lock-up state; and making a second misfire determination in which occurrence of a misfire is determined on the basis of whether, when the lock-up clutch is in a lock-up state, the rotation fluctuation pattern of the internal combustion engine substantially coincides with a second rotation fluctuation pattern specific to occurrence of a misfire in the lock-up state.

Here, the misfire determination device and the misfire determination method may further make a specific rotation fluctuation pattern determination as to whether the rotation fluctuation pattern of the internal combustion engine in the lock-up state substantially coincides with a specific rotation fluctuation pattern that is specific to occurrence of a misfire, and, when it is determined that the rotation fluctuation pattern of the internal combustion engine substantially coincides with the specific rotation fluctuation pattern in the specific pattern determination made through the specific rotation fluctuation pattern determination, may execute a misfire determination on the basis of whether the rotation fluctuation pattern of the internal combustion engine substantially coincides with the second rotation fluctuation pattern.

In addition, the second rotation fluctuation pattern may be smaller in variation of a rotation fluctuation than the first rotation fluctuation pattern.

With the above misfire determination device and misfire determination method, in an internal combustion engine that is coupled to a transmission via a hydraulic power transmission equipped with a lock-up clutch, by distinctly identifying the first rotation fluctuation pattern and the second rotation fluctuation pattern, it is possible to appropriately and accurately make a misfire determination in the non-lock-up state of the lock-up clutch and a misfire determination in the lock-up state of the lock-up clutch. Thus, it is possible to prevent an erroneous misfire determination both in the lock-up state and in the non-lock-up state.

Further another aspect of the invention provides a misfire determination device for an internal combustion engine that is coupled to a transmission via a hydraulic power transmission equipped with a lock-up clutch. The misfire determination device determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire. The misfire determination device includes: a first misfire determination unit that calculates a rotation fluctuation amount from a difference between an engine rotational speed in an expansion stroke of a misfire determination target cylinder for which it is determined that there is a possibility that the misfire has occurred and an engine rotational speed in an expansion stroke of another cylinder, and then makes a first misfire determination in which occurrence of a misfire is determined on the basis of whether a variation pattern of the rotation fluctuation amount substantially coincides with a predetermined misfire determination pattern; an engine rotational speed determination unit that, when it is not determined that a misfire has occurred in the first misfire determination made by the first misfire determination unit, makes an engine rotational speed determination in which it is determined whether an engine rotational speed in the expansion stroke of the misfire determination target cylinder when the lock-up clutch is in the lock-up state is lower than a predetermined threshold; and a second misfire determination unit that, when it is determined in the engine rotational speed determination made by the engine rotational speed determination unit that the engine rotational speed in the expansion stroke of the misfire determination target cylinder is lower than the predetermined threshold, makes a second misfire determination in which it is determined whether a misfire has occurred on the basis of the difference between the engine rotational speed in the expansion stroke of the misfire determination target cylinder and the engine rotational speed in the expansion stroke of the another cylinder.

In addition, yet further another aspect of the invention provides a misfire determination method for an internal combustion engine that is coupled to a transmission via a hydraulic power transmission equipped with a lock-up clutch. The misfire determination method determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire. The misfire determination method includes: calculating a rotation fluctuation amount from a difference between an engine rotational speed in an expansion stroke of a misfire determination target cylinder for which it is determined that there is a possibility that the misfire has occurred and an engine rotational speed in an expansion stroke of another cylinder, and then making a first misfire determination in which occurrence of a misfire is determined on the basis of whether a variation pattern of the rotation fluctuation amount substantially coincides with a predetermined misfire determination pattern; when it is not determined that a misfire has occurred in the first misfire determination, making an engine rotational speed determination in which it is determined whether an engine rotational speed in the expansion stroke of the misfire determination target cylinder when the lock-up clutch is in the lock-up state is lower than a predetermined threshold; and when it is determined in the engine rotational speed determination that the engine rotational speed in the expansion stroke of the misfire determination target cylinder is lower than the predetermined threshold, making a second misfire determination in which it is determined whether a misfire has occurred on the basis of the difference between the engine rotational speed in the expansion stroke of the misfire determination target cylinder and the engine rotational speed in the expansion stroke of the another cylinder.

With the above misfire determination device and misfire determination method, by distinctly identifying a determination pattern in the first misfire determination, engine rotational speed determination and second misfire determination, it is possible to accurately make a misfire determination in a non-lock-up state of the lock-up clutch and a misfire determination when the resonance phenomenon is occurring in a lock-up state of the lock-up clutch. Thus, it is possible to prevent an erroneous misfire determination both in the lock-up state and in the non-lock-up state.

As described above, according to the aspects of the invention, the rotation fluctuation pattern of the internal combustion engine for determining whether a misfire has occurred is varied between when the lock-up clutch is in the lock-up state and when the lock-up clutch is in the non-lock-up state. Furthermore, the misfire determination condition is looser when the lock-up clutch is in the lock-up state than when the lock-up clutch is in the non-lock-up state so that it may be determined that a misfire has occurred even when a rotation fluctuation width is small. By so doing, even in a situation that a resonance phenomenon is occurring between the internal combustion engine and the transmission while the lock-up clutch is in the lock-up state, it is possible to prevent an erroneous misfire determination, and it is possible to improve reliability of misfire determination.

In addition, according to the aspects of the invention, by removing the influence of an engine rotational speed in an expansion stroke of a cylinder other than the misfire determination target cylinder, it is possible to determine whether there is a possibility that a misfire has occurred only by the engine rotational speed in the expansion stroke of the misfire determination target cylinder. By so doing, even in a situation that the rotational speed detected in an expansion stroke of another cylinder cannot be accurately detected because of the influence of the resonance phenomenon, it is possible to prevent an erroneous misfire determination, and it is possible to improve reliability of misfire determination.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings. In the present embodiments, the aspects of the invention are applied to a four-cylinder gasoline engine for an automobile.

Figure 1:
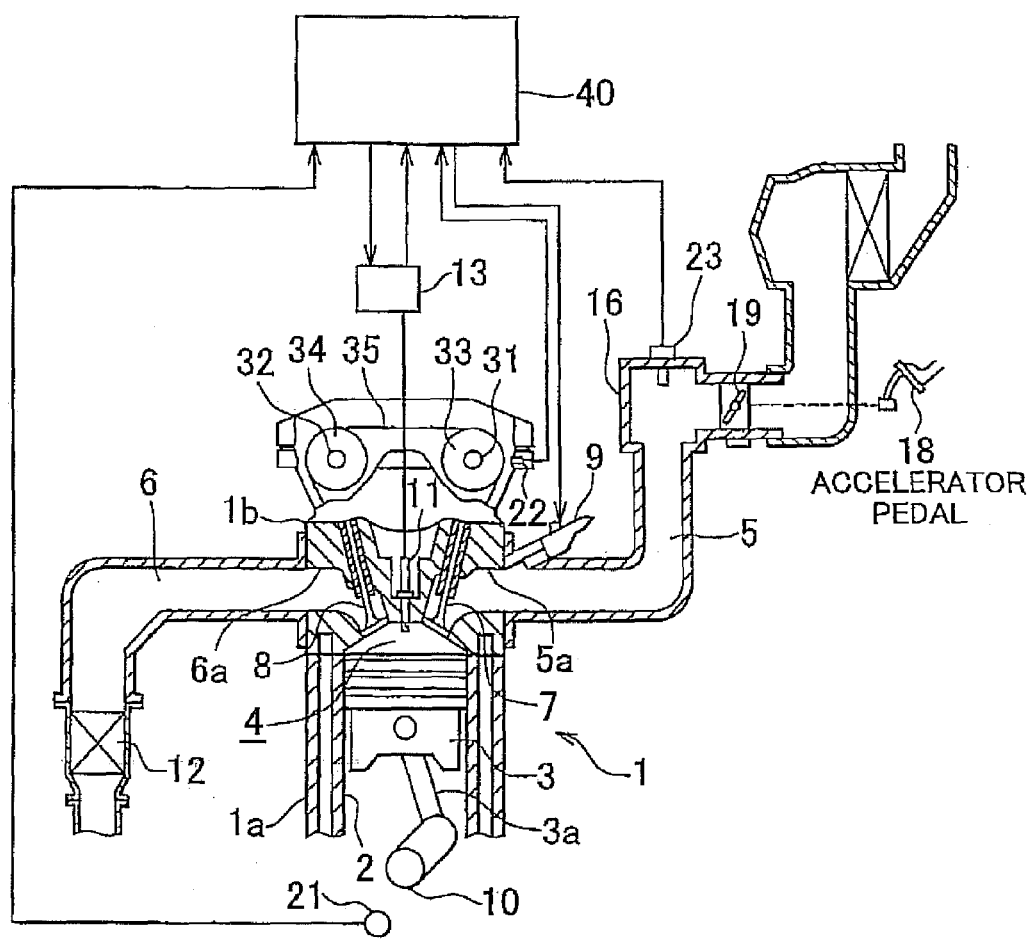
FIG. 1 is a view that shows the schematic configuration of an engine and its peripheral devices to which misfire determination devices according to embodiments of the invention are applied.

First, the schematic configuration of an engine (internal combustion engine) to which a misfire determination device according to first to third embodiments are applied and its peripheral devices will be described with reference to FIG. 1. As shown in FIG. 1, an engine 1 according to the present embodiments includes a cylinder block 1a and a cylinder head 1b. The cylinder block 1a includes cylinder bores 2 corresponding to four cylinders (only one cylinder is shown in FIG. 1). A piston 3 is provided in each cylinder bore 2 so that the piston is vertically movable. Each piston 3 is coupled to a crankshaft 10 via a connecting rod 3a. The crankshaft 10 is an output shaft of the engine 1. Then, inside each cylinder bore 2, a combustion chamber 4 is formed of a space defined by the piston 3 and the cylinder head 1b.

Ignition plugs 11 are attached to the cylinder head 1b in correspondence with the combustion chambers 4. In addition, intake ports 5a and exhaust ports 6a that are in communication with the combustion chambers 4 are formed in the cylinder head 1b. An intake passage 5 and an exhaust passage 6 are respectively connected to these intake ports 5a and exhaust ports 6a. Intake valves 7 and exhaust valves 8 are respectively provided at opening ends of the intake ports 5a and exhaust ports 6a, which are in communication with the combustion chambers 4. The intake valves 7 and the exhaust valves 8 are respectively opened or closed by an intake camshaft 31 and an exhaust camshaft 32. The intake camshaft 31 and the exhaust camshaft 32 both rotate by the power of the crankshaft 10. The power of the crankshaft 10 is transmitted to the intake camshaft 31 and the exhaust camshaft 32 through a timing belt 35 and timing pulleys 33 and 34.

In addition, injectors (fuel injection valves) 9 are respectively provided near the intake ports 5a in correspondence with the cylinders. Fuel having a predetermined pressure is supplied to each injector 9 through a fuel supply system (not shown).

On the other hand, a surge tank 16 is provided in the intake passage 5, and a throttle valve 19 is provided upstream of the surge tank 16. The throttle valve 19 is opened or closed in response to operation of an accelerator pedal 18. The amount of intake air introduced into the intake passage 5 is adjusted on the basis of the opening degree of the throttle valve 19.

As the engine 1 starts, fuel is injected from each injector 9 while intake air is introduced into the intake passage 5. Thus, those intake air and fuel are mixed to become an air-fuel mixture. Then, in an intake stroke of the engine 1, the intake port 5a is opened by the intake valve 7 to allow an air-fuel mixture to be drawn into the combustion chamber 4 through the intake port 5a. The air-fuel mixture drawn into the combustion chamber 4 is compressed in a compression stroke, and is then ignited by the ignition plug 11. The air-fuel mixture expands and burns to give a driving force to the crankshaft 10 (expansion stroke). Burned exhaust gas is discharged to the exhaust passage 6 as the exhaust port 6a is opened by the exhaust valve 8 (exhaust stroke), and is then purified through a catalyst 12. After that, the purified exhaust gas is released to the outside. Note that each ignition plug 11 ignites an air-fuel mixture in accordance with a timing of application of high voltage output from an ignitor 13.

Figure 2:
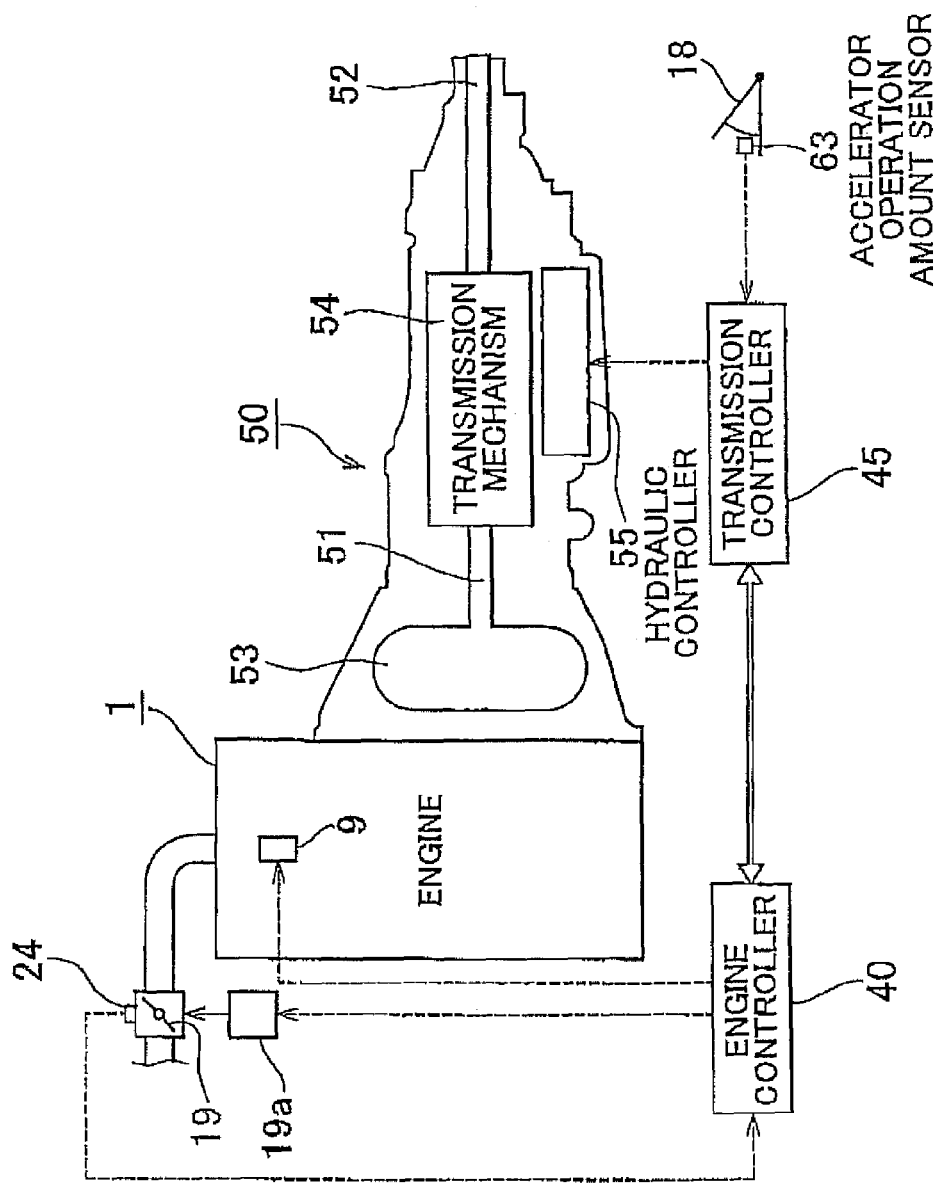
FIG. 2 is a schematic configuration diagram that shows a power train of a vehicle according to the embodiments of the invention.
Figure 3:
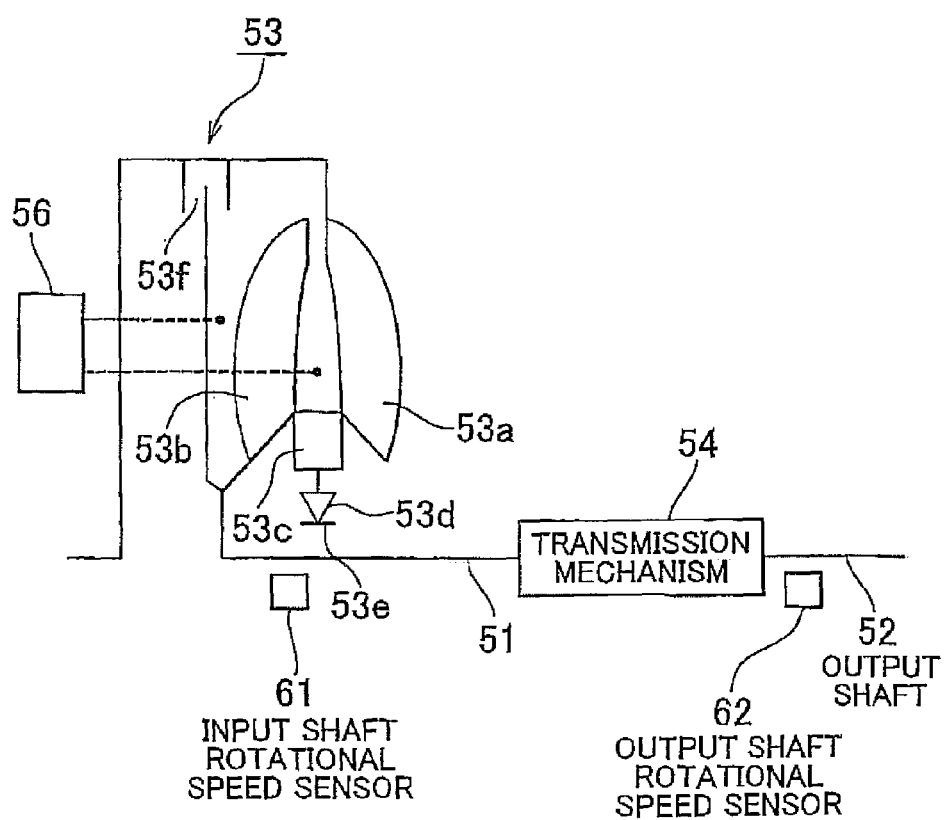
FIG. 3 is a schematic configuration diagram of an automatic transmission, schematically showing the configuration of a torque converter of the power train according to the embodiments of the invention.

Next, the automatic transmission that receives rotational power transmitted from the engine 1 and that performs shift operation will be described. FIG. 2 is a schematic configuration diagram that shows a state where the engine 1 is connected to the automatic transmission 50. In addition, FIG. 3 is a view that shows the schematic configuration of a torque converter (hydraulic power transmission) 53.

As shown in these drawings, the automatic transmission 50 shifts the speed of the rotational power input from the engine 1 to an input shaft 51 and then outputs the rotational power to drive wheels through an output shaft 52. The automatic transmission 50 mainly includes the torque converter 53, a transmission mechanism 54, a hydraulic controller 55, and the like.

The torque converter 53 is rotatably coupled to the engine 1. The torque converter 53 includes a pump impeller 53a, a turbine runner 53b, a stator 53c, a one-way clutch 53d, a stator shaft 53e and a lock-up clutch 53f.

The lock-up clutch 53f is able to directly couple the pump impeller 53a (input side) of the torque converter 53 with the turbine runner 53b (output side) of the torque converter 53. The lock-up clutch 53f is, where necessary, switched among an engaged state, a released state and a half engaged state (slipped state). In the engaged state, the pump impeller 53a is directly coupled to the turbine runner 53b. In the released state, the pump impeller 53a is disengaged from the turbine runner 53b. The half engaged state is an intermediate state between the engaged state and the released state. The conditions for switching will be described later.

Engagement force of the lock-up clutch 53f is controlled by controlling hydraulic pressure applied to the pump impeller 53a (input side) and the turbine runner 53b (output side) by a lock-up control valve 56.

The transmission mechanism 54 is, for example, formed of a plurality of planetary gears, clutches, brakes, one-way clutches, and the like. The transmission mechanism 54 is, for example, able to shift gears among forward six gears and reverse gear. The clutches and brakes of the transmission mechanism 54 are separately engaged or released by the hydraulic controller 55 to establish an appropriate gear (any one of forward first to sixth gears or reverse gear). The configuration of the transmission mechanism 54 and the control operation of the hydraulic controller 55 are generally known, so the detailed illustration and description are omitted here.

The hydraulic controller 55 is controlled by a transmission controller 45. That is, the hydraulic controller 55 is controlled by the transmission controller 45 to establish an appropriate gear, that is, a power transmission path, in the transmission mechanism 54.

Figure 4:
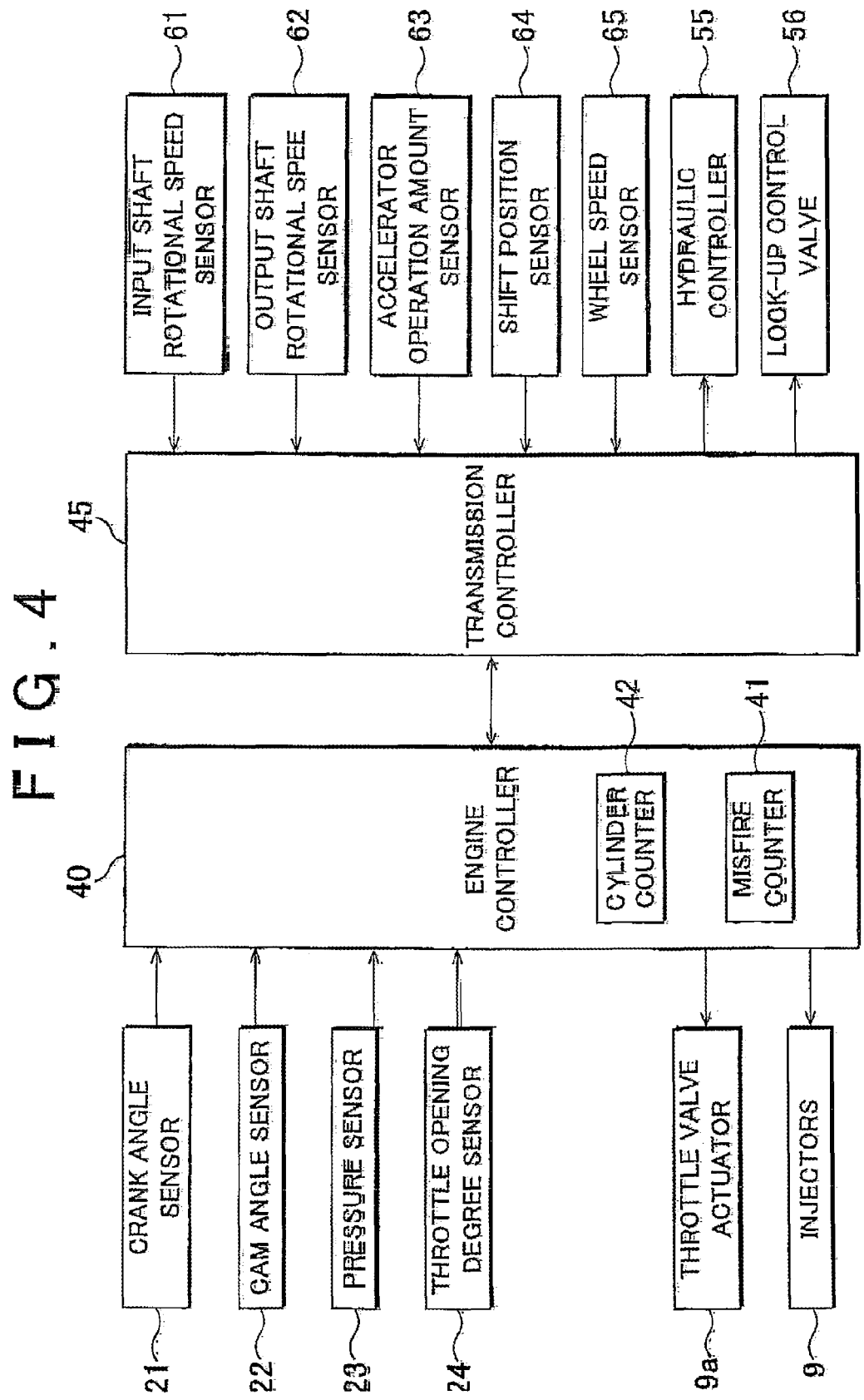
FIG. 4 is a schematic configuration diagram that shows control blocks, including an engine controller and a transmission controller, of the power train according to the embodiments of the invention.

In addition, as shown in FIG. 4, the engine controller (engine ECU) 40 and the transmission controller (transmission ECU) 45 are connected to each other so that information necessary for engine control and transmission control can be exchanged.

The engine controller 40 and the transmission controller 45 both are generally known electronic control units (ECUs) (not shown). Each of the engine controller 40 and the transmission controller 45 includes a central processing unit (CPU), a read only memory (ROM), a random access memory (RAM), a backup RAM, and the like.

The ROM, for example, stores various control programs and maps that are referred to when those various control programs are executed. The CPU executes processing on the basis of the various control programs and maps stored in the ROM. The RAM is a memory that temporarily stores processing results in the CPU and data, and the like, input from sensors. The backup RAM is a nonvolatile memory that stores data, and the like, to be saved when the engine 1 is stopped.

As shown in FIG. 4, various sensors that detect operating states of the engine 1 are connected to the engine controller 40, and signals of the sensors are input to the engine controller 40. The various sensors include a crank angle sensor 21, a cam angle sensor 22, a pressure sensor 23, a throttle opening degree sensor 24, and the like.

The crank angle sensor 21 is arranged near the crankshaft 10, and detects the rotational angle (crank angle CA) and rotational speed (engine rotational speed NE) of the crankshaft 10. Specifically, the crank angle sensor 21 outputs a pulse signal every predetermined crank angle (for example, 30°). As an example of a method of detecting a crank angle by the crank angle sensor 21, external teeth are formed at an interval of 30° on the outer peripheral surface of a rotor (NE rotor) (not shown) that is integrally rotatable with the crankshaft 10, and the crank angle sensor 21 formed of an electromagnetic pickup is arranged to face the external teeth. Then, when any one of the external teeth passes near the crank angle sensor 21 as the crankshaft 10 rotates, the crank angle sensor 21 generates an output pulse. Note that the rotor may be formed so that external teeth are formed at an interval of 10° on the outer peripheral surface. In this case, the engine controller 40 divides the frequency to generate an output pulse for each 30° CA.

The cam angle sensor 22 is arranged near the intake camshaft 31, and is used as a cylinder determination sensor. For example, the cam angle sensor 22 outputs a pulse signal in correspondence with a compression top dead center (TDC) of a first cylinder #1. That is, the cam angle sensor 22 outputs a pulse signal each time the intake camshaft 31 rotates one revolution. As an example of a method of detecting a cam angle by the cam angle sensor 22, an external tooth is formed at a portion of the outer peripheral surface of a rotor that is integrally rotatable with the intake camshaft 31, and the cam angle sensor 22 formed of an electromagnetic pickup is arranged to face the external tooth. When the external tooth passes near the cam angle sensor 22 as the intake camshaft 31 rotates, the cam angle sensor 22 generates an output pulse. The rotor rotates at a rotational speed that is half the rotational speed of the crankshaft 10, so an output pulse is generated each time the crankshaft 10 rotates 720°. In other words, an output pulse is generated each time a specific cylinder enters the same stroke (for example, at the time when the first cylinder #1 reaches a compression top dead center).

The pressure sensor 23 is arranged in the surge tank 16, and detects the pressure in the intake passage 5 (intake pipe pressure PM). That is, the pressure sensor 23 outputs a signal based on the pressure in the surge tank 16.

In addition, the engine controller 40 controls various portions of the engine 1, such as an actuator 19a of the throttle valve 19 and the injectors 9.

Furthermore, the engine controller 40 includes a total misfire counter 41 and a cylinder-by-cylinder misfire counter 42. The total misfire counter 41 increments its count value each time a misfire is detected in any cylinder through a misfire determination, which will be described later. On the other hand, when a misfire is detected through the misfire determination, which will be described later, the cylinder-by-cylinder misfire counter 42 identifies a cylinder in which the misfire has occurred, and then increments a misfire count value for that cylinder.

On the other hand, an input shaft rotational speed sensor 61, an output shaft rotational speed sensor 62, an accelerator operation amount sensor 63, a shift position sensor 64, a wheel speed sensor 65, and the like, are connected to the transmission controller 45. The input shaft rotational speed sensor 61 detects the rotational speed of the input shaft 51. The output shaft rotational speed sensor 62 detects the rotational speed of the output shaft 52. The accelerator operation amount sensor 63 detects the operation amount of the accelerator pedal 18 operated by a driver. The shift position sensor 64 detects the shift lever position of the automatic transmission 50. The wheel speed sensor 65 detects the speed of the drive wheels (wheel speed).

In addition, the transmission controller 45 outputs a lock-up clutch control signal to the lock-up control valve 56. On the basis of the lock-up clutch control signal, the lock-up control valve 56 controls the engagement pressure of the lock-up clutch 53f to switch the lock-up clutch 53f among an engaged state (lock-up state), a released state (completely slipped state) and a half engaged state (slipped state: also referred to as flexible lock-up state).

Furthermore, the transmission controller 45 outputs a solenoid control signal (hydraulic instruction signal) to the hydraulic controller 55 of the automatic transmission 50. On the basis of the solenoid control signal, linear solenoid valves, on-off solenoid valves, and the like, provided for a hydraulic control circuit of the hydraulic controller 55, and the clutches, brakes, and the like, of the automatic transmission 50 are engaged or released into predetermined states so as to achieve a predetermined gear (first to sixth gear, reverse gear, or the like).

Figure 5:
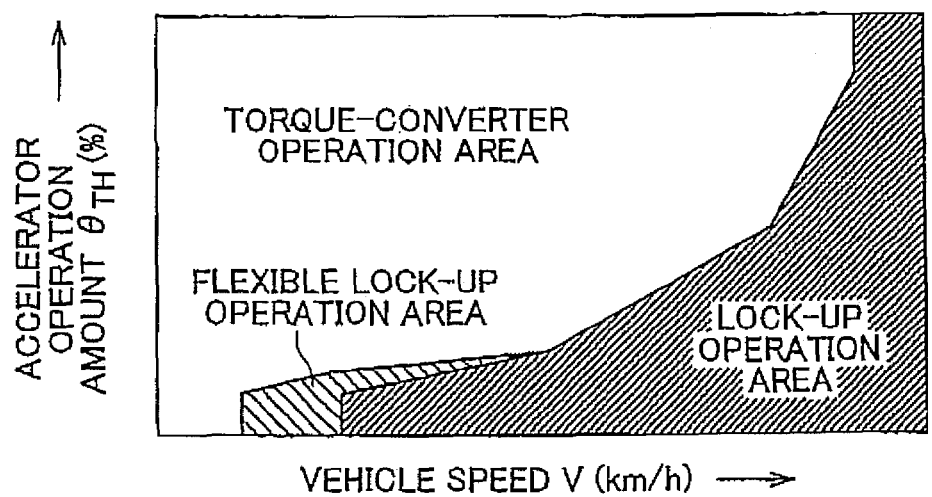
FIG. 5 is a lock-up clutch operation map used to control the lock-up clutch of the power train.

The lock-up clutch 53f is switched among the engaged state, the released state and the half engaged state in accordance with, for example, the lock-up clutch operation map shown in FIG. 5. The lock-up clutch operation map uses a vehicle speed V and an accelerator operation amount θTH as parameters, and is a map used to switch the lock-up clutch 53f among the engaged state (lock-up state), the released state (torque-converter state) and the half engaged state (flexible lock-up state: slipped state). The lock-up clutch operation map is stored in the ROM of the transmission controller 45.

That is, it is determined which area the vehicle speed V and the accelerator operation amount θTH belong to, an engaged area (lock-up operation area), a released area (torque-converter operation area) and a slipped area (flexible lock-up operation area), and the lock-up control valve 56 is controlled for operation in the determined area to control the lock-up clutch 53f into any one of the engaged, released or half engaged state. Note that the state of the lock-up clutch 53f may be switched using a lock-up operation map based on a throttle opening degree instead of an accelerator operation amount θTH (map for controlling the lock-up clutch 53f on the basis of the vehicle speed and the throttle opening degree).

In the flexible lock-up operation area, in order to improve fuel economy as much as possible without impairing drivability, the lock-up clutch 53f undergoes slip control to suppress a power transmission loss of the torque converter 53 as much as possible while absorbing the rotation fluctuation of the engine 1. In the slip control of the lock-up clutch 53f, a driving signal is output to a solenoid valve that controls the lock-up clutch 53f in order to control a rotational speed difference (slip amount) NSLP (=NE−NT) between a turbine rotational speed NT and an engine rotational speed NE to a target rotational speed difference (target slip amount: for example, 50 rpm). Deceleration slip control of the slip control is, for example, performed at a gear at which reverse input from the drive wheel side is transmitted to the engine 1 side, that is, a gear at which engine braking is obtained, and then the turbine rotational speed NT and the engine rotational speed NE are gently reduced with a deceleration of the vehicle. The reverse input from the drive wheel side occurs during forward running in which the accelerator operation amount θTH is substantially zero and a vehicle is coasting (decelerating). In this way, as the lock-up clutch 53f is slip-engaged, the engine rotational speed NE is increased to near the turbine rotational speed NT. This maintains a control state for suppressing a fuel supply amount to the engine 1 (fuel cut state) for a further long period of time to improve fuel economy.

The misfire determination device according to each of the embodiments includes the engine controller 40. The engine controller 40 receives signals output from the sensors 21 to 24. Then, the engine controller 40 calculates a crank angle CA, an engine rotational speed NE, a currently operating cylinder (for example, a cylinder that is currently in an expansion stroke), an intake pipe pressure PM, and the like, on the basis of these signals. Then, the engine controller 40 makes a misfire determination according to the embodiments, which will be described later, on the basis of those calculation results.

The configuration of the engine, configuration of the automatic transmission, engine controller and transmission controller and configuration of the misfire determination device according to the present embodiments are described above. Next, the first to third embodiments of the invention will be specifically described.

First, a misfire determination made by the misfire determination device according to the first embodiment will be described. The misfire determination device utilizes two types of rotation fluctuation amounts, that is, a first rotation fluctuation amount (eddtcrx) and a second rotation fluctuation amount (edltmfh) described below, in order to determine whether a misfire has occurred.

The procedure of calculating the first rotation fluctuation amount (eddtcrx) and the second rotation fluctuation amount (edltmfh) will be described below.

The first rotation fluctuation amount (eddtcrx) is a value obtained by subtracting a second difference from a first difference. The first difference is a difference between a duration required for the crankshaft 10 to rotate from a compression top dead center to a bottom dead center by 180° crank angle (CA) in a current cylinder that is currently in the expansion stroke (hereinafter, the duration is referred to as "expansion stroke duration") and an expansion stroke duration of a one-ignition-cycle-before cylinder that has been in an expansion stroke immediately before the current cylinder (180° CA before in ignition timing) (value obtained by subtracting the latter expansion stroke duration from the former expansion stroke duration). The second difference is a difference between an expansion stroke duration of a two-ignition-cycle-before cylinder that has been in an expansion stroke two ignition cycles before the current cylinder (360° CA before in ignition timing) and an expansion stroke duration of a three-ignition-cycle-before cylinder that has been in an expansion stroke immediately before the two-ignition-cycle-before cylinder (three ignition cycles before the current cylinder) (540° CA before in ignition timing) (value obtained by subtracting the latter expansion stroke duration from the former expansion stroke duration)

Figure 6:
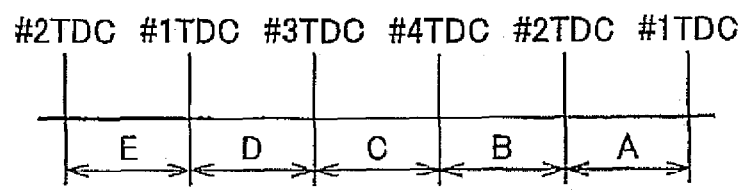
FIG. 6 is a view that shows a sequence of combustion strokes of cylinders and durations required for expansion strokes in the respective cylinders according to the first and third embodiments.

For example, as shown in FIG. 6, when a combustion stroke is carried out in the sequence of the first cylinder #1, the third cylinder #3, the fourth cylinder #4 and the second cylinder #2 by 180° CA, where the current cylinder that is currently in the expansion stroke is the second cylinder #2, and where the expansion stroke duration of the second cylinder #2 is "A", the expansion stroke duration of the fourth cylinder #4 immediately before the second cylinder #2 is "B", the expansion stroke duration of the third cylinder #3 immediately before the fourth cylinder #4 is "C", the expansion stroke duration of the first cylinder #1 immediately before the third cylinder #3 is "D" and furthermore the expansion stroke duration of the second cylinder #2 immediately before the first cylinder #1 is "E", the first rotation fluctuation amount (eddtcrx) of the current cylinder (second cylinder #2) is calculated by the following mathematical expression (1).

$$eddtcrx=(A-B)-(C-D) \qquad (1)$$

By so doing, the first rotation fluctuation amount (eddtcrx) may be calculated for the current cylinder using the rotational speed of the current cylinder (second cylinder #2) and the rotational speeds in three expansion strokes immediately before the current cylinder (respective expansion strokes of the fourth cylinder #4, third cylinder #3 and first cylinder #1).

As a misfire occurs in the cylinder currently in the expansion stroke and then the engine rotational speed decreases, a duration required for the crankshaft 10 to rotate a certain crank angle elongates. That is, the value of A in the mathematical expression (1) is larger than the value of B, C or D. Then, a duration required for the crankshaft 10 to rotate a certain crank angle (180° CA) in the expansion stroke of each cylinder is detected. The length of the duration is substituted into the mathematical expression (1). It is determined whether there is a possibility that a misfire has occurred on the basis of the calculated first rotation fluctuation amount (eddtcrx). Then, the determined result is used for the misfire determination, which will be described later.

On the other hand, the operation of calculating the second rotation fluctuation amount (edltmfh) first calculates a difference between the expansion stroke duration of the current cylinder that is currently in the expansion stroke and the expansion stroke duration of the two-ignition-cycles-before cylinder that has been in the expansion stroke two ignition cycles before the current cylinder (360° CA before in ignition timing) (value obtained by subtracting the latter expansion stroke duration from the former expansion stroke duration). Then, the second rotation fluctuation amount (edltmfh) is calculated as described below. An average value of a difference between the expansion stroke duration of the one-ignition-cycle-before cylinder that has been in the expansion stroke immediately before the current cylinder (180° CA before in ignition timing) and the expansion stroke duration of a three-ignition-cycle-before cylinder that has been in the expansion stroke two ignition cycles before the one-ignition-cycle-before cylinder (three ignition cycles before the current cylinder (540° CA before in ignition timing)) (value obtained by subtracting the latter expansion stroke duration from the former expansion stroke duration) and a difference between the expansion stroke duration of the two-ignition-cycle-before cylinder that has been in the expansion stroke two ignition cycles before the current cylinder (360° CA before in ignition timing) and the expansion stroke duration of the four-ignition-cycle-before cylinder that has been in the expansion stroke two ignition cycles before the two-ignition-cycle-before cylinder (four ignition cycles before the current cylinder (720° CA before in ignition timing)) (value obtained by subtracting the latter expansion stroke duration from the former expansion stroke duration) is calculated. Then, a difference between the expansion stroke duration of the current cylinder and the expansion stroke duration of the two-ignition-cycle-before cylinder is subtracted from the above average value to obtain the second rotation fluctuation amount (edltmfh).

When applied to FIG. 6, the second rotation fluctuation amount (edltmfh) is calculated by the following mathematical expression (2).

$$edltmfh = (A-C) - (\{(B-D)+(C-E)\}/2) \quad (2)$$

Next, the procedure of misfire determination that is carried out using the above first rotation fluctuation amount (eddtcrx) and second rotation fluctuation amount (edltmfh) will be schematically described. Note that in the following description, the "lock-up state (engaged state) of the lock-up clutch 53f" conceptually includes the "flexible lock-up state (half engaged state) of the lock-up clutch 53f".

(I) First, it is determined whether the rotation fluctuation amount of the engine 1 exceeds a predetermined threshold (N1), and, when the rotation fluctuation amount exceeds the threshold (N1), it is determined that there is a possibility that a misfire has occurred. Specifically, it is determined whether the second rotation fluctuation amount (edltmfh) exceeds the threshold (N1) in the expansion stroke of a cylinder, and, when the second rotation fluctuation amount (edltmfh) exceeds the threshold (N1), it is determined that there is a possibility that a misfire has occurred in the cylinder that has been in the expansion stroke (hereinafter, referred to as misfire determination target cylinder).

Note that the threshold (N1) is experimentally or empirically set, and is calculated, for example, through a map as a value that is smaller as the engine rotational speed NE increases. This is because the following reason. Usually, as the engine rotational speed NE increases, the durations A to E are calculated as short periods of time accordingly. Thus, the second rotation fluctuation amount (edltmfh) that is calculated on the basis of the mathematical expression (2) is also calculated as a small value. Then, by calculating the threshold (N1) as a value that is smaller as the engine rotational speed NE increases, the influence of a variation in engine rotational speed NE is removed as much as possible, and then it is possible to determine whether there is a possibility that a misfire has occurred.

(II) When it is determined in this manner that there is a possibility that a misfire has occurred, a first misfire determination is made (first misfire determination made by a first misfire determination unit). In the first misfire determination, occurrence of a misfire is determined on the basis of whether the rotation fluctuation pattern of the engine 1 substantially coincides with a predetermined first misfire determination pattern before and after the expansion stroke of the misfire determination target cylinder. Specifically, occurrence of a misfire is determined on the basis of whether the rotation fluctuation pattern expressed as a temporal variation in the first rotation fluctuation amount (eddtcrx) coincides with the first misfire determination pattern. The details of the first misfire determination pattern will be described later.

(III) Then, in the first misfire determination, when it is determined that a misfire has occurred in the misfire determination target cylinder, it is finally determined that a misfire has occurred as a misfire determination.

On the other hand, in the first misfire determination, when it is determined that no misfire has occurred, it is determined whether the lock-up clutch 53f is in the lock-up state and the rotation fluctuation pattern of the engine 1 substantially coincides with a specific rotation fluctuation pattern that is specific to occurrence of a misfire in the lock-up state (specific pattern determination executed by a specific rotation fluctuation pattern determination unit). Specifically, it is determined whether the rotation fluctuation pattern expressed as a temporal variation in the first rotation fluctuation amount (eddtcrx) and the rotation fluctuation pattern expressed as a temporal variation in the second rotation fluctuation amount (edltmfh) respectively substantially coincide with the specific rotation fluctuation patterns before and after the expansion stroke of the misfire determination target cylinder. The details of these specific rotation fluctuation patterns (the specific rotation fluctuation pattern of the first rotation fluctuation amount and the specific rotation fluctuation pattern of the second rotation fluctuation amount) will be described later.

(IV) Then, when it is determined that these rotation fluctuation patterns do not coincide with the above specific rotation fluctuation patterns, it is finally determined that no misfire has occurred as a misfire determination. On the other hand, when it is determined that these rotation fluctuation patterns substantially coincide with the specific rotation fluctuation patterns, a second misfire determination is made (second misfire determination made by a second misfire determination unit). In the second misfire determination, occurrence of a misfire is determined on the basis of whether the rotation fluctuation pattern of the engine 1 substantially coincides with a second misfire determination pattern that is defined as a pattern such that a variation in rotation fluctuation is smaller than that of the first misfire determination pattern before and after the expansion stroke of the misfire determination target cylinder, that is, defined as a pattern so as to be looser in the misfire determination condition. Specifically, occurrence of a misfire is determined on the basis of whether the rotation fluctuation pattern expressed as a temporal variation in the first rotation fluctuation amount (eddtcrx) coincides with the second misfire determination pattern. In the second misfire determination, when it is determined that the rotation fluctuation pattern does not coincide with the second misfire determination pattern, it is finally determined that no misfire has occurred as a misfire determination. On the other hand, in the second misfire determination, when it is determined that the rotation fluctuation pattern substantially coincides with the second misfire determination pattern, it is finally determined that a misfire has occurred as a misfire determination. The details of the second misfire determination pattern will be described later.

Next, the respective misfire determination patterns and specific rotation fluctuation patterns for the above described misfire determinations will be described.

Figure 7A:
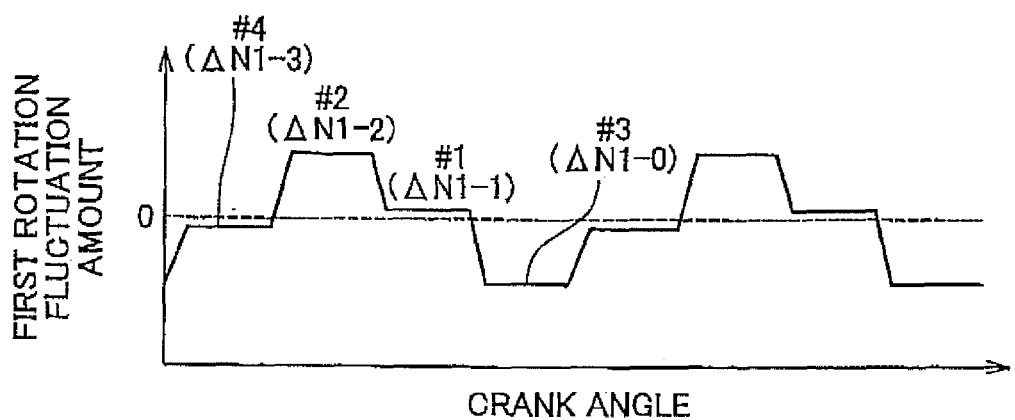
FIG. 7A and FIG. 7B are graphs that show examples of the rotation fluctuation pattern of a first rotation fluctuation amount (eddtcrx) and the rotation fluctuation pattern of a second rotation fluctuation amount (edltmfh) when a misfire has been successively occurring in a second cylinder while the lock-up clutch is in a non-lock-up state according to the first embodiment.
Figure 7B:
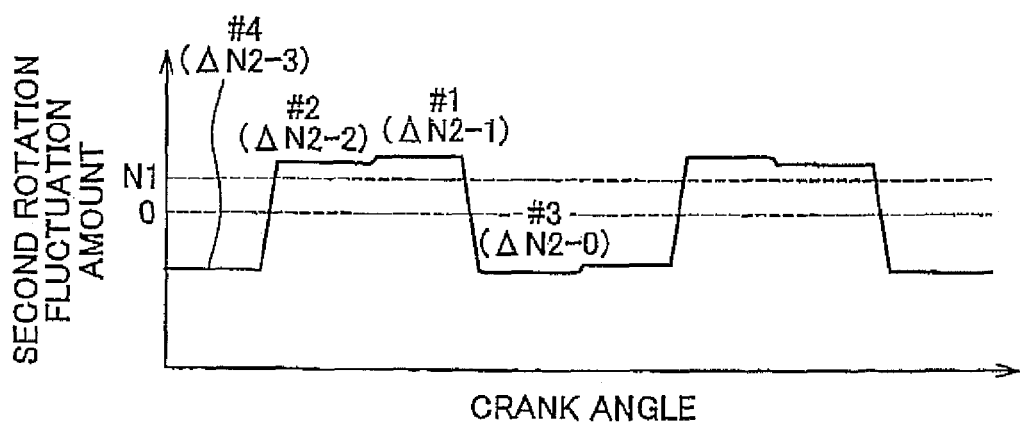

FIG. 7A and FIG. 7B show examples of the rotation fluctuation pattern of the first rotation fluctuation amount (eddtcrx) and the rotation fluctuation pattern of the second rotation fluctuation amount (edltmfh) when a misfire has been successively occurring in the second cylinder #2 while the lock-up clutch 53f is in the non-lock-up state (released state).

Figure 8A:
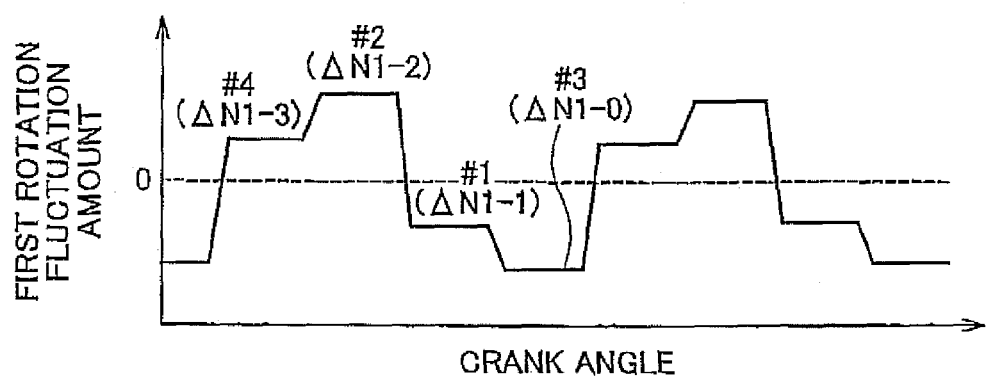
FIG. 8A and FIG. 8B are graphs that show examples of the rotation fluctuation pattern of the first rotation fluctuation amount (eddtcrx) and the rotation fluctuation pattern of the second rotation fluctuation amount (edltmfh) when a misfire has been successively occurring while the lock-up clutch is in a lock-up state and no resonance phenomenon is occurring between the engine and the automatic transmission according to the first embodiment.
Figure 8B:
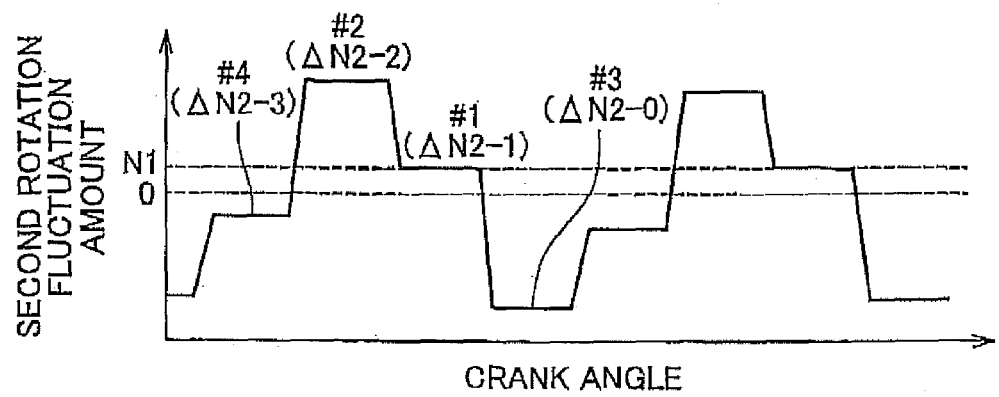

In addition, FIG. 8A and FIG. 8B show examples of the rotation fluctuation pattern of the first rotation fluctuation amount (eddtcrx) and the rotation fluctuation pattern of the second rotation fluctuation amount (edltmfh) when the lock-up clutch 53f is in the lock-up state and no resonance phenomenon is occurring between the engine 1 and the automatic transmission 50.

Figure 9A:
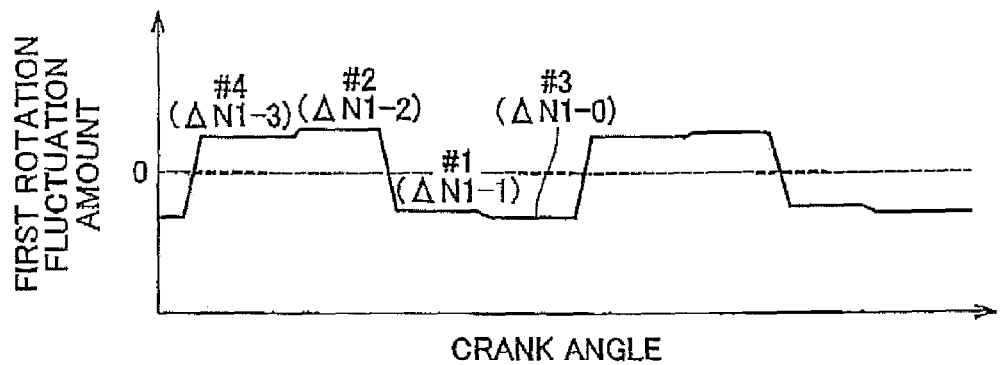
FIG. 9A and FIG. 9B are graphs that show examples of the rotation fluctuation pattern of the first rotation fluctuation amount (eddtcrx) and the rotation fluctuation pattern of the second rotation fluctuation amount (edltmfh) when a misfire has been successively occurring while the lock-up clutch is in a lock-up state and a resonance phenomenon is occurring between the engine and the automatic transmission according to the first embodiment.
Figure 9B:
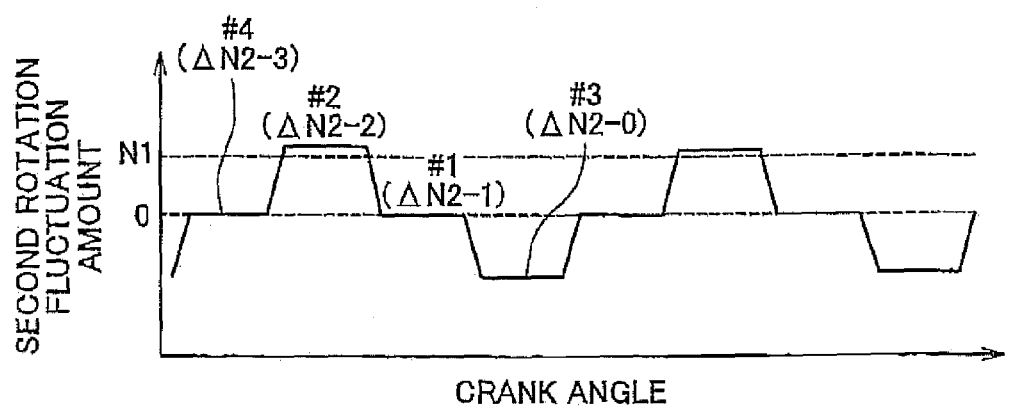

Then, FIG. 9A and FIG. 9B show examples of the rotation fluctuation pattern of the first rotation fluctuation amount (eddtcrx) and the rotation fluctuation pattern of the second rotation fluctuation amount (edltmfh) when the lock-up clutch 53f in the lock-up state (as described above, including the flexible lock-up state) and a resonance phenomenon is occurring between the engine 1 and the automatic transmission 50.

In the waveforms shown in FIG. 7A to FIG. 9A, $\Delta N1\text{-}0$ is the first rotation fluctuation amount of the third cylinder #3, $\Delta N1\text{-}1$ is the first rotation fluctuation amount of the first cylinder #1, $\Delta N1\text{-}2$ is the first rotation fluctuation amount of the second cylinder #2, and $\Delta N1\text{-}3$ is the first rotation fluctuation amount of the fourth cylinder #4. That is, a variation in the first rotation fluctuation amount in accordance with the sequence of $\Delta N1\text{-}3$, $\Delta N1\text{-}2$, $\Delta N1\text{-}1$, $\Delta N1\text{-}0$, $\Delta N1\text{-}3$, ... is the rotation fluctuation pattern of the first rotation fluctuation amount.

Similarly, in the waveforms shown in FIG. 7B to FIG. 9B, $\Delta N2\text{-}0$ is the second rotation fluctuation amount of the third cylinder #3, $\Delta N2\text{-}1$ is the second rotation fluctuation amount of the first cylinder #1, $\Delta N2\text{-}2$ is the second rotation fluctuation amount of the second cylinder #2, and $\Delta N2\text{-}3$ is the second rotation fluctuation amount of the fourth cylinder #4. That is, a variation in the second rotation fluctuation amount in accordance with the sequence of $\Delta N2\text{-}3$, $\Delta N2\text{-}2$, $\Delta N2\text{-}1$, $\Delta N2\text{-}0$, $\Delta N2\text{-}3$, ... is the rotation fluctuation pattern of the second rotation fluctuation amount.

The first misfire determination pattern is used for the rotation fluctuation pattern of the first rotation fluctuation amount (eddtcrx). The first misfire determination pattern corresponds to the rotation fluctuation pattern of the first rotation fluctuation amount (eddtcrx) shown in FIG. 7A. That is, the first misfire determination pattern corresponds to the rotation fluctuation pattern of the first rotation fluctuation amount (eddtcrx) when a misfire occurs while the lock-up clutch 53f is in the non-lock-up state. Hereinafter, this will be specifically described.

As shown by the rotation fluctuation pattern of the first rotation fluctuation amount (eddtcrx) shown in FIG. 7A, when a misfire, for example, occurs in the second cylinder #2 (misfire determination target cylinder), the first rotation fluctuation amount (eddtcrx=$\Delta N1\text{-}2$) calculated in the expansion stroke of the second cylinder #2 is particularly larger than the first rotation fluctuation amount (eddtcrx=$\Delta N1\text{-}3$) calculated in the expansion stroke of the immediately preceding fourth cylinder #4 (one-ignition-cycle-before cylinder according to the aspect of the invention) and the first rotation fluctuation amount (eddtcrx=$\Delta N1\text{-}1$) calculated in the expansion stroke of the immediately following first cylinder #1 (one-ignition-cycle-after cylinder according to the aspect of the invention). In addition to the above, the first rotation fluctuation amount (eddtcrx=$\Delta N1\text{-}0$) calculated in the expansion stroke of the third cylinder #3 that has been in the expansion stroke two ignition cycles after the second cylinder #2 (misfire determination target cylinder) and the first rotation fluctuation amount $\Delta N1\text{-}2$ (the first rotation fluctuation amount of the second cylinder #2, which is the misfire determination target cylinder) have substantially equal absolute values and reverse in sign.

In the misfire determination device according to the present embodiment, in order to determine occurrence of a misfire by focusing on that the variation patterns of the rotation fluctuation amounts $\Delta N1\text{-}0$ to $\Delta N1\text{-}3$ exhibit patterns specific to occurrence of a misfire in the non-lock-up state, the following conditions are prestored in the ROM of the engine controller 40.

$$\Delta N1\text{-}2 \times X < |\Delta N1\text{-}0|, \text{ and} \qquad (a)$$

$$\Delta N1\text{-}2 \times Y \geq \Delta N1\text{-}3, \text{ and} \qquad (b)$$

$$\Delta N1\text{-}2 \times Z \geq \Delta N1\text{-}1 \qquad (c)$$

When the logical multiplication of these (a) to (c) is satisfied (that is, the variation pattern of the rotation fluctuation amounts becomes the first misfire determination pattern), it is determined that a misfire has occurred in the cylinder (second cylinder #2) of which the rotation fluctuation amount is $\Delta N1\text{-}2$. Here, the coefficients X, Y, and Z are experimentally or empirically set as a positive value smaller than "1".

In addition, these coefficients X to Z are calculated on the basis of the engine rotational speed NE. Specifically, the coefficients X to Z are calculated as values that are smaller as the engine rotational speed NE increases. This is because the following reason.

As described above, as the engine rotational speed NE increases, the rotation fluctuation amounts $\Delta N1\text{-}0$ to $\Delta N1\text{-}3$ are calculated as smaller values accordingly. Then, by calculating the coefficients as values that are smaller as the engine rotational speed NE increases, the influence of a variation in engine rotational speed NE is removed as much as possible, and then the variation pattern of these rotation fluctuation amounts $\Delta N1\text{-}0$ to $\Delta N1\text{-}3$ may be compared with the misfire pattern.

Then, when the logical multiplication of the conditions (a) to (c) is satisfied, the variation pattern of the rotation fluctuation amounts $\Delta N1\text{-}0$ to $\Delta N1\text{-}3$ coincides with the misfire pattern in the non-lock-up state (first misfire determination pattern), and an increase in rotation fluctuation amount $\Delta N1\text{-}2$ is caused by a misfire to determine that a misfire has occurred.

The specific rotation fluctuation pattern of the first rotation fluctuation amount (eddtcrx) is a rotation fluctuation pattern such that the first rotation fluctuation amount (eddtcrx) enters a rotation fluctuation state that satisfies the following mathematical expression (3).

$$|\Delta N1\text{-}1| \geq (\Delta N1\text{-}2) \times \alpha \qquad (3)$$

Here, $|\Delta N1\text{-}1|$ is the absolute value of the first rotation fluctuation amount calculated in the expansion stroke of the first cylinder #1, that is, the absolute value of the first rotation fluctuation amount of the cylinder that has been in the expansion stroke immediately after the expansion stroke of the misfire determination target cylinder. In addition, $\Delta N1\text{-}2$ is the first rotation fluctuation amount calculated in the expansion stroke of the second cylinder #2, that is, the first rotation fluctuation amount calculated in the expansion stroke of the misfire determination target cylinder. In addition, $\alpha$ is a coefficient that is set as a positive value smaller than "1", and is experimentally or empirically set.

The specific rotation fluctuation pattern of the second rotation fluctuation amount (edltmfh) is a rotation fluctuation pattern such that the second rotation fluctuation amount (edltmfh) enters a rotation fluctuation state that satisfies the following mathematical expression (4).

$$\Delta N2\text{-}2 \times \beta \geq \Delta N2\text{-}1 \qquad (4)$$

Here, $\Delta N2\text{-}2$ is the second rotation fluctuation amount calculated in the expansion stroke of the second cylinder #2, that is, the second rotation fluctuation amount calculated in the expansion stroke of the misfire determination target cylinder. In addition, $\Delta N2\text{-}1$ is the second rotation fluctuation amount calculated in the expansion stroke of the first cylinder #1, that is, the second rotation fluctuation amount of the cylinder that has been in the expansion stroke immediately after the expansion stroke of the misfire determination target cylinder. In addition, $\beta$ is a coefficient that is set as a positive-value smaller than "1", and is experimentally or empirically set.

The second misfire determination pattern is used for the rotation fluctuation pattern of the first rotation fluctuation amount (eddtcrx). The first misfire determination pattern corresponds to the rotation fluctuation pattern of the first rotation fluctuation amount (eddtcrx) shown in FIG. 9A. That is, the second misfire determination pattern corresponds to the rotation fluctuation pattern of the first rotation fluctuation amount (eddtcrx) when a misfire has occurred in the second cylinder #2 at the time when a resonance phenomenon is occurring between the engine 1 and the automatic transmission 50 while the lock-up clutch 53f is in the lock-up state. Hereinafter, this will be specifically described.

As shown by the rotation fluctuation pattern of the first rotation fluctuation amount (eddtcrx) shown in FIG. 9A, when a misfire, for example, occurs in the second cylinder #2 (misfire determination target cylinder), there is almost no difference between the first rotation fluctuation amount (eddtcrx=$\Delta N1\text{-}2$) calculated in the expansion stroke of the second cylinder #2 and the first rotation fluctuation amount (eddtcrx=$\Delta N1\text{-}3$) calculated in the expansion stroke of the immediately preceding fourth cylinder #4 (one-ignition-cycle-before cylinder according to the aspect of the invention).

That is, in the existing art, it is determined that no misfire has occurred on the basis of the fact that there is no large difference between the rotation fluctuation amount $\Delta N1\text{-}2$ calculated in the expansion stroke of the second cylinder #2 and the rotation fluctuation amount $\Delta N1\text{-}3$ calculated in the expansion stroke of the immediately preceding fourth cylinder in regard to the first rotation fluctuation amount (eddtcrx). In contrast, in the present embodiment, only when the lock-up clutch 53f is in the lock-up state or the flexible lock-up state, it is determined that a misfire has occurred even with the above rotation fluctuation pattern. That is, in the second misfire determination pattern, a variation in the first rotation fluctuation amount $\Delta N1\text{-}2$ calculated in the expansion stroke of the second cylinder #2 and a variation in the first rotation fluctuation amount $\Delta N1\text{-}3$ in the expansion stroke of the fourth cylinder #4 are smaller than those of the first misfire determination pattern. In other words, the second misfire determination pattern is defined as a pattern that is looser in misfire determination condition than the first misfire determination pattern.

Specifically, the second misfire determination pattern is defined as a rotation fluctuation pattern such that the first rotation fluctuation amount (eddtcrx) enters a rotation fluctuation state that satisfies the following mathematical expression (5).

$$\Delta N1\text{-}2 \times \gamma \geq \Delta N1\text{-}3 \qquad (5)$$

Here, $\Delta N1\text{-}2$ is the first rotation fluctuation amount calculated in the expansion stroke of the second cylinder #2, that is, the first rotation fluctuation amount calculated in the expansion stroke of the misfire determination target cylinder. In addition, $\Delta N1\text{-}3$ is the first rotation fluctuation amount calculated in the expansion stroke of the fourth cylinder #4, that is, the first rotation fluctuation amount in a cylinder that has been in the expansion stroke immediately before the expansion stroke of the misfire determination target cylinder. In addition, $\gamma$ is a coefficient that is set as a positive value smaller than "1", and is experimentally or empirically set.

In this way, as the second misfire determination pattern is defined, the second misfire determination pattern may be distinctly differentiated from the rotation fluctuation pattern at the time when no resonance phenomenon is occurring in the lock-up state as shown in FIG. 8A and FIG. 8B.

Note that the second misfire determination pattern may be defined as a rotation fluctuation pattern such that the first rotation fluctuation amount (eddtcrx) enters a rotation fluctuation state that satisfies the following mathematical expression (6) in addition to the pattern defined by the mathematical expression (5).

$$\Delta N1\text{-}2 \geq \Delta N1\text{-}1 \qquad (6)$$

That is, the second misfire determination pattern is established when there is no large difference between the rotation fluctuation amount $\Delta N1\text{-}2$ calculated in the expansion stroke of the second cylinder #2 and the rotation fluctuation amount $\Delta N1\text{-}3$ calculated in the expansion stroke of the immediately preceding fourth cylinder #4 and when the rotation fluctuation amount $\Delta N1\text{-}1$ calculated in the expansion stroke of the immediately following first cylinder #1 is smaller by a predetermined amount or more than the rotation fluctuation amount $\Delta N1\text{-}2$ calculated in the expansion stroke of the second cylinder #2.

Figure 10:
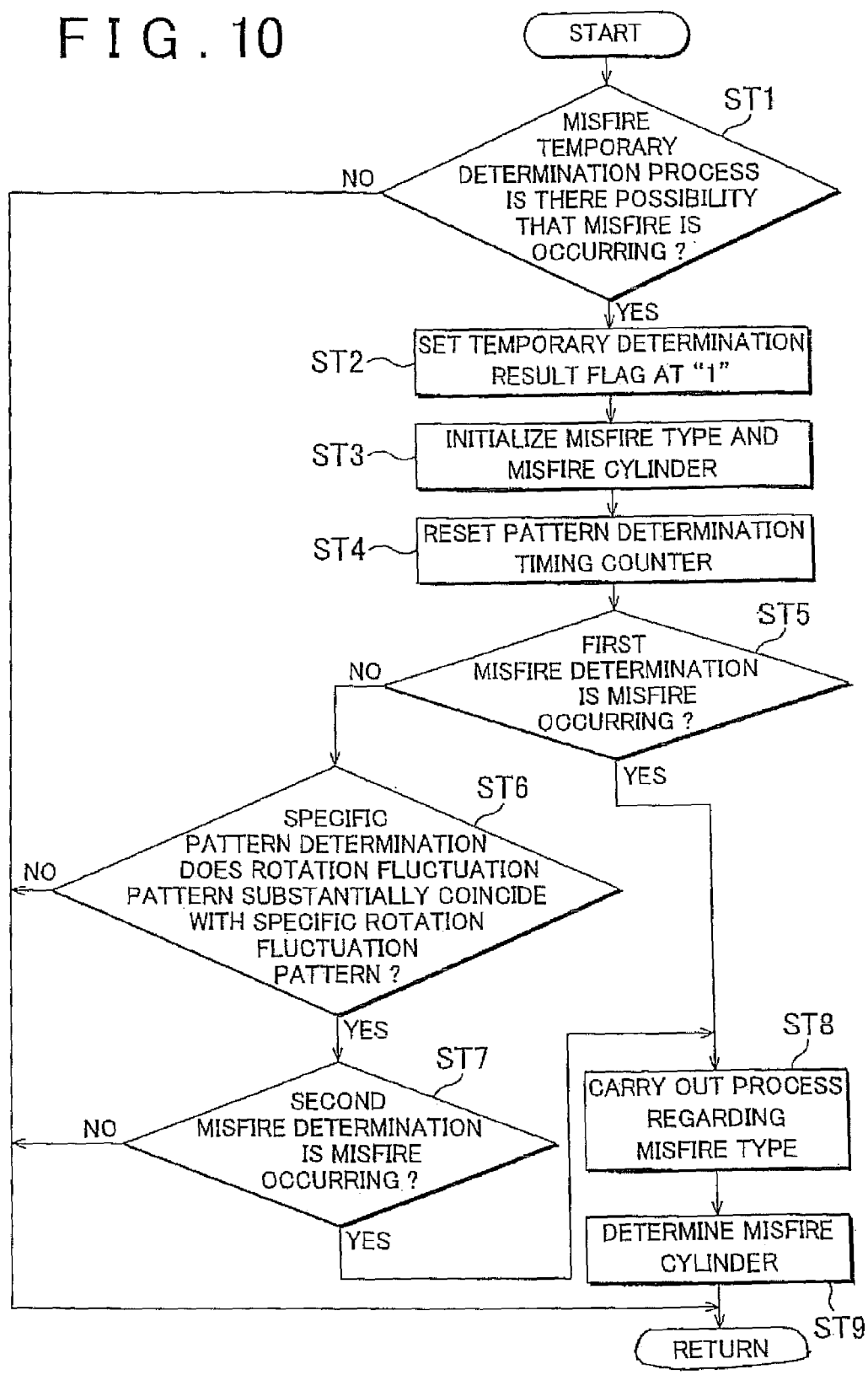
FIG. 10 is a flowchart that shows the steps of a misfire determination process according to the first embodiment and the third embodiment.

Hereinafter, the procedure of the misfire determination process according to the present embodiment will be described with reference to the flowchart shown in FIG. 10. The control routine shown in FIG. 10 is repeatedly executed by the engine controller 40, for example, each revolution of the crankshaft 10 or at predetermined time intervals (for example, every several milliseconds).

Note that the process is executed when the precondition for misfire determination (misfire detection) is satisfied. Through the determination based on the precondition, it is determined whether there is no possibility that the engine rotational speed NE excessively varies because of a factor other than occurrence of a misfire and it is possible to accurately detect a variation in engine rotational speed NE associated with occurrence of a misfire. Note that the precondition, for example, includes a condition that a predetermined period of time has elapsed since activation or deactivation of an air conditioner was switched, a condition that a predetermined period of time has elapsed since a shift lever was operated, and the like.

Then, in a state where the precondition is satisfied, a misfire temporary determination process is executed in step ST1. The misfire temporary determination process determines whether there is a possibility that a misfire has occurred in any of the cylinders. Specifically, as described above, it is determined whether the second rotation fluctuation amount (edltmfh) of the engine 1 exceeds a threshold (N1) in the expansion stroke of a cylinder, and, when the second rotation fluctuation amount (edltmfh) exceeds the threshold (N1), it is determined that there is a possibility that a misfire has occurred in the cylinder that has been in the expansion stroke (misfire determination target cylinder).

In step ST1, when it is determined that the second rotation fluctuation amount (edltmfh) does not exceed the threshold (N1) and there is no possibility that a misfire has occurred (negative determination is made in step ST1), the routine directly ends.

On the other hand, when it is determined that the second rotation fluctuation amount (edltmfh) exceeds the threshold (N1) and there is a possibility that a misfire has occurred (affirmative determination is made in step ST1), the process proceeds to step ST2 to set a temporary determination result flag at "1". Then, in step ST3, information regarding a misfire type and a misfire cylinder is initialized. That is, data of the misfire type and misfire cylinder determined in the previous misfire determination process are reset. In addition, in step ST4, a pattern determination timing counter is set at "0". That is, the count value of the pattern determination timing counter used in the previous misfire determination process is reset.

After that, in step ST5, a misfire type determination is executed by the first misfire determination. That is, it is determined whether the rotation fluctuation pattern of the engine 1 substantially coincides with the first misfire determination pattern (which corresponds to the rotation fluctuation pattern of the first rotation fluctuation amount (eddtcrx) shown in FIG. 7A) before and after the expansion stroke of the misfire determination target cylinder, thus determining whether a misfire has occurred.

Then, when the rotation fluctuation pattern of the engine 1 substantially coincides with the first misfire determination pattern, it is determined that a misfire has occurred, and then the process proceeds to step ST8. That is, it is finally determined that a misfire has occurred in the misfire determination process of the routine.

On the other hand, when the rotation fluctuation pattern of the engine 1 does not coincide with the first misfire determination pattern (when it is not determined that a misfire has occurred in the first misfire determination), the process proceeds to step ST6 without finally determining whether a misfire has occurred or no misfire has occurred. In step ST6, it is determined whether the lock-up clutch 53f is in the lock-up state (including the flexible lock-up state) and the rotation fluctuation pattern of the engine 1 substantially coincides with the specific rotation fluctuation pattern that is specific to the lock-up state (specific pattern determination). That is, it is determined whether the rotation fluctuation pattern of the first rotation fluctuation amount (eddtcrx) and the rotation fluctuation pattern of the second rotation fluctuation amount (edltmfh) respectively substantially coincide with the specific rotation fluctuation patterns (which correspond to the rotation fluctuation pattern of the first rotation fluctuation amount (eddtcrx) shown in FIG. 9A and the rotation fluctuation pattern of the second rotation fluctuation amount (edltmfh) shown in FIG. 9B).

In addition, the specific pattern determination additionally requires a condition that no steep variation in engine load is occurring. The above condition, for example, includes a condition that a steep variation in operation amount of the accelerator pedal 18, a shift operation of the automatic transmission 50, a variation in load on auxiliary machines, or the like, are not occurring.

Then, in the specific pattern determination, when the rotation variation patterns of these rotation fluctuation amounts do not coincide with the respective specific rotation fluctuation patterns, it is finally determined that no misfire has occurred in the misfire determination process of the routine. That is, it is determined that the second rotation fluctuation amount (edltmfh) exceeds the threshold (N1) because of a factor, other than a misfire, such as running on a bad road, to finally determine that no misfire has occurred.

On the other hand, when the rotation fluctuation patterns of the rotation fluctuation amounts coincide with the respective specific rotation variation patterns and an affirmative determination is made in step ST6, the process proceeds to step ST7. In step ST7, a second misfire determination is executed. The second misfire determination determines whether a misfire has occurred on the basis of whether the rotation fluctuation pattern of the engine 1 substantially coincides with the second misfire determination pattern. That is, the second misfire determination pattern is used to determine whether a misfire has occurred. The second misfire determination pattern is defined so that a variation in the first rotation fluctuation amount calculated in the expansion stroke of the misfire determination target cylinder and a variation in the first rotation fluctuation amount calculated in the expansion stroke of the immediately preceding cylinder are smaller than those of the first misfire determination pattern.

Then, in the second misfire determination, when it is determined that the rotation fluctuation pattern does not coincide with the second misfire determination pattern (which corresponds to the rotation fluctuation pattern of the first rotation fluctuation amount (eddtcrx) shown in FIG. 9A) (when a negative determination is made in step ST7), it is finally determined that no misfire has occurred in the misfire determination process of the routine. That is, it is determined that the second rotation fluctuation amount (edltmfh) exceeds the threshold (N1) because of a factor, other than a misfire, such as running on a bad road, to finally determine that no misfire has occurred.

On the other hand, in the second misfire determination, when it is determined that the rotation fluctuation pattern substantially coincides with the second misfire determination pattern (when an affirmative determination is made in step ST7), it is finally determined that a misfire has occurred as a misfire determination, and then the process proceeds to step ST8. That is, it is finally determined that a misfire has occurred in the misfire determination process of the routine.

After it is finally determined that a misfire has occurred in step ST5 or in step ST7, the process regarding misfire type is carried out in step ST8. Specifically, the count value of the total misfire counter 41 is incremented, and the count value of a detection counter (1000 rev counter) is incremented. In this case, when the count value of the detection counter exceeds a predetermined value (for example, 1000) and the count value of the total misfire counter 41 also exceeds a predetermined value (for example, 30), it is determined that occurrence of a misfire is detected at a frequency larger than a predetermined number of times within a total detection number of times, and it is understood that a misfire has occurred at a frequency that may possibly cause deterioration of exhaust emission, degradation of the catalyst 12, and the like. Thus, the MIL (warning lamp) lights up to warn the driver. In addition, a misfire cylinder is identified in step ST9, and the count value of the cylinder-by-cylinder misfire counter 42 corresponding to that cylinder is incremented. Then, the misfire occurrence information and the misfire occurrence cylinder information are written into a diagnosis provided for the engine controller 40.

As described above, according to the present embodiment, the following advantageous effects may be obtained. When the rotation fluctuation pattern of the engine 1 coincides with the first misfire determination pattern, it is determined that a misfire has occurred in the non-lock-up state of the lock-up clutch 53f. On the other hand, when the rotation fluctuation pattern of the engine 1 does not coincide with the first misfire determination pattern, a misfire determination is executed on the basis of the second misfire determination pattern (misfire determination pattern defined as a pattern that is looser in misfire determination condition than the first misfire determination pattern) under the condition that the rotation fluctuation pattern of the engine 1 coincides with the specific rotation fluctuation pattern. When the rotation fluctuation pattern of the engine 1 coincides with the second misfire determination pattern, it is determined that a misfire has occurred in the lock-up state of the lock-up clutch 53f.

As a result, in a state where the lock-up clutch 53f is in the lock-up state, when a resonance phenomenon is occurring between the engine 1 and the automatic transmission 50, in the existing art, because of a rotation fluctuation that is reduced by the influence of the resonance, it is highly likely that occurrence of a misfire cannot be detected. However, according to the present embodiment, the specific rotation fluctuation pattern and the second misfire determination pattern are used to make it possible to detect occurrence of a misfire. In this way, occurrence of a misfire is accurately determined without receiving an adverse influence of the resonance phenomenon, so it is possible to improve reliability of misfire determination.

In the above described embodiment, the second misfire determination pattern is defined as follows. That is, the second misfire determination pattern is defined so that the first rotation fluctuation amount $\Delta N1$-2 calculated in the expansion stroke of the second cylinder #2, which is the misfire determination target cylinder, is particularly larger than the rotation fluctuation amount $\Delta N1$-1 calculated in the expansion stroke of the immediately following first cylinder #1, and there is no large difference between the first rotation fluctuation amount $\Delta N1$-2 calculated in the expansion stroke of the second cylinder #2 and the rotation fluctuation amount $\Delta N1$-3 calculated in the expansion stroke of the immediately preceding fourth cylinder. The second misfire determination pattern is not limited to the above, but the second misfire determination pattern may be defined as follows instead.

That is, the second misfire determination pattern is defined so that, when a misfire occurs in the second cylinder #2 (misfire determination target cylinder), the rotation fluctuation amount $\Delta N1$-2 calculated in the expansion stroke of the second cylinder #2 is particularly larger than the rotation fluctuation amount $\Delta N1$-3 calculated in the expansion stroke of the immediately preceding fourth cylinder #4 (one-ignition-cycle-before cylinder according to the aspect of the invention), and there is no large difference between the first rotation fluctuation amount $\Delta N1$-2 calculated in the expansion stroke of the second cylinder #2 and the rotation fluctuation amount $\Delta N1$-1 calculated in the expansion stroke of the immediately following first cylinder #1.

Next, a misfire determination made by a misfire determination device according to the second embodiment will be described. The misfire determination device calculates a duration T1 required for rotation from 0° to 30° crank angle (CA) toward a retardation side with respect to a position 360° CA before using the compression top dead center of each cylinder as a reference, and similarly calculates a duration T2 required for rotation from 90° to 120° CA toward a retardation side. The durations T1 and T2 are respectively durations required for rotating 30° CA corresponding to angles at which a duration required for the crankshaft 10 to rotate 30° CA is estimated to become a local maximum and angles at which a duration required for the crankshaft 10 to rotate 30° CA is estimated to become a local minimum for each ignition.

In addition, a duration T3 required for the crankshaft 10 to similarly rotate from 0° to 30° CA toward a retardation side with respect to a position 360° CA after a position, at which the current piston 3 of the cylinder which is a calculation target for the durations T1 and T2 reaches the top dead center, is calculated, and a duration T4 required for the crankshaft 10 to rotate from 90° to 120° CA toward a retardation side with respect to the above position is calculated. These durations T3 and T4 are also respectively durations required for rotating 30° CA corresponding to angles at which a duration required for the crankshaft 10 to rotate 30° CA is estimated to become a local maximum and angles at which a duration required for the crankshaft 10 to rotate 30° CA is estimated to become a local minimum for each ignition.

Then, a rotation fluctuation amount $\Delta NE0$ is calculated by the following mathematical expression on the basis of these durations T1, T2, T3, and T4.

$$\Delta NE0 = (T4 - T3) - (T2 - T1) \quad (7)$$

By so doing, it is possible to calculate a rotation fluctuation amount that reflects a difference between a rotational speed in the cylinder that is currently in the expansion stroke and a rotational speed in a cylinder (cylinder two ignition cycles before in ignition timing) that has been in the expansion stroke at a side advanced by 360°.

As a misfire occurs in any of the cylinders and then the engine rotational speed decreases, a duration required for the crankshaft 10 to rotate a certain crank angle elongates. That is, the value of (T4−T3) is larger than the value of (T2−T1) in the mathematical expression (7). Then, a duration required for the crankshaft 10 to rotate a certain crank angle in the expansion stroke of each cylinder is detected, and the length of each duration required is substituted into the mathematical expression (7). Then, it is determined whether there is a possibility that a misfire has occurred on the basis of the calculated rotation fluctuation amount $\Delta NE0$, and the determined result is used for misfire determination, which will be described later.

In addition, the misfire determination device, in regard to the rotation fluctuation amount calculated through the mathematical expression (7), uses the currently calculated rotation fluctuation amount (at the time when a determination as to whether a misfire has occurred is started) as $\Delta NE0$, the rotation fluctuation amount calculated one ignition cycle before the current ignition timing (rotation fluctuation amount calculated in the expansion stroke of the cylinder one ignition cycle before in ignition timing) as $\Delta NE1$, the rotation fluctuation amount calculated two ignition cycles before as $\Delta NE2$ and the rotation fluctuation amount calculated three ignition cycles before as $\Delta NE3$, and it is determined on the basis of the variation pattern of these rotation fluctuation amounts whether a misfire has occurred. The determination will be specifically described later.

Note that in the present embodiment, as described above, because a difference (rotation fluctuation amount) $\Delta NE0$ in duration in a cylinder of which the crank angle is shifted by 360° in phase is calculated, even when there is a manufacturing error in an NE rotor, the above calculation is executed on the basis of detection of the same external tooth. Thus, the rotation fluctuation amount $\Delta NE0$ does not receive the influence of a manufacturing error of the NE rotor, so it is possible to accurately calculate the rotation fluctuation amount $\Delta NE0$.

The present embodiment has such a feature that the rotation fluctuation pattern for misfire determination (misfire determination pattern) is varied between when the lock-up clutch 53f is in the lock-up state (including the flexible lock-up state) and when the lock-up clutch 53f is in the non-lock-up state (released state). That is, the rotation fluctuation pattern for misfire determination is varied between when the operating state falls within the engaged area (lock-up operation area) or the slipped area (flexible lock-up operation area) that are set on the basis of the vehicle speed V and the accelerator operation amount θTH and when the operating state falls within the released area (torque-converter operation area).

More specifically, when the lock-up clutch 53f is in the non-lock-up state, a misfire determination is made on the basis of whether the rotation fluctuation pattern of the engine 1 coincides with the first rotation fluctuation pattern that is specific to occurrence of a misfire in the non-lock-up state, whereas, when the lock-up clutch 53f is in the lock-up state, a misfire determination is made on the basis of whether the rotation fluctuation pattern of the engine 1 coincides with the second rotation fluctuation pattern specific to occurrence of a misfire in the lock-up state (misfire determination made by the misfire determination device). Then, the second rotation fluctuation pattern is smaller in rotation fluctuation width than the first rotation fluctuation pattern. That is, a misfire determination condition is looser when the lock-up clutch 53f is in the lock-up state than when the lock-up clutch 53f is in the non-lock-up state, by which it is possible to determine that a misfire has occurred even when the rotation fluctuation width is small.

In the above determination, when, among the rotation fluctuation amounts $\Delta NE0$ to $\Delta NE3$ (one cycle of the temporal variation pattern in the determination), particularly, the rotation fluctuation amount $\Delta NE2$ that is two ignition cycles before (at the time when the cylinder that has been in the expansion stroke two ignition cycles before in ignition timing from the cylinder that has been in the expansion stroke at the time when the rotation fluctuation amount $\Delta NE0$ is calculated, which is a determination start timing) is larger than or equal to a predetermined value (threshold) N1 (when a misfire determination is made for the cylinder, which has been in the expansion stroke at the time when the rotation fluctuation amount of the engine 1 exceeds a predetermined threshold, as a misfire determination target cylinder), a determination as to whether a misfire has occurred is made on the basis of the relationship among the rotation fluctuation amounts $\Delta NE0$ to $\Delta NE3$.

Note that the predetermined value N1 is calculated, for example, through a map as a value that is smaller as the engine rotational speed NE increases. This is because the following reason. Usually, as the engine rotational speed NE increases, the durations T1 to T4 are calculated as short periods of time accordingly. Therefore, the rotation fluctuation amount $\Delta NE$ calculated on the basis of the mathematical expression (7) is also calculated as a smaller value. Then, by calculating the predetermined value N1 as a value that is smaller as the engine rotational speed NE increases, the influence of a variation in engine rotational speed NE is removed as much as possible, and then it is possible to make a determination.

In addition, the predetermined value N1 is similarly calculated, for example, through a map as a value that is larger as the intake pipe pressure PM increases. This is because the following reason. In the control of the engine 1, usually, as the intake pipe pressure increases, larger amount of fuel is injected from the injectors 9. Thus, as the intake pipe pressure PM increases, a firing pressure of an air-fuel mixture in each combustion chamber 4 also increases, and a large driving force is applied to the crankshaft 10 of the engine 1. By so doing, when the intake pipe pressure PM is high, the local minimum-side durations T2 and T4 are respectively calculated as further shorter durations as compared with when the pressure PM is low, and the rotation fluctuation amount $\Delta NE$ calculated on the basis of the mathematical expression (7) is calculated as a larger value. Then, by calculating the predetermined value N1 as a value that is larger as the intake pipe pressure PM increases, the influence of a variation in intake pipe pressure PM is removed as much as possible, and then it is possible to make a determination.

Hereinafter, a specific rotation fluctuation pattern for misfire determination will be described.

Figure 11:
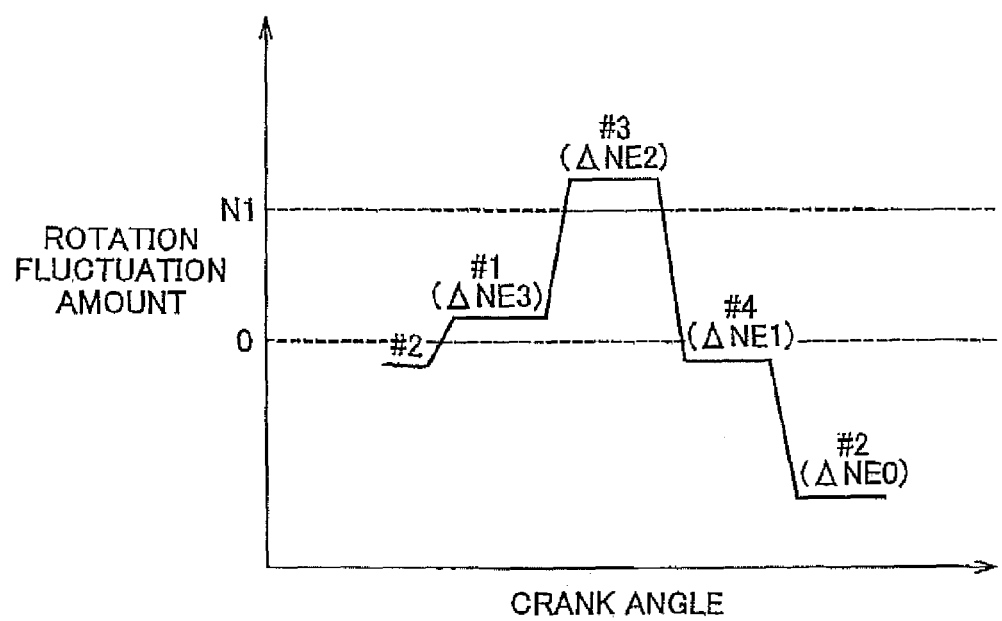
FIG. 11 is a graph that shows an example of a first rotation fluctuation pattern used when the lock-up clutch is in a non-lock-up state according to a second embodiment of the invention.

FIG. 11 shows an example of rotation fluctuation pattern (first rotation fluctuation pattern), which is the relationship among the rotation fluctuation amounts $\Delta NE0$ to $\Delta NE3$ when a misfire occurs while the lock-up clutch 53f is in the non-lock-up state. That is, when the lock-up clutch 53f is in the non-lock-up state, occurrence of a misfire (in this case, occurrence of a misfire in the third cylinder #3) is determined on the basis of whether the rotation fluctuation pattern coincides with the rotation fluctuation pattern shown in FIG. 11.

Figure 12:
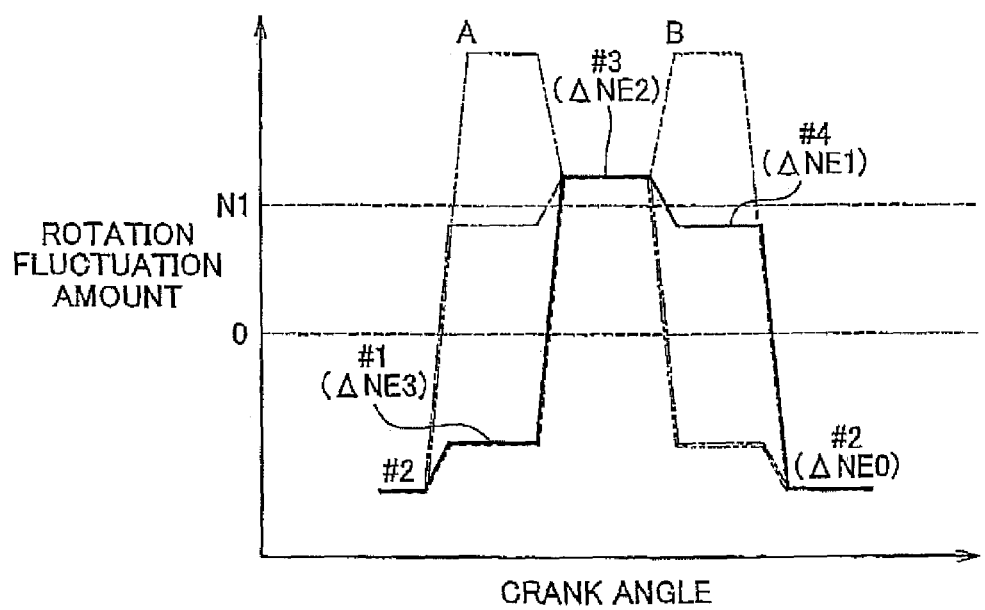
FIG. 12 is a graph that shows an example of a second rotation fluctuation pattern used when the lock-up clutch is in a lock-up state or in a flexible lock-up state according to the second embodiment of the invention.

In addition, the solid line shown in FIG. 12 shows an example of a rotation fluctuation pattern (second rotation fluctuation pattern) of the relationship among the rotation fluctuation amounts $\Delta NE0$ to $\Delta NE3$ when a misfire occurs while the lock-up clutch 53f is in the lock-up state. That is, when the lock-up clutch 53f is in the lock-up state, occurrence of a misfire (in this case as well, occurrence of a misfire in the third cylinder #3) is determined on the basis of whether the rotation fluctuation pattern coincides with the rotation fluctuation pattern shown in FIG. 12.

As shown in FIG. 11 and FIG. 12, in the present embodiment, when the first cylinder is denoted by #1 and, similarly, the second to fourth cylinders are respectively denoted by #2 to #4, ignition to an air-fuel mixture in each cylinder is performed in the sequence of #1, #3, #4, and #2.

Then, the variation pattern (temporal variation pattern) of the rotation fluctuation amounts $\Delta NE0$ to $\Delta NE3$ when a misfire has occurred while the lock-up clutch 53f is in the non-lock-up state shows the following tendency.

That is, as shown in FIG. 11, for example, when a misfire occurs in the two-ignition-cycle-before third cylinder #3 (misfire determination target cylinder), the rotation variation $\Delta NE2$ calculated in the expansion stroke of the third cylinder #3 is particularly larger than the rotation fluctuation amount $\Delta NE3$ calculated in the expansion stroke of the immediately preceding first cylinder #1 (one-ignition-cycle-before cylinder according to the aspect of the invention) and the rotation fluctuation amount $\Delta NE1$ calculated in the expansion stroke of the immediately following fourth cylinder #4 (one-ignition-cycle-after cylinder according to the aspect of the invention). In addition to the above, the rotation fluctuation amount $\Delta NE0$ calculated in the expansion stroke of the current second cylinder #2 (two-ignition-cycle-after cylinder according to the aspect of the invention) and the rotation fluctuation amount ΔNE2 have substantially equal absolute values and reverse in sign.

On the other hand, the variation pattern (temporal variation pattern) of the rotation fluctuation amounts ΔNE0 to ΔNE3 when a misfire occurs while the lock-up clutch 53f is in the lock-up state has the following tendency.

That is, as indicated by the solid line in FIG. 12, for example, when a misfire occurs in the two-ignition-cycle-before third cylinder #3 (misfire determination target cylinder), the rotation fluctuation amount ΔNE2 calculated in the expansion stroke of the third cylinder #3 is particularly larger than the rotation fluctuation amount ΔNE3 calculated in the expansion stroke of the immediately preceding first cylinder #1 (one-ignition-cycle-before cylinder according to the aspect of the invention). In addition, there is no large difference between the rotation fluctuation amount ΔNE2 calculated in the expansion stroke of the third cylinder #3 and the rotation fluctuation amount ΔNE1 calculated in the expansion stroke of the immediately following fourth cylinder #4 (one-ignition-cycle-after cylinder according to the aspect of the invention). In addition to the above, the rotation fluctuation amount ΔNE0 calculated in the expansion stroke of the current second cylinder #2 (cylinder two ignition cycles after according to the aspect of the invention) and the rotation fluctuation amount ΔNE2 have substantially equal absolute value and reverse in sign.

That is, in the existing art, occurrence of a misfire is determined on the basis of a condition that there is no large difference between the rotation fluctuation amount ΔNE2 calculated in the expansion stroke of the third cylinder #3 and the rotation fluctuation amount ΔNE1 calculated in the expansion stroke of the immediately after fourth cylinder #4. In contrast, in the present embodiment, only when the lock-up clutch 53f is in the lock-up state or the flexible lock-up state, it is determined that a misfire has occurred even with the above rotation fluctuation pattern. That is, in the second rotation fluctuation pattern, a variation in the rotation fluctuation amount ΔNE2 calculated in the expansion stroke of the third cylinder #3 and a variation in the rotation fluctuation amount ΔNE1 calculated in the expansion stroke of the fourth cylinder #4 are defined to be smaller than those of the first rotation fluctuation pattern (a variation in the rotation fluctuation amount ΔNE2 calculated in the expansion stroke of the third cylinder #3 and a variation in the rotation fluctuation amount ΔNE1 calculated in the expansion stroke of the fourth cylinder #4 in the first rotation fluctuation pattern).

In the misfire determination device according to the present embodiment, by focusing on that the variation pattern of the rotation fluctuation amounts ΔNE0 to ΔNE3 is different between when a misfire occurs in the lock-up state and when a misfire occurs in the non-lock-up state, in order to determine those occurrences of misfire, the following conditions are prestored in the ROM of the engine controller 40.

$$\Delta NE2 \times A < |\Delta NE0|, \text{ and} \quad (d)$$

$$\Delta NE2 \times B \geqq \Delta NE3, \text{ and} \quad (e)$$

$$\Delta NE2 \times C \geqq \Delta NE1 \quad (f)$$

It is determined that a misfire has occurred in the cylinder (third cylinder #3) of which the rotation fluctuation amount is ΔNE2 when the logical multiplication of these conditions (d) to (f) is satisfied.

Here, the above values A, B and C each are set as a positive constant smaller than "1". These values are defined to be different between values for the case where the lock-up clutch 53f is in the lock-up state or in the flexible lock-up state and values for the case where the lock-up clutch 53f is in the non-lock-up state. For example, for the values A, B and C, values for the case where the lock-up clutch 53f is in the lock-up state or in the flexible lock-up state (values in the second rotation fluctuation pattern) are smaller than values for the case where the lock-up clutch 53f is in the non-lock-up state (values in the first rotation fluctuation pattern).

In this way, the values A, B and C are varied between when the lock-up clutch 53f is in the lock-up state or in the flexible lock-up state and when the lock-up clutch 53f is in the non-lock-up state. Thus, the first rotation fluctuation pattern and the second rotation fluctuation pattern are created, and then occurrence of a misfire is determined on the basis of whether the rotation fluctuation pattern coincides with the first rotation fluctuation pattern when the lock-up clutch 53f is in the non-lock-up state or whether the rotation fluctuation pattern coincides with the second rotation fluctuation pattern when the lock-up clutch 53f is in the lock-up state.

In addition, these constants A to C are calculated on the basis of the engine rotational speed NE. Specifically, the predetermined values A to C are calculated as values that are smaller as the engine rotational speed NE increases. This is because the following reason.

As described above, as the engine rotational speed NE increases, the rotation fluctuation amounts ΔNE0 to ΔNE3 are calculated as smaller values accordingly. Then, by calculating the predetermined values A to C as values that are smaller as the engine rotational speed NE increases, the influence of a variation in the engine rotational speed NE is removed as much as possible, and then the variation pattern of these rotation fluctuation amounts ΔNE0 to ΔNE3 may be compared with the above misfire patterns.

Then, when the logical multiplication of the conditions (d) to (f) is satisfied, the variation pattern of the rotation fluctuation amounts ΔNE0 to ΔNE3 coincides with the misfire pattern, and an increase in rotation fluctuation amount ΔNE2 may be caused by a misfire to determine that there is a possibility that a misfire has occurred.

Furthermore, in the misfire determination device according to the present embodiment, it is determined on the basis of a frequency at which occurrence of a misfire is detected whether a misfire has occurred at a frequency that causes deterioration of exhaust emission or degradation of the catalyst 12. Specifically, when the frequency at which occurrence of a misfire is detected is high, it indicates that a misfire has occurred at a frequency that may cause deterioration of exhaust emission, degradation of the catalyst 12, or the like, and then it is determined to be a misfire abnormality.

Hereinafter, the procedure of a misfire determination process according to the present embodiment will be described with reference to the flowchart shown in FIG. 13 and FIG. 14. The control routine shown in FIG. 13 and FIG. 14 are repeatedly executed by the engine controller 40, for example, each 180° CA rotation of the crankshaft 10 (in the case of the four-cylinder engine).

Figure 13:
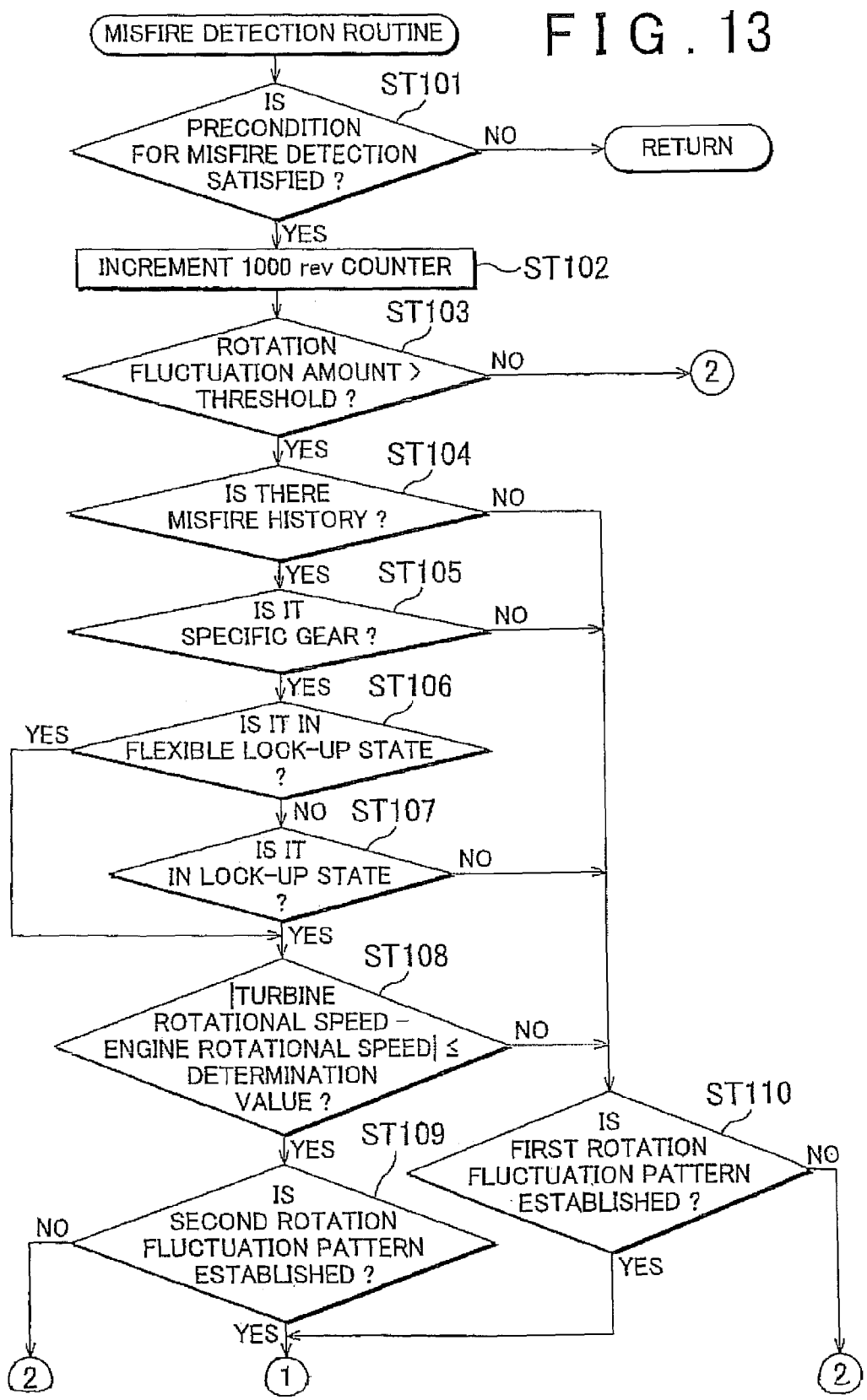
FIG. 13 is a flowchart that shows part of the steps of a misfire determination process executed by the misfire determination device according to the second embodiment of the invention.
Figure 14:
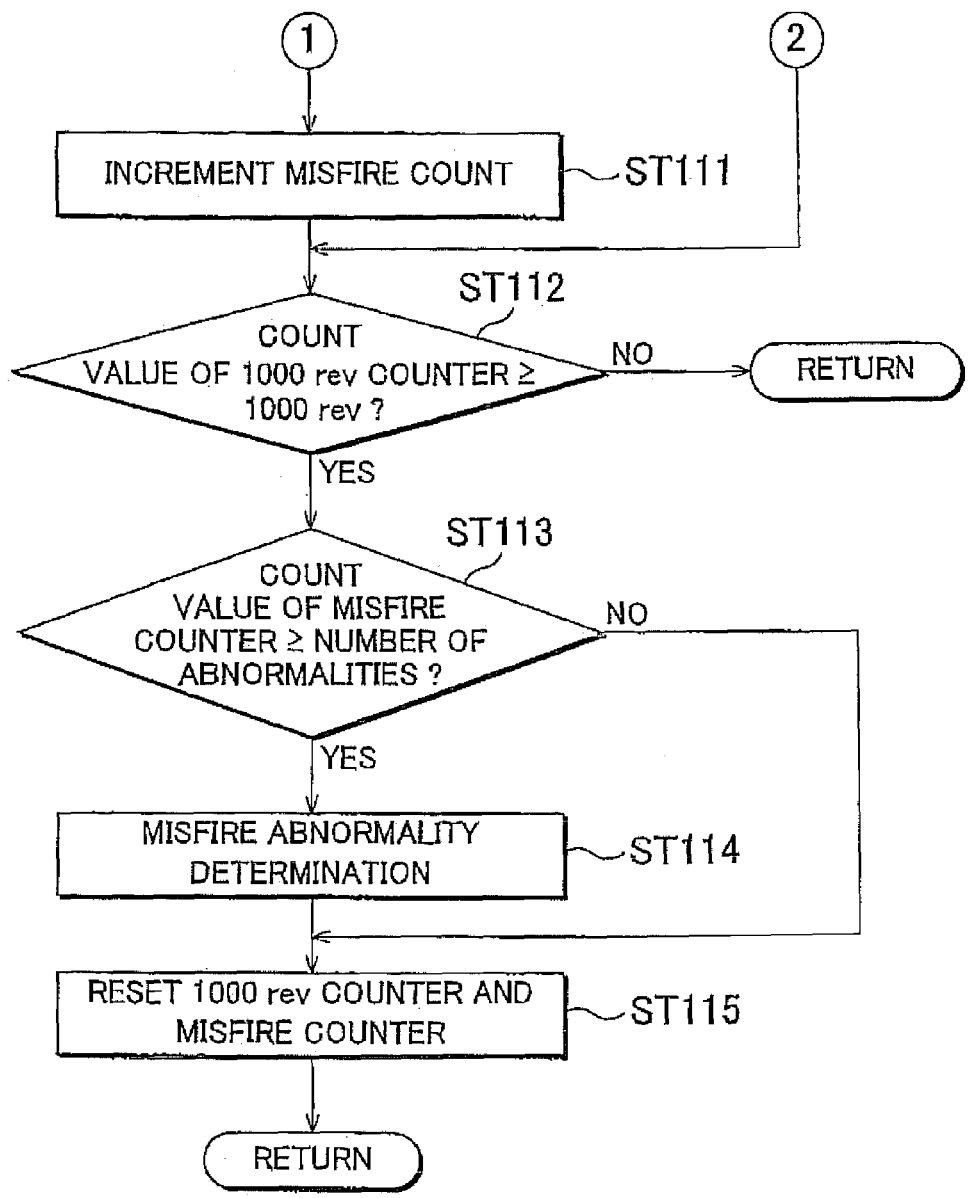
FIG. 14 is a flowchart that shows another part of the steps of the misfire determination process executed by the misfire determination device according to the second embodiment of the invention.

As shown in FIG. 13 and FIG. 14, in this process, first, it is determined whether the precondition for misfire determination (misfire detection) is satisfied (step ST101). Through the determination based on the precondition, it is determined whether there is no possibility that the engine rotational speed NE excessively varies because of a factor other than occurrence of a misfire and it is possible to accurately detect a variation in engine rotational speed NE associated with occurrence of a misfire. Note that the precondition, for example, includes a condition that a predetermined period of time has elapsed since activation or deactivation of an air conditioner was switched, a condition that a predetermined period of time has elapsed since a shift lever was operated, and the like.

Then, when it is determined that the precondition is not satisfied (a negative determination is made in step ST101), the engine 1 is currently placed under the condition that a variation in engine rotational speed NE cannot be determined accurately, so the process once ends.

On the other hand, when it is determined that the precondition is satisfied (an affirmative determination is made in step ST101), the count value of the detection counter (1000 rev counter) is incremented (step ST102). The count value is used as a total determination number that is a calculation reference of the frequency at which occurrence of a misfire is detected at the time of a misfire abnormality determination, which will be described later.

After that, the threshold N1 is calculated on the basis of the engine rotational speed NE and the intake pipe pressure PM through a map, and then it is determined whether the rotation fluctuation amount ΔNE calculated in the above described configuration is larger than the threshold N1 (step ST103). Note that the map used in the above calculation is a map used to calculate the predetermined value N1 on the basis of the engine rotational speed NE and the intake pipe pressure PM, and the relationship among these engine rotational speed NE, the intake pipe pressure PM and the predetermined value N1 is, for example, experimentally obtained and then set. In addition, the map is also prestored in an appropriate memory of the engine controller 40.

Then, when it is determined that the rotation fluctuation amount ΔNE is larger than the predetermined value N1 (an affirmative determination is made in step ST103), the process proceeds to step ST104. In step ST104, it is determined whether there is a history of occurrence of a misfire in the cylinder for which it is determined that there is a possibility that a misfire has occurred because it is determined that the rotation fluctuation amount ΔNE is larger than the predetermined value N1. That is, it is determined whether there is a history in which the rotation fluctuation amount ΔNE of that cylinder has exceeded the predetermined value N1 in the previous combustion stroke. Then, when there is no history of occurrence of a misfire and a negative determination is made in step ST104, the process proceeds to step ST110. On the other hand, when there is a history of occurrence of a misfire and an affirmative determination is made in step ST104, the process proceeds to step ST105.

In step ST105, it is determined whether the current shift position (gear) of the automatic transmission 50 is a predetermined specific gear. The specific gear is a gear at which a resonance phenomenon may possibly occur between the engine 1 and the automatic transmission 50 when the lock-up clutch 53f is in the lock-up state. That is, it is determined whether the vehicle is currently running at a gear at which the resonance phenomenon may possibly occur. The resonance phenomenon between the engine 1 and the automatic transmission 50 occurs when a misfire occurs in a state where the automatic transmission 50 is set to a specific gear and the engine rotational speed is a specific engine rotational speed (for example, in a state where the gear is a second gear and the engine rotational speed is 4000 rpm, in a state where the gear is a third gear and the engine rotational speed is 3500 rpm, or the like). Then, the gear at which the resonance phenomenon occurs varies depending on the specific frequencies, or the like, of the engine 1 and automatic transmission 50. That is, the gear at which the resonance phenomenon occurs varies depending on a vehicle type. Thus, the specific gear set here is experimentally obtained in advance and stored in the ROM.

When the current gear of the automatic transmission 50 is not the specific gear and a negative determination is made in step ST105, the process proceeds to step ST110. On the other hand, when the current gear of the automatic transmission 50 is the specific gear, the process proceeds to step ST106.

In step ST106, it is determined whether the lock-up clutch 53f is in the flexible lock-up state. Specifically, it is determined whether the flexible lock-up flag is "1". When the lock-up clutch 53f is not in the flexible lock-up state and a negative determination is made in step ST106, the process proceeds to step ST107. On the other hand, when the lock-up clutch 53f is in the flexible lock-up state and an affirmative determination is made in step ST106, the process proceeds to step ST108.

In step ST107, it is determined whether the lock-up clutch 53f is in the lock-up state. Specifically, it is determined whether the lock-up flag is "1". When the lock-up clutch 53f is not in the lock-up state and a negative determination is made in step ST107, the process proceeds to step ST110. On the other hand, when the lock-up clutch 53f is in the lock-up state and an affirmative determination is made in step ST107, the process proceeds to step ST108.

In step ST108, it is determined whether a difference between the turbine rotational speed of the automatic transmission 50 and the engine rotational speed is smaller than or equal to a predetermined determination value. That is, it is checked on the basis of the respective rotational speeds whether the flexible lock-up state or the lock-up state is established. When an affirmative determination is made in step ST108, the process proceeds to step ST109. On the other hand, when a negative determination is made in step ST108, the process proceeds to step ST110.

In step ST109, a misfire determination is made on the basis of the second rotation fluctuation pattern that is used when the lock-up clutch 53f is in the flexible lock-up state or in the lock-up state. Specifically, it is determined whether the rotation fluctuation pattern coincides with the second rotation fluctuation pattern shown in FIG. 12, and when the rotation fluctuation pattern of the engine 1 coincides with the second rotation fluctuation pattern, an affirmative determination is made in step ST109 and then the process proceeds to step ST111.

On the other hand, when a negative determination is made in any one of steps ST104, ST105, ST107 and ST108, the lock-up clutch 53f is not in the lock-up state or in the flexible lock-up state, and then the process proceeds to step ST110.

In step ST110, a misfire determination is made on the basis of the first rotation fluctuation pattern that is used when the lock-up clutch 53f is not in the flexible lock-up state or in the lock-up state but in the non-lock-up state. Specifically, it is determined whether the rotation fluctuation pattern coincides with the first rotation fluctuation pattern shown in FIG. 11, and, when the rotation fluctuation pattern of the engine 1 coincides with the first rotation fluctuation pattern, an affirmative determination is made in step ST110 and then the process proceeds to step ST111.

When it is determined in step ST109 or in step ST110 that a misfire has occurred as in the above manner, the count value of the misfire counter is incremented in step ST111, and, after that, the process proceeds to step ST112. In addition, when it is determined that the rotation fluctuation amount ΔNE is smaller than or equal to the threshold N1 (a negative determination is made in step ST103), or when the rotation fluctuation pattern does not belong to any of the above described patterns (the first rotation fluctuation pattern and the second rotation fluctuation pattern) although the rotation fluctuation amount ΔNE exceeds the threshold N1 (a negative determination is made in step ST109 or in step ST110), the process jumps to the processes in step ST112 and the following steps without carrying out count operation of the misfire counter.

Then, in the processes in step ST112 and the following steps, first, it is determined whether the count value of the detection counter (1000 rev counter) is larger than a predetermined count value (for example, 1000) (step ST112). In this determination, it is determined whether a total detection number of times has reached a reference number of times (for example, which corresponds to 1000 revolutions of the crankshaft 10) that is used to determine the frequency at which occurrence of a misfire is detected.

Then, when it is determined that the total detection number of times has reached the reference number of times (an affirmative determination is made in step ST112), subsequently, it is determined whether the count value of the misfire counter is larger than or equal to a predetermined number of abnormalities (for example, 30) (step ST113). That is, in this determination, it is determined whether occurrence of a misfire is detected at a frequency higher than or equal to the predetermined number of times within the total detection number of times.

Then, when it is determined that the count value of the misfire counter is larger than or equal to the predetermine value (number of abnormalities) (an affirmative determination is made in step ST113), a misfire has occurred at the frequency that may possibly cause deterioration of exhaust emission, degradation of the catalyst 12, or the like, and then it is determined as a misfire abnormality (step ST114). In this case, for example, the abnormality determination is, for example, stored as an abnormality history or an abnormality lamp (MIL) is caused to light up. Then, after that, the count value of each counter is reset at "0" (step ST115), and then the process returns.

On the other hand, when it is determined that the count value of the detection counter is smaller than the predetermined value (a negative determination is made in step ST112), it is considered that the total detection number of times has not reached the reference number of times and then the process returns.

In addition, when it is determined that the count value of the misfire counter is smaller than a predetermined value (number of abnormalities) at the time when the count value of the detection counter (1000 rev counter) has reached the predetermined value (a negative determination is made in step ST113), it is considered that the frequency at which occurrence of a misfire is detected is not so high. In this case as well, the respective count values are reset at "0" (step ST115), and then the process returns.

As described above, according to the present embodiment, the following advantageous effects may be obtained.

The variation pattern of the rotation fluctuation amounts $\Delta NE0$ to $\Delta NE3$ is subjected to a misfire determination on the basis of the first rotation fluctuation pattern that is a misfire determination pattern when the lock-up clutch $53f$ is in the non-lock-up state (rotation fluctuation pattern specific to occurrence of a misfire in the non-lock-up state) and the second rotation fluctuation pattern that is a misfire determination pattern when the lock-up clutch $53f$ is in the lock-up state (rotation fluctuation pattern specific to occurrence of a misfire in the lock-up state). Then, the second rotation fluctuation pattern is smaller in rotation fluctuation width than the first rotation fluctuation pattern, and is looser in misfire determination condition than the first rotation fluctuation pattern. Thus, in the lock-up state of the lock-up clutch $53f$, when a resonance is occurring between the engine 1 and the automatic transmission 50, in the existing art, because of a rotation fluctuation that is reduced by the influence of the resonance, it is highly likely that occurrence of a misfire cannot be detected. However, with the misfire determination according to the present embodiment, the specific rotation fluctuation pattern (the second misfire determination pattern) is used to make it possible to detect occurrence of a misfire. In this way, occurrence of a misfire is accurately determined without receiving an adverse influence of the resonance phenomenon, so it is possible to improve reliability of misfire determination.

Next, an alternative embodiment to the second rotation fluctuation pattern will be described. In the above described embodiment, the second rotation fluctuation pattern is defined as follows. That is, the second rotation fluctuation pattern is defined so that the rotation fluctuation amount $\Delta NE2$ calculated in the expansion stroke of the third cylinder #3 that is the misfire determination target cylinder is particularly larger than the rotation fluctuation amount $\Delta NE3$ calculated in the expansion stroke of the immediately preceding first cylinder #1, and there is no large difference between the rotation fluctuation amount $\Delta NE2$ calculated in the expansion stroke of the third cylinder #3 and the rotation fluctuation amount $\Delta NE$ calculated in the expansion stroke of the immediately following fourth cylinder #4. The second rotation fluctuation pattern is not limited to the above, but the second rotation fluctuation pattern may be defined as follows.

That is, as indicated by the alternate long and short dashed lines as a first alternative embodiment in FIG. 12, when a misfire occurs in the third cylinder #3 (misfire determination target cylinder), the second rotation fluctuation pattern is defined so that the rotation fluctuation amount $\Delta NE2$ calculated in the expansion stroke of the third cylinder #3 is particularly larger than the rotation fluctuation amount $\Delta NE1$ calculated in the expansion stroke of the immediately following fourth cylinder (one-ignition-cycle-after cylinder according to the aspect of the invention), and there is no large difference between the rotation fluctuation amount $\Delta NE2$ calculated in the expansion stroke of the third cylinder #3 and the rotation fluctuation amount $\Delta NE3$ calculated in the expansion stroke of the immediately preceding first cylinder #1 (one-ignition-cycle-before cylinder according to the aspect of the invention), and, furthermore, the rotation fluctuation amount $\Delta NE0$ calculated in the expansion stroke of the current second cylinder #2 (two-ignition-cycle-after cylinder according to the aspect of the invention) and the rotation fluctuation amount $\Delta NE2$ have substantially equal absolute values and reverse in sign.

Note that both the second rotation fluctuation pattern according to the above embodiment and the second rotation fluctuation pattern according to the present alternative embodiment may be defined as a rotation fluctuation pattern that indicates that a misfire has occurred in the lock-up state. In this case, in the conditional expressions (d) to (f), the values (values of the second rotation fluctuation pattern) A, B and C for the case where the lock-up clutch $53f$ is in the lock-up state or in the flexible lock-up state may be two types of values, that is, values corresponding to the second rotation fluctuation pattern indicated by the solid line in FIG. 12 and values corresponding to the second rotation fluctuation pattern indicated by the alternate long and short dashed lines in FIG. 12.

In addition, the second rotation fluctuation pattern may be defined as a pattern described below.

That is, as indicated by the alternate long and two short dashed lines as a second alternative embodiment in FIG. 12, when a misfire occurs in the third cylinder #3 (misfire determination target cylinder), the second rotation fluctuation pattern is defined so that the rotation fluctuation amount $\Delta NE2$ calculated in the expansion stroke of the third cylinder #3 is particularly larger than the rotation fluctuation amount ΔNE1 calculated in the expansion stroke of the immediately following fourth cylinder (one-ignition-cycle-after cylinder according to the aspect of the invention), and the rotation fluctuation amount ΔNE3 calculated in the expansion stroke of the first cylinder #1 immediately before the third cylinder #3 (one-ignition-cycle-before cylinder according to the aspect of the invention) is particularly larger than the rotation fluctuation amount ΔNE2 calculated in the expansion stroke of the third cylinder #3 and, furthermore, the rotation fluctuation amount ΔNE0 calculated in the expansion stroke of the current second cylinder #2 (two-ignition-cycle-after cylinder according to the aspect of the invention) and the rotation fluctuation amount ΔNE2 have substantially equal absolute value and reverse in sign. That is, the following conditional expressions are satisfied.

$$\Delta NE3 > \Delta NE2, \text{ and} \tag{g}$$

$$\Delta NE1 < \Delta NE2, \text{ and} \tag{h}$$

$$|\Delta NE0| \approx \Delta NE2 \tag{i}$$

Furthermore, the second rotation fluctuation pattern may be defined as a pattern described below.

That is, as indicated by the broken line as a third alternative embodiment in FIG. 12, when a misfire occurs in the third cylinder #3 (misfire determination target cylinder), the second rotation fluctuation pattern is defined so that the rotation fluctuation amount ΔNE2 calculated in the expansion stroke of the third cylinder #3 is particularly larger than the rotation fluctuation amount ΔNE3 calculated in the expansion stroke of the immediately preceding first cylinder #1 (one-ignition-cycle-before cylinder according to the aspect of the invention), the rotation fluctuation amount ΔNE1 calculated in the expansion stroke of the fourth cylinder #4 immediately after the third cylinder #3 (one-ignition-cycle-after cylinder according to the aspect of the invention) is particularly larger than the rotation fluctuation amount ΔNE2 calculated in the expansion stroke of the third cylinder #3, and furthermore, the rotation fluctuation amount ΔNE0 calculated in the expansion stroke of the current second cylinder #2 (two-ignition-cycle-after cylinder according to the aspect of the invention) and the rotation fluctuation amount ΔNE2 have substantially equal absolute values and reverse in sign. That is, the following conditional expressions are satisfied.

$$\Delta NE3 < \Delta NE2, \text{ and} \tag{j}$$

$$\Delta NE1 > \Delta NE2, \text{ and} \tag{k}$$

$$|\Delta NE0| \approx \Delta NE2 \tag{l}$$

Next, an alternative embodiment in which it is determined whether the vehicle is running on a bad road will be described. In the above embodiment, both the misfire determination when the lock-up clutch 53f is in the non-lock-up state and the misfire determination when the lock-up clutch 53f is in the lock-up state are carried out. In the present alternative embodiment, in addition to the above, when the lock-up clutch 53f is in the lock-up state, it is possible to identify a situation that a misfire has occurred and a situation that the vehicle is running on a bad road. Hereinafter, this will be specifically described.

While the lock-up clutch 53f is in the lock-up state, when the vehicle runs on a bad road, the engine rotational speed steeply varies because of the influence of unevenness of the road, or the like. Thus, the rotation fluctuation increases despite no occurrence of a misfire, so there is a possibility that the rotation variation exceeds the threshold N1 to make an erroneous misfire determination. Therefore, it is necessary to identify whether the factor that the rotation fluctuation exceeds the threshold N1 is due to a misfire or running on a bad road and to increment the misfire counter only when it is due to a misfire.

In the present alternative embodiment, when the rotation fluctuation amount of the engine 1 increases while the lock-up clutch 53f is in the lock-up state, it is determined whether the increase in the rotation fluctuation amount of the engine 1 is due to occurrence of a misfire or running on a bad road. Through the above determination, it is possible to avoid an increment of the misfire counter due to an erroneous misfire determination.

In this determination, when, among the rotation fluctuation amounts ΔNE0 to ΔNE3 (one cycle of the temporal variation pattern in the determination), particularly, the rotation fluctuation amount ΔNE2 calculated two ignition cycles before (at the time when the cylinder that has been in the expansion stroke two ignition cycles before in ignition timing from the cylinder that is in the expansion stroke at the time when the rotation fluctuation amount ΔNE0 is calculated, which is a determination start timing) is larger than or equal to a predetermined value (threshold) N1, it is determined whether the above situation is due to a possibility of a misfire abnormality or due to running on a bad road on the basis of the relationship among the rotation fluctuation amounts ΔNE0 to ΔNE3.

Note that, in the present embodiment as well, the predetermined value N1 is calculated, for example, through a map as a value that is smaller as the engine rotational speed NE increases. The reason is the same as that of the above embodiment. In addition, the predetermined value N1 is calculated, for example, through a map as a value that is larger as the intake pipe pressure PM increases. The reason is also the same as that of the above embodiment.

As described above, in a state where a misfire occurs while the lock-up clutch 53f is in the lock-up state, as shown in FIG. 12, for example, when a misfire occurs in the two-ignition-cycle-before third cylinder #3 (misfire determination target cylinder), the rotation fluctuation amount ΔNE2 calculated in the expansion stroke of the third cylinder #3 is particularly larger than the rotation fluctuation amount ΔNE3 calculated in the expansion stroke of the immediately preceding first cylinder #1 (one-ignition-cycle-before cylinder according to the aspect of the invention). In addition, there is no large difference between the rotation fluctuation amount ΔNE2 calculated in the expansion stroke of the third cylinder #3 and the rotation fluctuation amount ΔNE1 calculated in the expansion stroke of the immediately following fourth cylinder #4 (one-ignition-cycle-after according to the aspect of the invention). In addition to the above, the rotation fluctuation amount ΔNE0 calculated in the expansion stroke of the current second cylinder #2 (two-ignition-cycle-after according to the aspect of the invention) and the rotation fluctuation amount ΔNE2 have substantially equal absolute values and reverse in sign.

On the other hand, when the vehicle runs on a bad road, a large rotation fluctuation amount continues for a relatively long period of time. That is, as shown in an example of the relationship among the rotation fluctuation amounts ΔNE0 to ΔNE3 when the vehicle runs on a bad road in FIG. 15, when the vehicle runs on a bad road, the rotation fluctuation amount ΔNE2 calculated in the expansion stroke of the two-ignition-cycle-before third cylinder #3 does not excessively increase with respect to the rotation fluctuation amount ΔNE3 calculated in the expansion stroke of the immediately preceding first cylinder #1 and the rotation fluctuation amount ΔNE1 calculated in the expansion stroke of the immediately following fourth cylinder #4. In addition, the rotation fluctuation amount ΔNE0 calculated in the expansion stroke of the current second cylinder #2 does not have a high correlation with the rotation fluctuation amount ΔNE2 (the relationship that the absolute values are substantially equal to each other and the values are reverse in sign) unlike the time when a misfire has occurred.

Figure 15:
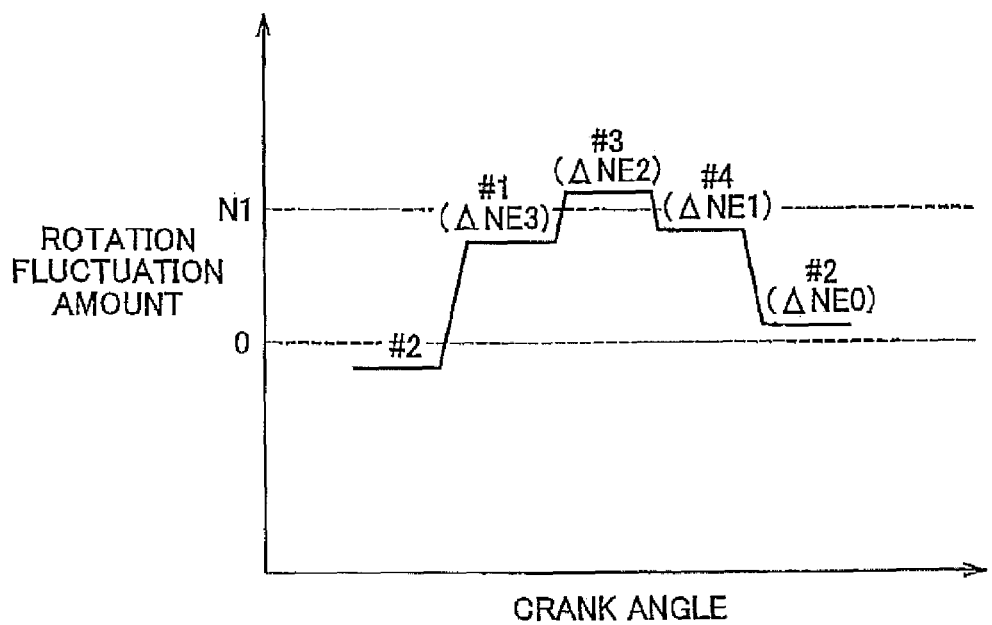
FIG. 15 is a graph that shows an example of the variation pattern of a rotation fluctuation amount of the internal combustion engine while running on a bad road.

In addition, the bad road pattern is not limited to the one shown in FIG. 15; when the rotation fluctuation amount ΔNE2 calculated in the expansion stroke of the third cylinder #3 exceeds the threshold N1, and when it is detected that the rotation fluctuation amount ΔNE1 calculated in the expansion stroke of the immediately following fourth cylinder #4 exceeds the rotation fluctuation amount ΔNE2, it may be determined that the vehicle runs on a bad road.

In the misfire determination device according to the present embodiment, by focusing on that the variation pattern of the rotation fluctuation amounts ΔNE0 to ΔNE3 is different between when a misfire occurs in the lock-up state and when the vehicle runs on a bad road, in order to determine those situations, the following conditions are prestored in the ROM of the engine controller 40.

That is, the following conditions (misfire pattern) are predetermined for determining that the variation pattern of the rotation fluctuation amounts ΔNE0 to ΔNE3 coincides with the variation pattern at the time when there is a possibility that a misfire has occurred.

$$\Delta NE2 \times A < |\Delta NE0|, \text{ and} \quad (d)$$

$$\Delta NE2 \times B \geqq \Delta NE3, \text{ and} \quad (e)$$

$$\Delta NE2 \times C \geqq \Delta NE1 \quad (f)$$

It is possible to determine that the rotation fluctuation amount ΔNE2 is particularly large when the logical multiplication of these conditions (d) to (f) is satisfied.

In addition, the following conditions (bad road pattern) are predetermined for determining that the variation pattern of the rotation fluctuation amounts ΔNE0 to ΔNE3 coincides with the variation pattern at the time when the vehicle runs on a bad road.

$$-(\Delta NE2 \times D) > \Delta NE0, \text{ or} \quad (m)$$

$$\Delta NE2 \times E \leqq \Delta NE3, \text{ or} \quad (n)$$

$$\Delta NE2 \times F \leqq \Delta NE1 \quad (o)$$

It is possible to determine that a large rotation fluctuation amount continues for a relatively long period of time when the logical addition of these conditions (m) to (o) is satisfied.

Here, the above values A, B, C, D, E and F each are set as a positive constant smaller than "1", and the relationship among them are determined so that A>D, B<E, and C<F. Note that the values A, B and C in the conditions (d) to (f) for misfire determination in the lock-up state are equal to those corresponding to the second rotation fluctuation pattern according to the above described embodiment.

In addition, these constants A to F are calculated on the basis of the engine rotational speed NE. Specifically, the predetermined values A to F are calculated as values that are smaller as the engine rotational speed NE increases. This is because the following reason.

As described above, as the engine rotational speed NE increases, the rotation fluctuation amounts ΔNE0 to ΔNE3 are calculated as smaller values accordingly. Then, by calculating the predetermined values A to F as values that are smaller as the engine rotational speed NE increases, the influence of a variation in the engine rotational speed NE is removed as much as possible, and then the variation pattern of these rotation fluctuation amounts ΔNE0 to ΔNE3 may be compared with the misfire pattern and the bad road pattern.

Then, when the logical multiplication of the conditions (d) to (f) is satisfied, the variation pattern of the rotation fluctuation amounts ΔNE0 to ΔNE3 coincides with the misfire pattern (pattern in which a misfire has occurred in the lock-up state), and an increase in rotation fluctuation amount ΔNE2 may be caused by a misfire to determine that there is a possibility that a misfire has occurred.

On the other hand, when the logical addition of the conditions (m) to (o) is satisfied, the variation pattern of the rotation fluctuation amounts ΔNE0 to ΔNE3 coincides with the bad road pattern, and an increase in rotation fluctuation amount ΔNE2 is caused by running on a bad road to determine that the vehicle is running on a bad road.

In this way, with the misfire determination process according to the present embodiment, it is possible to accurately determine whether an increase in rotation fluctuation of the engine 1 is due to occurrence of a misfire or due to running on a bad road on the basis of a pattern determination based on the prestored misfire occurrence pattern (misfire occurrence pattern in the lock-up state) and the prestored bad road running pattern. Then, only when it is determined that the rotation fluctuation amount ΔNE exceeds the predetermined value N1 because of a misfire of the engine 1, the misfire counter, which will be described later, is incremented. By so doing, it is possible to accurately identify detection of occurrence of a misfire in the non-lock-up state or in the lock-up state and an increase in rotation fluctuation amount associated with running on a bad road.

Next, a misfire determination made by a misfire determination device according to a third embodiment will be described. The misfire determination device utilizes the following rotation fluctuation amount (eddtcrx) and 90° CA rotation duration (edt), which is a value correlated with an engine rotational speed in an expansion stroke in order to determine whether a misfire has occurred.

The rotation fluctuation amount (eddtcrx) is calculated as a value based on a difference between the engine rotational speeds (duration required for rotating a predetermined crank angle) in the respective expansion strokes of a plurality of cylinders (the details of calculation of the rotation fluctuation amount will be described later). On the other hand, the 90° CA rotation duration (edt) is a duration required for rotating by 90° CA (Crank Angle) in the expansion stroke of each cylinder, and is calculated as a value that does not receive the influence of the engine rotational speed in another cylinder (the 90° CA rotation duration will be specifically described later).

The procedure of calculation of the rotation fluctuation amount (eddtcrx) will be described below.

The rotation fluctuation amount (eddtcrx) is a value obtained by subtracting a second difference from a first difference. The first difference is a difference between a duration required for the crankshaft 10 to rotate from a compression top dead center to a bottom dead center by 180° CA in a current cylinder that is currently in the expansion stroke (hereinafter, the duration is referred to as "expansion stroke duration") and the expansion stroke duration of a one-ignition-cycle-before cylinder that has been in the expansion stroke immediately before the current cylinder (180° CA before in ignition timing) (value obtained by subtracting the latter expansion stroke duration from the former expansion stroke duration). The second difference is a difference between the expansion stroke duration of a two-ignitioncycle-before cylinder that has been in the expansion stroke two ignition cycles before the current cylinder (360° CA before in ignition timing) and the expansion stroke duration of a three-ignition-cycle-before cylinder that has been in the expansion stroke immediately before the two-ignition-cycle-before cylinder (three ignition cycles before the current cylinder) (540° CA before in ignition timing) (value obtained by subtracting the latter expansion stroke duration from the former expansion stroke duration).

For example, as shown in FIG. 6, when a combustion stroke is carried out in the sequence of the first cylinder #1, the third cylinder #3, the fourth cylinder #4 and the second cylinder #2 by 180° CA, where the current cylinder that that is currently in the expansion stroke is the second cylinder #2, and where the expansion stroke duration of the second cylinder #2 (expansion stroke duration) is "A", the expansion stroke duration of the fourth cylinder #4 immediately before the second cylinder #2 is "B", the expansion stroke duration of the third cylinder #3 immediately before the fourth cylinder #4 is "C", the expansion stroke duration of the first cylinder #1 immediately before the third cylinder #3 is "D" and furthermore the expansion stroke duration of the second cylinder #2 immediately before the first cylinder #1 is "E", the rotation fluctuation amount (eddtcrx) of the current cylinder (second cylinder #2) is calculated by the following mathematical expression (8).

$$eddtcrx = (A-B) - (C-D) \tag{8}$$

By so doing, the rotation fluctuation amount (eddtcrx) may be calculated for the current cylinder using the rotational speed of the current cylinder (second cylinder #2) and the rotational speeds in three expansion strokes immediately before the current cylinder (respective expansion strokes of the fourth cylinder #4, third cylinder #3 and first cylinder #1).

As a misfire occurs in the cylinder currently in the expansion stroke and thien the engine rotational speed decreases, a duration required for the crankshaft 10 to rotate a certain crank angle elongates. That is, the value of A in the mathematical expression (8) is larger than the value of B, C or D. Then, a duration required for the crankshaft 10 to rotate a certain crank angle (180° CA) in the expansion stroke of each cylinder is detected. The length of the duration is substituted into the mathematical expression (8). It is determined whether there is a possibility that a misfire has occurred in the current cylinder that on the basis of the calculated rotation fluctuation amount (eddtcrx). Then, the determined result is used for the misfire determination, which will be described later.

As described above, the 90° CA rotation duration (edt) is calculated as a value that is an engine rotational speed in the expansion stroke of each cylinder (duration required for rotating a predetermined crank angle) and that does not receive the influence of the engine rotational speed in the expansion stroke of another cylinder.

Specifically, the 90° CA rotation duration (edt) is a value calculated as a duration required for the crankshaft 10 to rotate from the compression top dead center to 90° CA after the compression top dead center in the cylinder that is in the expansion stroke.

Figure 16:
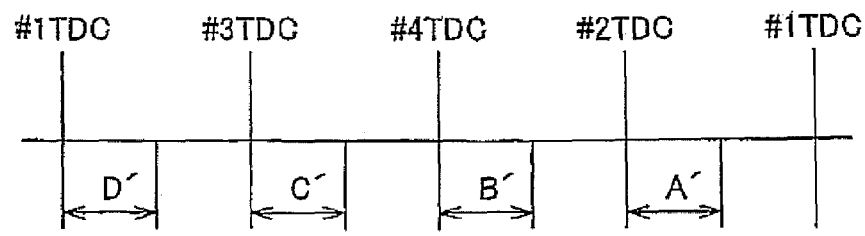
FIG. 16 is a view that shows a sequence of combustion strokes of cylinders and durations required for 90° CA rotation after compression top dead centers in the respective cylinders according to the third embodiment.

For example, as shown in FIG. 16, when a combustion stroke is carried out in the sequence of the first cylinder #1, the third cylinder #3, the fourth cylinder #4 and the second cylinder #2 by 180° CA, a duration required for the crankshaft 10 to rotate from the compression top dead center (TDC) to 90° CA after the compression top dead center in the second cylinder #2 is "A'", a duration required for the crankshaft 10 to rotate from the compression top dead center (TDC) to 90° CA after the compression top dead center in the fourth cylinder #4 is "B'", a duration required for the crankshaft 10 to rotate from the compression top dead center (TDC) to 90° CA after the compression top dead center in the third cylinder #3 is "C'" and a duration required for the crankshaft 10 to rotate from the compression top dead center (TDC) to 90° CA after the compression top dead center in the first cylinder #1 is "D'", the durations A', B', C' and D' are respectively calculated. Specifically, the durations A', B', C' and D' are calculated to measure a duration from time when the crank angle sensor 21 (sensor that outputs a pulse signal at an interval of 30° CA) outputs a pulse signal at the compression top dead center in the expansion stroke of each cylinder until time when the crank angle sensor 21 outputs a pulse signal three times.

Then, for example, when a misfire occurs in the second cylinder #2, the 90° CA rotation duration "A'" is remarkably larger than the other 90° CA rotation durations "B', C' and D'", and, in addition, the 90° CA rotation duration "A'" does not receive the influence of the other 90° CA rotation durations "B', C' and D'".

Note that in calculation of the rotation fluctuation amount (eddtcrx), a duration required for the crankshaft 10 to rotate 180° CA is calculated as the expansion stroke duration, whereas a duration required for the crankshaft 10 to rotate 90° CA as the 90° CA rotation duration (edt) (a rotation angle for calculating the 90° CA rotation duration (edt) is smaller than a rotation angle for calculating the rotation fluctuation amount (eddtcrx)). The reason will be described below.

The 90° CA rotation duration (edt) is used to calculate a rotational speed that does not receive the influence of the rotational speed in the expansion stroke of another cylinder, and it is desirable that a large differential time may be obtained between the cylinder in which a misfire has occurred and the cylinders in which no misfire has occurred. Generally, when combustion is normally carried out in the expansion stroke, the rotational speed of the crankshaft 10 is high from a start of combustion of an air-fuel mixture at the compression top dead center to about 90° CA after the compression top dead center, and then the rotational speed decreases. On the other hand, when a misfire occurs in the expansion stroke, the rotational speed of the crankshaft 10 is low from the compression top dead center to about 90° CA after the compression top dead center, and then the rotational speed is still low thereafter. The rotational speed difference between when a misfire has occurred and when no misfire has occurred is particularly large in a range from the compression top dead center to about 90° CA after the compression top dead center, whereas the rotational speed difference is not so, large in a range from 90° CA after the compression top dead center. That is, the rotational speed difference due to the presence or absence of a misfire most remarkably appears between the compression top dead center and about 90° CA after the compression top dead center. Thus, the rotation angle for calculating the 90° CA rotation duration (edt) is relatively small (between the compression top dead center and 90° CA after the compression top dead center). In contrast, the rotation fluctuation amount (eddtcrx) is calculated as a difference between durations required for the crankshaft 10 to rotate a predetermined CA in the expansion stroke of each cylinder. Thus, as a duration required for the crankshaft 10 to rotate the predetermined CA increases, it is possible to obtain a large difference between a misfire cylinder and non-misfire cylinders. Thus, the rotation angle for calculating the rotation fluctuation amount (eddtcrx) is relatively large.

Next, the procedure of misfire determination executed using the above described rotation fluctuation amount (eddtcrx) and 90° CA rotation duration (edt) will be schematically described. Note that in the following description, the "lock-up state (engaged state) of the lock-up clutch 53*f*" conceptually includes the "flexible lock-up state (half engaged state) of the lock-up clutch 53*f*".

(I) First, it is determined whether the rotation fluctuation amount of the engine 1 exceeds a predetermined threshold (N1), and, when the rotation fluctuation amount exceeds the threshold (N1), it is determined that there is a possibility that a misfire has occurred. Specifically, it is determined whether the rotation fluctuation amount (eddtcrx) exceeds the threshold (N1) in the expansion stroke of a cylinder, and, when the rotation fluctuation amount (eddtcrx) exceeds the threshold (N), it is determined that there is a possibility that a misfire has occurred in the cylinder that has been in the expansion stroke (hereinafter, referred to as misfire determination target cylinder). Note that a value used to determine whether the value exceeds the threshold (N1) in order to determine that there is a possibility that a misfire has occurred is not limited to the rotation fluctuation amount (eddtcrx).

Note that the threshold (N1) is experimentally or empirically set, and is calculated, for example, through a map as a value that is smaller as the engine rotational speed NE increases. This is because the following reason. Usually, as the engine rotational speed NE increases, the expansion stroke durations A to E are calculated as short periods of time accordingly. Thus, the rotation fluctuation amount (eddtcrx) that is calculated on the basis of the mathematical expression (8) is also calculated as a small value. Then, by setting the threshold (N1) as a value that is smaller as the engine rotational speed NE increases, the influence of a variation in engine rotational speed NE is removed as much as possible, and then it is possible to determine whether there is a possibility that a misfire has occurred. In addition, the threshold (N1) may be changed on the basis of an engine load. For example, as the engine load increases, the threshold (N1) is set as a larger value.

(II) When it is determined that there is a possibility that a misfire has occurred in this manner, a first misfire determination in which occurrence of a misfire is determined on the basis of whether the rotation fluctuation pattern of the engine 1 substantially coincides with a predetermined first misfire determination pattern before and after the expansion stroke of the misfire determination target cylinder is made (first misfire determination made by a first misfire determination unit). Specifically, occurrence of a misfire is determined on the basis of whether the rotation fluctuation pattern expressed as a temporal variation in the rotation fluctuation amount (eddtcrx) coincides with the first misfire determination pattern. The details of the first misfire determination pattern will be described later.

(III) Then, in the first misfire determination, when it is determined that a misfire has occurred in the misfire determination target cylinder, it is finally determined that a misfire has occurred as a misfire determination.

On the other hand, in the first misfire determination, when it is determined that there is no misfire, it is determined whether the lock-up clutch 53*f* is in the lock-up state and the 90° CA rotation duration (edt) at the time when the misfire determination target cylinder is in the expansion stroke is longer than a predetermined threshold (T), that is, the engine rotational speed at the time when the misfire determination target cylinder is in the expansion stroke is lower than a predetermined value (engine rotational speed determination, which is executed by an engine rotational speed determination unit).

Note that the threshold (T) is experimentally or empirically set, and is smaller than the threshold (N1). In addition, the threshold (T) is calculated, for example, through a map as a value that is smaller as the engine rotational speed NE increases. This is because the following reason. Usually, as the engine rotational speed NE increases, the 90° CA duration (edt) is calculated as a short period of time accordingly. Then, by setting the threshold (T) as a value that is smaller as the engine rotational speed NE increases, the influence of a variation in engine rotational speed NE is removed as much as possible, and then it is possible to determine whether a misfire has occurred. In addition, the threshold (T) may be changed on the basis of an engine load. For example, as the engine load increases, the threshold (T) is set as a larger value.

In addition, at the same time when it is determined whether the 90° CA rotation duration (edt) is longer than the threshold (T) as described above, it is determined whether, in the cylinder (misfire determination target cylinder) in which the rotation fluctuation amount (eddtcrx) exceeds the threshold (N1), the situation that the rotation fluctuation amount (eddtcrx) exceeds the threshold (N1) has been successively occurring. That is, it is determined whether the rotation fluctuation has been successively occurring in the expansion strokes of the misfire determination target cylinder.

In addition, instead of determining whether a situation that the rotation fluctuation amount (eddtcrx) exceeds the threshold (N1) has been successively occurring, it may be determined whether a situation that the 90° CA rotation duration (edt) at the time when the misfire determination target cylinder is in the expansion stroke is longer than the threshold (T) has been successively occurring.

(IV) Then, when the 90° CA rotation duration (edt) in the expansion stroke of the misfire determination target cylinder is shorter than the predetermined threshold (T), that is, when the crank rotational speed in the expansion stroke is higher than a predetermined threshold, it is finally determined that no misfire has occurred as a misfire determination.

On the other hand, when the 90° CA rotation duration (edt) in the expansion stroke of the misfire determination target cylinder is longer than the predetermined threshold (T) and a situation that the rotation fluctuation amount (eddtcrx) exceeds the threshold (N1) in the misfire determination target cylinder has been successively occurring, occurrence of a misfire is determined on the basis of whether the rotation fluctuation pattern of the engine 1 substantially coincides with the second misfire determination pattern that is different from the first misfire determination pattern before and after the expansion stroke of the misfire determination target cylinder (second misfire determination executed by a second misfire determination unit). Specifically, occurrence of a misfire is determined on the basis of whether the rotation fluctuation pattern expressed as a temporal variation in the 90° CA rotation duration (edt) coincides with the second misfire determination pattern. In the second misfire determination, when it is determined that the rotation fluctuation pattern does not coincide with the second misfire determination pattern, it is finally determined that no misfire has occurred as a misfire determination. On the other hand, in the second misfire determination, when it is determined that the rotation fluctuation pattern substantially coincides with the second misfire determination pattern, it is finally determined that a misfire has occurred as a misfire determination. The details of the second misfire determination pattern will be described later.

Next, the respective misfire determination patterns for the above described misfire determinations will be described.

Figure 17A:
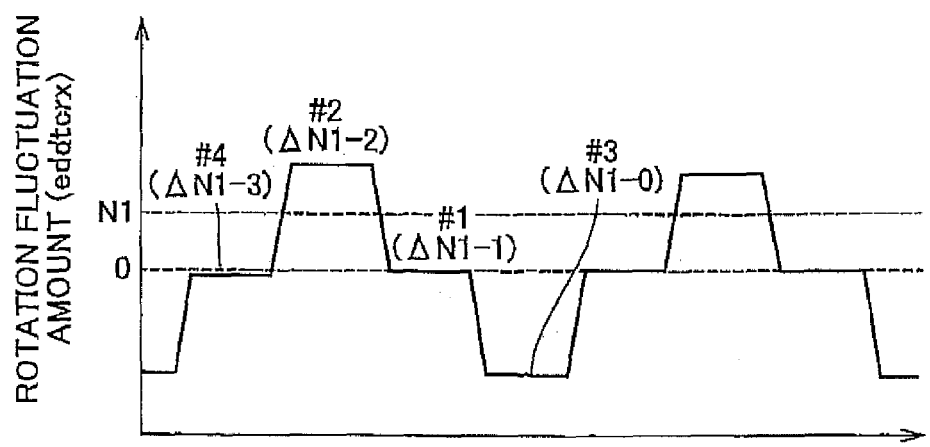
FIG. 17A and FIG. 17B are graphs that show examples of the rotation fluctuation pattern of a rotation fluctuation amount (eddtcrx) and the variation pattern of a 90° CA rotation duration (edt) when a misfire has been successively occurring in the second cylinder while the lock-up clutch is in a non-lock-up state according to the third embodiment.
Figure 17B:
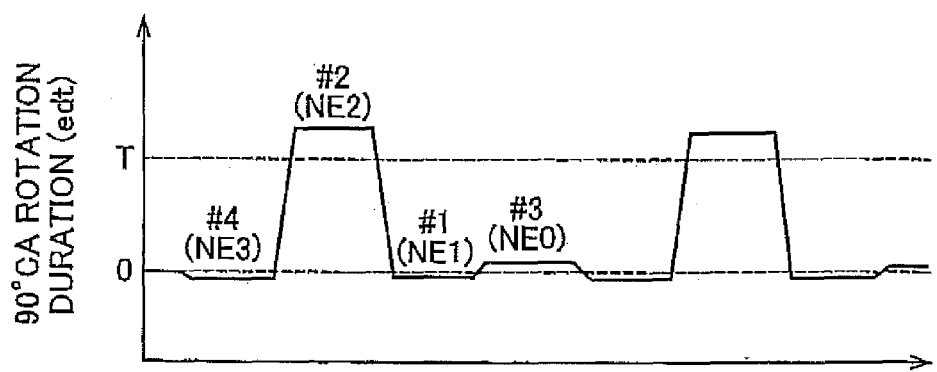

FIG. 17A and FIG. 17B show examples of the rotation fluctuation pattern of the rotation fluctuation amount (eddtcrx) and the fluctuation pattern of a 90° CA rotation duration (edt) when a misfire has been successively occurring in the second cylinder #2 while the lock-up clutch 53*f* is in the non-lock-up state (released state). In addition, the rotation fluctuation pattern of the rotation fluctuation amount (eddtcrx) and the fluctuation pattern of the 90° CA rotation duration (edt) shown in FIG. 17A and FIG. 17B are patterns when a misfire has been successively occurring in the second cylinder #2 while the lock-up clutch 53*f* is in the lock-up state (as described above, including the flexible lock-up state) and no resonance phenomenon is occurring between the engine 1 and the automatic transmission 50.

Figure 18A:
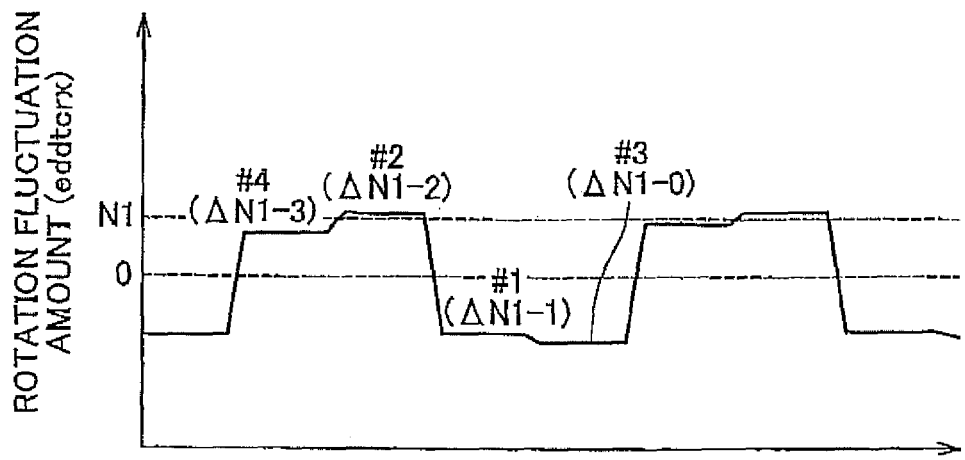
FIG. 18A and FIG. 18B are graphs that show examples of the rotation fluctuation pattern of the rotation fluctuation amount (eddtcrx) and the variation pattern of a 90° CA rotation duration (edt) when a misfire has, been successively occurring in the second cylinder while the lock-up clutch is in a lock-up state and a resonance phenomenon is occurring between the engine and the automatic transmission.
Figure 18B:
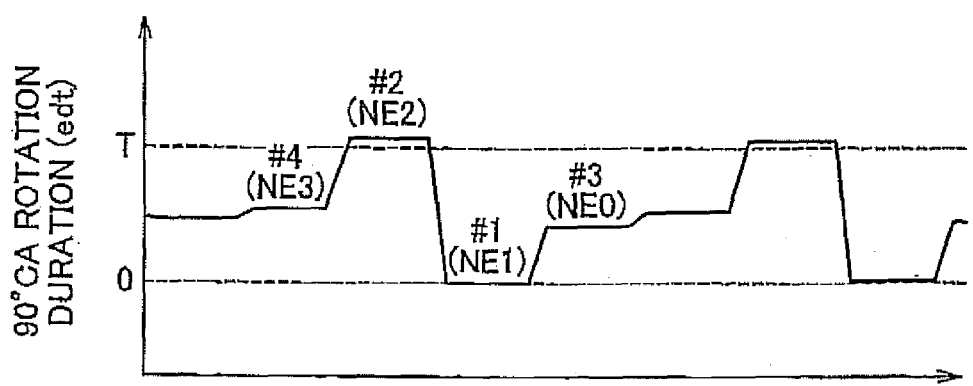

In addition, FIG. 18A and FIG. 18B show examples of the rotation fluctuation pattern of the rotation fluctuation amount (eddtcrx) and the fluctuation pattern of the 90° CA rotation duration (edt) when a misfire has been successively occurring in the second cylinder #2 while the lock-up clutch 53*f* is in the lock-up state (as described above, including the flexible lock-up state) and a resonance phenomenon is occurring between the engine 1 and the automatic transmission 50.

In the waveforms shown in FIG. 17A and FIG. 18A, $\Delta N1\text{-}0$ is the rotation fluctuation amount in the expansion stroke of the third cylinder #3, $\Delta N1\text{-}1$ is the rotation fluctuation amount in the expansion stroke of the first cylinder #1, $\Delta N1\text{-}2$ is the rotation fluctuation amount in the expansion stroke of the second cylinder #2, and $\Delta N1\text{-}3$ is the rotation fluctuation amount in the expansion stroke of the fourth cylinder #4. That is, a variation in the rotation fluctuation amount in accordance with the sequence of $\Delta N1\text{-}3$, $\Delta N1\text{-}2$, $\Delta N1\text{-}1$, $\Delta N1\text{-}0$, $\Delta N1\text{-}3$, . . . is the rotation fluctuation pattern of the rotation fluctuation amount (eddtcrx).

Similarly, in the waveforms shown in FIG. 17B and FIG. 18B, NE0 is the 90° CA rotation duration in the expansion stroke of the third cylinder #3, NE1 is the 90° CA rotation duration in the expansion stroke of the first cylinder #1, NE2 is the 90° CA rotation duration in the expansion stroke of the second cylinder #2, and NE3 is the 90° CA rotation duration in the expansion stroke of the fourth cylinder #4. That is, a variation in the 90° CA rotation duration in accordance with the sequence of NE3, NE2, NE1, NE0, . . . is the fluctuation pattern of the 90° CA rotation duration (edt).

The first misfire determination pattern is used for the rotation fluctuation pattern of the rotation fluctuation amount (eddtcrx). The first misfire determination pattern corresponds to the rotation fluctuation pattern of the rotation fluctuation amount (eddtcrx) shown in FIG. 17A. That is, the first misfire determination pattern corresponds to the rotation fluctuation pattern of the rotation fluctuation amount (eddtcrx) when a misfire occurs while the lock-up clutch 53*f* is in the non-lock-up state or the rotation fluctuation pattern of the rotation fluctuation amount (eddtcrx) when a misfire occurs without causing a resonance phenomenon between the engine 1 and the automatic transmission 50 while the lock-up clutch 53*f* is in the lock-up state. Hereinafter, this will be specifically described.

As shown by the rotation fluctuation pattern of the rotation fluctuation amount (eddtcrx) shown in FIG. 17A, when a misfire, for example, occurs in the second cylinder #2 (misfire determination target cylinder), the rotation fluctuation amount (eddtcrx=$\Delta N1\text{-}2$) calculated in the expansion stroke of the second cylinder #2 is particularly larger than the rotation fluctuation amount (eddtcrx=$\Delta N1\text{-}3$) calculated in the expansion stroke of the immediately preceding fourth cylinder #4 and the rotation fluctuation amount (eddtcrx=$\Delta N1\text{-}1$) calculated in the expansion stroke of the immediately following first cylinder #1. In addition to the above, the rotation fluctuation amount (eddtcrx=$\Delta N1\text{-}0$) calculated in the expansion stroke of the third cylinder #3 that has been in the expansion stroke two ignition cycles after the second cylinder #2 (misfire determination target cylinder) and the rotation fluctuation amount $\Delta N1\text{-}2$ (the rotation fluctuation amount of the second cylinder #2, which is the misfire determination target cylinder) have substantially equal absolute values and reverse in sign.

In the misfire determination device according to the present embodiment, in order to determine occurrence of a misfire by focusing on that the variation patterns of the rotation fluctuation amounts $\Delta N1\text{-}0$ to $\Delta N1\text{-}3$ exhibit patterns specific to occurrence of a misfire in the non-lock-up state, the following conditions are prestored in the ROM of the engine controller 40.

$$\Delta N1\text{-}2 \times X < |\Delta N1\text{-}0|, \text{ and} \qquad (a)$$

$$\Delta N1\text{-}2 \times Y \geqq \Delta N1\text{-}3, \text{ and} \qquad (b)$$

$$\Delta N1\text{-}2 \times Z \geqq \Delta N1\text{-}1 \qquad (c)$$

When the logical multiplication of these (a) to (c) is satisfied (that is, the variation pattern of the rotation fluctuation amounts becomes the first misfire determination pattern), it is determined that a misfire has occurred in the cylinder (second cylinder #2) of which the rotation fluctuation amount is $\Delta N1\text{-}2$. Here, the coefficients X, Y, and Z each are experimentally or empirically set as a positive value smaller than "1".

In addition, these coefficients X to Z are calculated on the basis of the engine rotational speed NE. Specifically, the coefficients X to Z are calculated as values that are smaller as the engine rotational speed NE increases. This is because the following reason.

As described above; as the engine rotational speed NE increases, the rotation fluctuation amounts $\Delta N1\text{-}0$ to $\Delta N1\text{-}3$ are calculated as smaller values accordingly. Then, by calculating the coefficients as values that are smaller as the engine rotational speed NE increases, the influence of a variation in engine rotational speed NE is removed as much as possible, and then the variation pattern of these rotation fluctuation amounts $\Delta N1\text{-}0$ to $\Delta N1\text{-}3$ may be compared with the misfire pattern.

Then, when the logical multiplication of the conditions (a) to (c) is satisfied, the variation pattern of the rotation fluctuation amounts $\Delta N1\text{-}0$ to $\Delta N1\text{-}3$ coincides with the misfire pattern in the non-lock-up state (first misfire determination pattern), and an increase in rotation fluctuation amount $\Delta N1\text{-}2$ is caused by a misfire to determine that a misfire has occurred.

The second misfire determination pattern is used for the fluctuation pattern of the 90° CA rotation duration (edt). The second misfire determination pattern corresponds to the fluctuation pattern of the 90° CA rotation duration (edt) shown in FIG. 18B. That is, the second misfire determination pattern corresponds to the fluctuation pattern of the 90° CA rotation duration (edt) when a misfire has occurred in the second cylinder #2 at the time when a resonance phenomenon is occurring between the engine 1 and the automatic transmission 50 while the lock-up clutch 53*f* is in the lock-up state. Hereinafter, this will be specifically described.

As shown by the fluctuation pattern of the 90° CA rotation duration (edt) shown in FIG. 18B, when a misfire, for example, occurs in the second cylinder #2 (misfire determination target cylinder), the 90° CA rotation duration (edt) in the expansion stroke of the second cylinder (edt) is particularly larger than the 90° CA rotation duration (edt) in the expansion stroke of the immediately preceding fourth cylinder #4 and the 90° CA rotation duration (edt) in the expansion stroke of the immediately following first cylinder #1.

In the misfire determination device according to the present embodiment, in order to determine occurrence of a misfire by focusing on that the variation patterns of the 90° CA rotation duration (edt) exhibit patterns specific to occurrence of a misfire in the lock-up state; the following conditions are prestored in the ROM of the engine controller 40.

Specifically, the second misfire determination pattern is defined as a fluctuation pattern such that the 90° CA rotation duration (edt) enters a fluctuation state that satisfies the following mathematical expressions (9) and (10).

$$NE2 \times \gamma \geq NE3 \quad (9)$$

$$NE2 \times \gamma \geq NE1 \quad (10)$$

Here, NE2 is the 90° CA rotation duration in the expansion stroke of the second cylinder #2, that is, the 90° CA rotation duration in the expansion stroke of the misfire determination target cylinder. In addition, NE3 is the 90° CA rotation duration in the expansion stroke of the fourth cylinder #4, that is, the 90° CA rotation duration in the cylinder that has been in the expansion stroke immediately before the expansion stroke of the misfire determination target cylinder. In addition, NE1 is the 90° CA rotation duration in the expansion stroke of the first cylinder #1, that is, the 90° CA rotation duration in the cylinder that has been in the expansion stroke immediately after the expansion stroke of the misfire determination target cylinder. In addition, γ is a coefficient that is set as a positive value smaller than "1", and is experimentally or empirically set.

In this way, as the second misfire determination pattern is defined, even when the rotation fluctuation pattern of the rotation fluctuation amount (eddtcrx) does not coincide with the first misfire determination pattern as shown in FIG. 18A, the second misfire determination pattern may be utilized to make a misfire determination.

In this way, in the present embodiment, both the misfire determination based on the rotation fluctuation amount (eddtcrx) calculated as a value based on a difference between the engine rotational speeds (durations required for the crankshaft 10 to rotate a predetermined crank angle) in the expansion strokes of the plurality of respective cylinders and the 90° CA rotation duration (edt) calculated as a value that does not receive the influence of the engine rotational speed in the expansion stroke of another cylinder are utilized, and, when the engine 1 is driven in a pattern that substantially coincides with at least one of the misfire determination patterns defined by these elements, it is determined that a misfire has occurred.

That is, for example, in the existing misfire determination in which a misfire determination is made on the basis of the rotation fluctuation amount (eddtcrx), a difference between the rotation fluctuation amount in the expansion stroke of the second cylinder #2, which is the misfire determination target cylinder, and the rotation fluctuation amount in the expansion stroke of the fourth cylinder #4 that has been in the expansion stroke immediately before the second cylinder #2 is small in the misfire determination pattern of the rotation fluctuation amount (eddtcrx) shown in FIG. 18A, so it is highly likely that it is determined that no misfire has occurred. In contrast, in the present embodiment, even under the above situation, only when the lock-up clutch 53f is in the lock-up state or in the flexible lock-up state, it is possible to detect a misfire on the basis of the 90° CA rotation duration (edt) in the expansion stroke of the second cylinder #2, which is the misfire determination target cylinder.

The procedure of the misfire determination process according to the third embodiment is basically similar to that of the first embodiment, so a portion of the description overlaps that of the first embodiment, and the flowchart shown in FIG. 10 used in the first embodiment is used for description. As in the case of the first embodiment, the control routine shown in FIG. 10 is repeatedly executed by the engine controller 40, for example, each revolution of the crankshaft 10 or at predetermined time intervals (for example, every several milliseconds).

Note that, as in the case of the first embodiment, the process is executed when the precondition for misfire determination (misfire detection) is satisfied. Through the determination based on the precondition, it is determined whether there is no possibility that the engine rotational speed NE excessively varies because of a factor other than occurrence of a misfire and it is possible to accurately detect a variation in engine rotational speed NE associated with occurrence of a misfire. Note that the precondition, for example, includes a condition that a predetermined period of time has elapsed since activation or deactivation of an air conditioner was switched, a condition that a predetermined period of time has elapsed since a shift lever was operated, and the like.

Then, in a state where the precondition is satisfied, a misfire temporary determination process is executed in step ST1. The misfire temporary determination process determines whether there is a possibility that a misfire has occurred in any of the cylinders. Specifically, as described above, it is determined whether the rotation fluctuation amount (eddtcrx) of the engine 1 exceeds a threshold (N1) in the expansion stroke of a cylinder, and, when the rotation fluctuation amount (eddtcrx) exceeds the threshold (N1), it is determined that there is a possibility that a misfire has occurred in the cylinder that has been in the expansion stroke (misfire determination target cylinder).

In step ST1, when it is determined that the rotation fluctuation amount (eddtcrx) does not exceed the threshold (N1) and there is no possibility that a misfire has occurred (negative determination in step ST1), the routine directly ends.

On the other hand, when it is determined that the rotation fluctuation amount (eddtcrx) exceeds the threshold (N1) and there is a possibility that a misfire has occurred (affirmative determination is made in step ST1), the process proceeds to step ST2 to set a temporary determination result flag at "1". Then, in step ST3, information regarding a misfire type and a misfire cylinder is initialized. That is, data of the misfire type and misfire cylinder determined in the previous misfire determination process are reset. In addition, in step ST4, a pattern determination timing counter is set at "0". That is, the count value of the pattern determination timing counter used in the previous misfire determination process is reset.

After that, in step ST5, a misfire type determination is executed by the first misfire determination. That is, it is determined whether the rotation fluctuation pattern of the engine 1 substantially coincides with the first misfire determination pattern (which corresponds to the rotation fluctuation pattern of the rotation fluctuation amount (eddtcrx) shown in FIG. 17A) before and after the expansion stroke of the misfire determination target cylinder, thus determining whether a misfire has occurred.

Then, when the rotation fluctuation pattern of the engine 1 substantially coincides with the first misfire determination pattern, it is determined that a misfire has occurred, and then the process proceeds to step ST8. That is, it is finally determined that a misfire has occurred in the misfire determination process of the routine.

On the other hand, when the rotation fluctuation pattern of the engine 1 does not coincide with the first misfire determination pattern (when it is not determined that a misfire has occurred in the first misfire determination), the process proceeds to step ST6 without finally determining whether a misfire has occurred or no misfire has occurred. In step ST6, it is determined whether the lock-up clutch 53f is in the lock-up state (including the flexible lock-up state) and the rotation fluctuation pattern of the engine 1 substantially coincides with the specific rotation fluctuation pattern that is specific to the lock-up state. That is, it is determined whether the 90° CA rotation duration (edt) in the expansion stroke of the misfire determination target cylinder is longer than the predetermined threshold (T) and, in the cylinder (misfire determination target cylinder) in which the rotation fluctuation amount (eddtcrx) exceeds the threshold (N1), the specific pattern that the rotation fluctuation amount (eddtcrx) exceeds the threshold (N1) has been successively occurring is observed (specific rotation fluctuation pattern when a misfire has occurred in one cylinder in a state where a resonance phenomenon is occurring between the engine 1 and the automatic transmission 50).

In addition, the specific pattern determination additionally requires a condition that no steep variation in engine load is occurring. The above condition, for example, includes a condition that a steep variation in operation amount of the accelerator pedal 18, a shift operation of the automatic transmission 50, a variation in load on auxiliary machines, or the like, are not occurring.

Then, in the specific pattern determination, when the 90° CA rotation duration (edt) in the expansion stroke of the misfire determination target cylinder is shorter than the predetermined threshold (T), or when, in the cylinder (misfire determination target cylinder) in which the rotation fluctuation amount (eddtcrx) exceeds the threshold (N1), the situation that the rotation fluctuation amount (eddtcrx) exceeds the threshold (N1) has not been successively occurring, it is finally determined that no misfire has occurred in the misfire determination process of the routine. That is, it is determined that the rotation fluctuation amount (eddtcrx) exceeds the threshold (N1) because of a factor, other than a misfire, such as running over a bad road, to finally determine that no misfire has occurred.

On the other hand, when the 90° CA rotation duration (edt) in the expansion stroke of the misfire determination target cylinder is longer than the predetermined threshold (T) and, in the cylinder (misfire determination target cylinder) in which the rotation fluctuation amount (eddtcrx) exceeds the threshold (N1), the situation that the rotation fluctuation amount (eddtcrx) exceeds the threshold (N1) has been successively occurring, and then an affirmative determination is made in step ST6, the process proceeds to step ST7. In step ST7, a second misfire determination is executed. The second misfire determination determines whether a misfire has occurred on the basis of whether the fluctuation pattern of the 90° CA rotation duration (edt) substantially coincides with the second misfire determination pattern.

Then, in the second misfire determination, when it is determined that the fluctuation pattern of the 90° CA rotation duration (edt) does not coincide with the second misfire determination pattern (which corresponds to the fluctuation pattern of the 90° CA rotation duration (edt) shown in FIG. 18B) (when a negative determination is made in step ST7), it is finally determined that no misfire has occurred in the misfire determination process of the routine. That is, it is determined that the rotation fluctuation amount (eddtcrx) exceeds the threshold (N1) because of a factor, other than a misfire, such as running over a bad road, to finally determine that no misfire has occurred.

On the other hand, in the second misfire determination, when it is determined that the fluctuation pattern of the 90° CA rotation duration (edt) substantially coincides with the second misfire determination pattern (when an affirmative determination is made in step ST7), it is finally determined that a misfire has occurred as a misfire determination, and then the process proceeds to step ST8. That is, it is finally determined that a misfire has occurred in the misfire determination process of the routine.

After it is finally determined that a misfire has occurred in step ST5 or in step ST7, the process regarding misfire type is carried out in step ST8. Specifically, the count value of the total misfire counter 41 is incremented, and the count value of a detection counter (1000 rev counter) is incremented. In this case, when the count value of the detection counter exceeds a predetermined value (for example, 1000) and the count value of the total misfire counter 41 also exceeds a predetermined value (for example, 30), it is determined that occurrence of a misfire is, detected at a frequency larger than a predetermined number of times within a total detection number of times, and it is understood that a misfire has occurred at a frequency that may possibly cause deterioration of exhaust emission, degradation of the catalyst 12, and the like. Thus, the MIL (warning lamp) lights up to warn the driver. In addition, a misfire cylinder is identified in step ST9, and the count value of the cylinder-by-cylinder misfire counter 42 corresponding to that cylinder is incremented. Then, the misfire occurrence information and the misfire occurrence cylinder information are written into a diagnosis provided for the engine controller 40.

As described above, according to the present embodiment, the following advantageous effects may be obtained. When the rotation fluctuation pattern of the engine 1 coincides with the first misfire determination pattern, it is determined that a misfire has occurred in the non-lock-up state of the lock-up clutch 53f or a misfire has occurred in the state where no resonance phenomenon is occurring. On the other hand, when the rotation fluctuation pattern of the engine 1 does not coincide with the first misfire determination pattern, a misfire determination is executed on the basis of the second misfire determination pattern under the condition that the 90° CA rotation duration in the expansion stroke of the misfire determination target cylinder exceeds a predetermined value, or the like. When the variation pattern of the 90° CA rotation duration coincides with the second misfire determination pattern, it is determined that a misfire has occurred in a state where a resonance phenomenon is occurring.

As a result, in the lock-up state of the lock-up clutch 53f, when a resonance phenomenon is occurring between the engine 1 and the automatic transmission 50, in the existing art, it is highly likely that occurrence of a misfire cannot be detected even when the misfire has occurred because it is difficult to accurately detect a rotational speed in the expansion stroke of another cylinder due to the influence of the resonance. However, according to the third embodiment, because a misfire determination that removes the influence of the rotational speed in the expansion stroke of another cylinder is executed, it is possible to accurately detect occurrence of a misfire without receiving the adverse influence of the resonance phenomenon. In this way, occurrence of a misfire is accurately determined without receiving an adverse influence of the resonance phenomenon, so it is possible to improve reliability of misfire determination.

In the third embodiment, when the rotation fluctuation amount (eddtcrx) exceeds the predetermined threshold (N1), it is determined that there is a possibility that a misfire has occurred, and the rotation fluctuation amount (eddtcrx) is calculated by the mathematical expression (8). In the present alternative embodiment, instead of the above configuration, the following new rotation fluctuation amount (edltmfh: hereinafter, referred to as second rotation fluctuation amount that is employed in the first embodiment) is calculated, and, when the above rotation fluctuation amount (edltmfh) exceeds the threshold (N1), it is determined that there is a possibility that a misfire has occurred. The second rotation fluctuation amount (edltmfh) for determining whether there is a possibility that a misfire has occurred is different from that of the third embodiment, and the other configuration and misfire determination are substantially similar to those of the third embodiment, so only calculation of the second rotation fluctuation amount (edltmfh) will be described here.

The operation of calculating the second rotation fluctuation amount (edltmfh) first calculates a difference between the expansion stroke duration of a current cylinder that is currently in the expansion stroke and the expansion stroke duration of a cylinder that has been in the expansion stroke two ignition cycles before the current cylinder (360° CA before in ignition timing) (value obtained by subtracting the latter expansion stroke duration from the former expansion stroke duration). Then, the second rotation fluctuation amount (edltmfh) is calculated as described below. An average value of a difference between the expansion stroke duration of the one-ignition-cycle-before cylinder that has been in the expansion stroke immediately before the current cylinder (180° CA before in ignition timing) and the expansion stroke duration of a three-ignition-cycle-before cylinder that has been in the expansion stroke two ignition cycles before the one-ignition-cycle-before cylinder (three ignition cycles before the current cylinder (540° CA before in ignition timing)) (value obtained by subtracting the latter expansion stroke duration from the former expansion stroke duration) and a difference between the expansion stroke duration of the two-ignition-cycle-before cylinder that has been in the expansion stroke two ignition cycles before the current cylinder (360° CA before in ignition timing) and the expansion stroke duration of the four-ignition-cycle-before cylinder that has been in the expansion stroke two ignition cycles before the two-ignition-cycle-before cylinder (four ignition cycles before the current cylinder (720° CA before in ignition timing)) (value obtained by subtracting the latter expansion stroke duration from the former expansion stroke duration) is calculated. Then, a difference between the expansion stroke duration of the current cylinder and the expansion stroke duration of the two-ignition-cycle-before cylinder is subtracted from the above average value to obtain the second rotation fluctuation amount (edltmfh).

When applied to FIG. 6, the second rotation fluctuation amount (edltmfh) is calculated by the following mathematical expression (2) used in the first embodiment.

$$edltmfh = (A-C) - \{(B-D)+(C-E)\}/2 \qquad (2)$$

In this way, even when the second rotation fluctuation amount (edltmfh) is calculated, and it is determined that there is a possibility that a misfire has occurred when the second rotation fluctuation amount (edltmfh) exceeds the threshold (N1), it is possible to accurately determine whether there is a possibility that a misfire has occurred in the engine 1.

The above described embodiments may be modified into the following alternative embodiments.

In the above embodiments and alternative embodiments, the aspect of the invention is applied to a four-cylinder gasoline engine for an automobile; however, the aspect of the invention is not limited to this configuration. The aspect of the invention may be applied to various engines (for example, a six-cylinder gasoline engine other than the four-cylinder gasoline engine, a diesel engine, an engine mounted on a vehicle other than automobiles, or the like).

In the above embodiments and alternative embodiments, the predetermined value N1 is calculated on the basis of the engine rotational speed NE and the intake pipe pressure PM; however, it is not limited. For example, the predetermined value N1 may be calculated on the basis of any one of the engine rotational speed NE and the intake pipe pressure PM or may be calculated on the basis of another parameter. In addition, in a system that detects the amount of intake air, instead of the intake pipe pressure PM, the amount of intake air may be, of course, used as a substitute. On the other hand, the predetermined value N1 may be set as a constant value. In short, as long as the predetermined value N1 may be used to desirably monitor a variation in the rotation fluctuation amount ΔNE in accordance with occurrence of a misfire, the predetermined value N1 may be calculated or set in any way.

In the above embodiments and alternative embodiments, the coefficients X to Z and A to F are calculated on the basis of the engine rotational speed NE; however, it is not limited. For example, the coefficients X to Z and A to F may be calculated on the basis of the intake pipe pressure PM or the amount of intake air or may be calculated on the basis of another parameter. In addition, the coefficients X to Z and A to F may be set as constant values. In short, as long as the misfire determination pattern may be set as an appropriate pattern, the coefficients X to Z and A to F may be calculated or set in any way.

In the above embodiments, the total detection number of times is counted by the detection counter (1000 rev counter) and the number of times occurrence of a misfire is detected is counted by the misfire counter (the total misfire counter 41 and the cylinder-by-cylinder misfire counter 42) to calculate the frequency at which occurrence of a misfire is detected; however, a method of calculating the frequency may be selected. In the above embodiments, the rotation fluctuation amount is calculated by the above described mathematical expression; however, it is not limited. In short, as long as a mode allows grasping a variation in the engine rotational speed in accordance with occurrence of a misfire, the mode for calculating the rotation fluctuation amount may be appropriately changed.

In addition, in the embodiments, the aspect of the invention is applied to the engine 1 to which the stepped automatic transmission 50 is coupled; instead, the aspect of the invention may be applied to the engine 1 to which a stepless transmission, such as a belt-type continuously variable transmission (CVT) and a troidal CVT, is coupled.

What is claimed is:

1. A misfire determination device for an internal combustion engine that is coupled to a transmission via a hydraulic power transmission equipped with a lock-up clutch, wherein the misfire determination device determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire, the misfire determination device comprising:

a first misfire determination unit that makes a first misfire determination in which a misfire determination is made on the basis of whether, when the lock-up clutch is in a non-lock-up state, the rotation fluctuation pattern of the internal combustion engine substantially coincides with a first rotation fluctuation pattern specific to occurrence of a misfire in the non-lock-up state; and a second misfire determination unit that makes a second misfire determination in which occurrence of a misfire is determined on the basis of whether, when the lock-up clutch is in a lock-up state, the rotation fluctuation pattern of the internal combustion engine substantially coincides with a second rotation fluctuation pattern specific to occurrence of a misfire in the lock-up state.

2. The misfire determination device according to claim 1, further comprising:
a specific rotation fluctuation pattern determination unit that makes a specific rotation fluctuation pattern determination as to whether the rotation fluctuation pattern of the internal combustion engine in the lock-up state substantially coincides with a specific rotation fluctuation pattern that is specific to occurrence of a misfire, wherein
when it is determined that the rotation fluctuation pattern of the internal combustion engine substantially coincides with the specific rotation fluctuation pattern in the specific pattern determination made by the specific rotation fluctuation pattern determination unit, a misfire determination is executed by the second misfire determination unit.

3. The misfire determination device according to claim 2, wherein
when it is determined that a misfire has occurred in the first misfire determination or when it is determined that a misfire has occurred in the second misfire determination, it is finally determined that a misfire has occurred as a misfire determination result, whereas, when it is determined that the rotation fluctuation pattern of the internal combustion engine does not coincide with the specific rotation fluctuation pattern in the specific pattern determination or when it is determined that no misfire has occurred in the second misfire determination, it is finally determined that no misfire has occurred as a misfire determination result.

4. The misfire determination device according to claim 2, wherein
when it is determined that there is a possibility that a misfire has occurred because the rotation fluctuation amount of the internal combustion engine exceeds the predetermined threshold, the first misfire determination unit makes a misfire determination by comparing a variation pattern of a rotation fluctuation amount in an expansion stroke of a misfire determination target cylinder, a variation pattern of a rotation fluctuation amount in an expansion stroke of a cylinder that is in the expansion stroke immediately before the expansion stroke of the misfire determination target cylinder and a variation pattern of a rotation fluctuation amount in an expansion stroke of a cylinder that is in the expansion stroke immediately after the expansion stroke of the misfire determination target cylinder with the first rotation fluctuation pattern.

5. The misfire determination device according to claim 2, wherein
when the lock-up clutch is in the lock-up state and when it is determined that there is a possibility that a misfire has occurred because the rotation fluctuation amount of the internal combustion engine exceeds the predetermined threshold and then it is not determined that a misfire has occurred in the first misfire determination, the specific rotation fluctuation pattern determination unit makes a misfire determination by comparing a variation pattern of a rotation fluctuation amount in an expansion stroke of a misfire determination target cylinder and a variation pattern of a rotation fluctuation amount in an expansion stroke of a cylinder that is in the expansion stroke immediately after the expansion stroke of the misfire determination target cylinder with the specific rotation fluctuation pattern.

6. The misfire determination device according to claim 2, wherein
when the lock-up clutch is in the lock-up state and when it is determined that there is a possibility that a misfire has occurred because the rotation fluctuation amount of the internal combustion engine exceeds the predetermined threshold and then it is determined that the rotation fluctuation pattern of the internal combustion engine substantially coincides with the specific rotation fluctuation pattern in the specific pattern determination, the second misfire determination unit makes a misfire determination by comparing a variation pattern of a rotation fluctuation amount in an expansion stroke of a misfire determination target cylinder and a variation pattern of a rotation fluctuation amount in an expansion stroke of a cylinder that is in the expansion stroke immediately before the expansion stroke of the misfire determination target cylinder with the second rotation fluctuation pattern.

7. The misfire determination device according to claim 2, wherein
the specific rotation fluctuation pattern is defined as a pattern such that a rotation fluctuation amount in an expansion stroke of a misfire determination target cylinder is larger by a predetermined amount or more than a rotation fluctuation amount in an expansion stroke of a one-ignition-cycle-after cylinder that is in the expansion stroke immediately after the expansion stroke of the misfire determination target cylinder, and the second rotation fluctuation pattern is defined as a pattern such that a difference between a rotation fluctuation amount in an expansion stroke of a one-ignition-cycle-before cylinder that is in the expansion stroke immediately before the expansion stroke of the misfire determination target cylinder and the rotation fluctuation amount in the expansion stroke of the misfire determination target cylinder is smaller than or equal to a predetermined amount.

8. The misfire determination device according to claim 1, wherein
the second rotation fluctuation pattern is smaller in variation of a rotation fluctuation than the first rotation fluctuation pattern.

9. The misfire determination device according to claim 8, wherein
in a state where the lock-up clutch is in the lock-up state and only when a speed ratio of the transmission is set in a specific speed ratio at which there is a possibility that a resonance occurs between the internal combustion engine and the transmission, the second misfire determination unit makes a misfire determination on the basis of the second rotation fluctuation pattern.

10. The misfire determination device according to claim 8, wherein
in a state where the lock-up clutch is in the lock-up state, when it is determined that there is a possibility that a misfire has occurred because the rotation fluctuation amount of the internal combustion engine exceeds the predetermined threshold and when a rotation fluctuation amount of a cylinder, for which it is determined that there is a possibility that a misfire has occurred, has exceeded the predetermined threshold in a previous combustion stroke, the second misfire determination unit makes a misfire determination on that cylinder on the basis of the second rotation fluctuation pattern.

11. The misfire determination device according to claim 8, wherein in a state where the lock-up clutch is in the lock-up state, when it is determined that there is a possibility that a misfire has occurred because the rotation fluctuation amount of the internal combustion engine exceeds the predetermined threshold, the second misfire determination unit makes a misfire determination by comparing a variation pattern of a rotation fluctuation amount in an expansion stroke of a misfire determination target cylinder, a variation pattern of a rotation fluctuation amount in an expansion stroke of a cylinder that is in the expansion stroke immediately before the expansion stroke of the misfire determination target cylinder and a variation pattern of a rotation fluctuation amount in an expansion stroke of a cylinder that is in the expansion stroke immediately after the expansion stroke of the misfire determination target cylinder with the second rotation fluctuation pattern.

12. The misfire determination device according to claim 8, wherein the first rotation fluctuation pattern is defined as a pattern such that a rotation fluctuation amount in an expansion stroke of a misfire determination target cylinder is larger by a predetermined amount or more than a rotation fluctuation amount in an expansion stroke of a one-ignition-cycle-before cylinder that is in the expansion stroke immediately before the expansion stroke of the misfire determination target cylinder and a rotation fluctuation amount in an expansion stroke of a one-ignition-cycle-after cylinder that is in the expansion stroke immediately after the expansion stroke of the misfire determination target cylinder, and a rotation fluctuation amount in an expansion stroke of a two-ignition-cycle-after cylinder that is in the expansion stroke further immediately after the expansion stroke of the one-ignition-cycle-after cylinder and the rotation fluctuation amount in the expansion stroke of the misfire determination target cylinder have substantially equal absolute values and reverse in sign, and the second rotation fluctuation pattern is defined as a pattern such that the rotation fluctuation amount in the expansion stroke of the misfire determination target cylinder is larger by a predetermined amount or more than the rotation fluctuation amount in the expansion stroke of the one-ignition-cycle-before cylinder, a difference between the rotation fluctuation amount in the expansion stroke of the one-ignition-cycle-after cylinder and the rotation fluctuation amount in the expansion stroke of the misfire determination target cylinder is smaller than or equal to a predetermined amount, and the rotation fluctuation amount in the expansion stroke of the two-ignition-cycle-after cylinder and the rotation fluctuation amount in the expansion stroke of the misfire determination target cylinder have substantially equal absolute values and reverse in sign.

13. The misfire determination device according to claim 8, wherein the first rotation fluctuation pattern is defined as a pattern such that a rotation fluctuation amount in an expansion stroke of a misfire determination target cylinder is larger by a predetermined amount or more than a rotation fluctuation amount in an expansion stroke of a one-ignition-cycle-before cylinder that is in the expansion stroke immediately before the expansion stroke of the misfire determination target cylinder and a rotation fluctuation amount in an expansion stroke of a one-ignition-cycle-after cylinder that is in the expansion stroke immediately after the expansion stroke of the misfire determination target cylinder, and a rotation fluctuation amount in an expansion stroke of a two-ignition-cycle-after cylinder that is in the expansion stroke further immediately after the expansion stroke of the one-ignition-cycle-after cylinder and the rotation fluctuation amount in the expansion stroke of the misfire determination target cylinder have substantially equal absolute values and reverse in sign, and the second rotation fluctuation pattern is defined as a pattern such that a difference between the rotation fluctuation amount in the expansion stroke of the one-ignition-cycle-before cylinder and the rotation fluctuation amount in the expansion stroke of the misfire determination target cylinder is smaller than or equal to a predetermined amount, the rotation fluctuation amount in the expansion stroke of the misfire determination target cylinder is larger by a predetermined amount or more than the rotation fluctuation amount in the expansion stroke of the one-ignition-cycle-after cylinder, and the rotation fluctuation amount in the expansion stroke of the two-ignition-cycle-after cylinder and the rotation fluctuation amount in the expansion stroke of the misfire determination target cylinder have substantially equal absolute values and reverse in sign.

14. The misfire determination device according to claim 8, wherein the first rotation fluctuation pattern is defined as a pattern such that a rotation fluctuation amount in an expansion stroke of a misfire determination target cylinder is larger by a predetermined amount or more than a rotation fluctuation amount in an expansion stroke of a one-ignition-cycle-before cylinder that is in the expansion stroke immediately before the expansion stroke of the misfire determination target cylinder and a rotation fluctuation amount in an expansion stroke of a one-ignition-cycle-after cylinder that is in the expansion stroke immediately after the expansion stroke of the misfire determination target cylinder, and a rotation fluctuation amount in an expansion stroke of a two-ignition-cycle-after cylinder that is in the expansion stroke further immediately after the expansion stroke of the one-ignition-cycle-after cylinder and the rotation fluctuation amount in the expansion stroke of the misfire determination target cylinder have substantially equal absolute values and reverse in sign, and the second rotation fluctuation pattern is defined as a pattern such that the rotation fluctuation amount in the expansion stroke of the one-ignition-cycle-before cylinder is larger by a predetermined amount or more than the rotation fluctuation amount in the expansion stroke of the misfire determination target cylinder, the rotation fluctuation amount in the expansion stroke of the misfire determination target cylinder is larger by a predetermined amount or more than the rotation fluctuation amount in the expansion stroke of the one-ignition-cycle-after cylinder, and the rotation fluctuation amount in the expansion stroke of the two-ignition-cycle-after cylinder and the rotation fluctuation amount in the expansion stroke of the misfire determination target cylinder have substantially equal absolute values and reverse in sign.

15. The misfire determination device according to claim 8, wherein the first rotation fluctuation pattern is defined as a pattern such that a rotation fluctuation amount in an expansion stroke of a misfire determination target cylinder is larger by a predetermined amount or more than a rotation fluctuation amount in an expansion stroke of a one-ignition-cycle-before cylinder that is in the expansion stroke immediately before the expansion stroke of the misfire determination target cylinder and a rotation fluctuation amount in an expansion stroke of a one-ignition-cycle-after cylinder that is in the expansion stroke immediately after the expansion stroke of the misfire determination target cylinder, and a rotation fluctuation amount in an expansion stroke of a two-ignition-cycle-after cylinder that is in the expansion stroke further immediately after the expansion stroke of the one-ignition-cycle-after cylinder and the rotation fluctuation amount in the expansion stroke of the misfire determination target cylinder have substantially equal absolute values and reverse in sign, and the second rotation fluctuation pattern is defined as a pattern such that the rotation fluctuation amount in the expansion stroke of the misfire determination target cylinder is larger by a predetermined amount or more than the rotation fluctuation amount in the expansion stroke of the one-ignition-cycle-before cylinder, the rotation fluctuation amount in the expansion stroke of the one-ignition-cycle-after cylinder is larger by a predetermined amount or more than the rotation fluctuation amount in the expansion stroke of the misfire determination target cylinder, and the rotation fluctuation amount in the expansion stroke of the two-ignition-cycle-after cylinder and the rotation fluctuation amount in the expansion stroke of the misfire determination target cylinder have substantially equal absolute values and reverse in sign.

16. A misfire determination device for an internal combustion engine that is coupled to a transmission via a hydraulic power transmission equipped with a lock-up clutch, wherein the misfire determination device determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire, the misfire determination device comprising:

a first misfire determination unit that calculates a rotation fluctuation amount from a difference between an engine rotational speed in an expansion stroke of a misfire determination target cylinder for which it is determined that there is a possibility that the misfire has occurred and an engine rotational speed in an expansion stroke of another cylinder, and then makes a first misfire determination in which occurrence of a misfire is determined on the basis of whether a variation pattern of the rotation fluctuation amount substantially coincides with a predetermined misfire determination pattern;

an engine rotational speed determination unit that, when it is not determined that a misfire has occurred in the first misfire determination made by the first misfire determination unit, makes an engine rotational speed determination in which it is determined whether an engine rotational speed in the expansion stroke of the misfire determination target cylinder when the lock-up clutch is in the lock-up state is lower than a predetermined threshold; and a second misfire determination unit that, when it is determined in the engine rotational speed determination made by the engine rotational speed determination unit that the engine rotational speed in the expansion stroke of the misfire determination target cylinder is lower than the predetermined threshold, makes a second misfire determination in which it is determined whether a misfire has occurred on the basis of the difference between the engine rotational speed in the expansion stroke of the misfire determination target cylinder and the engine rotational speed in the expansion stroke of the another cylinder.

17. The misfire determination device according to claim 16, wherein when it is determined that a misfire has occurred in the first misfire determination or when it is determined that a misfire has occurred in the second misfire determination, it is finally determined that a misfire has occurred as a misfire determination result, whereas, when it is determined in the engine rotational speed determination that the engine rotational speed in the expansion stroke of the misfire determination target cylinder is not lower than the threshold or when it is determined in the second misfire determination that no misfire has occurred, it is finally determined that no misfire has occurred as a misfire determination result.

18. The misfire determination device according to claim 16, wherein when it is determined that there is a possibility that a misfire has occurred because the rotation fluctuation amount of the internal combustion engine exceeds the predetermined threshold, the first misfire determination unit makes a misfire determination by comparing a variation pattern of a rotation fluctuation amount in an expansion stroke of a misfire determination target cylinder, a variation pattern of a rotation fluctuation amount in an expansion stroke of a cylinder that is in the expansion stroke immediately before the expansion stroke of the misfire determination target cylinder and a variation pattern of a rotation fluctuation amount in an expansion stroke of a cylinder that is in the expansion stroke immediately after the expansion stroke of the misfire determination target cylinder with the misfire determination pattern.

19. The misfire determination device according to claim 16, wherein when the lock-up clutch is in the lock-up state and when it is determined that there is a possibility that a misfire has occurred because the rotation fluctuation amount of the internal combustion engine exceeds the predetermined threshold and then it is not determined that a misfire has occurred in the first misfire determination, the engine rotational speed determination unit determines whether the engine rotational speed in the expansion stroke of the misfire determination target cylinder is lower than a predetermined threshold and whether a situation that the rotation fluctuation amount in the expansion stroke of the misfire determination target cylinder exceeds the predetermined threshold successively occurs.

20. The misfire determination device according to claim 16, wherein when the lock-up clutch is in the lock-up state and when it is determined that there is a possibility that a misfire has occurred because the rotation fluctuation amount of the internal combustion engine exceeds the predetermined threshold and then it is not determined that a misfire has occurred in the first misfire determination, the engine rotational speed determination device determines whether an engine rotational speed in an expansion stroke of a misfire determination target cylinder is lower than a predetermined threshold and whether a situation that the engine rotational speed in the expansion stroke of the misfire determination target cylinder is lower than the predetermined threshold successively occurs.

21. The misfire determination device according to claim 16, wherein:
when the lock-up clutch is in the lock-up state and when it is determined that there is a possibility that a misfire has occurred because the rotation fluctuation amount of the internal combustion engine exceeds the predetermined threshold and then it is determined in the engine rotational speed determination that there is a possibility that a misfire has occurred, the second misfire determination unit determines whether an engine rotational speed in an expansion stroke of a misfire determination target cylinder is lower by a predetermined amount or more than an engine rotational speed in an expansion stroke of a cylinder that is in an expansion stroke immediately before the expansion stroke of the misfire determination target cylinder and an engine rotational speed in an expansion stroke of a cylinder that is in the expansion stroke immediately after the expansion stroke of the misfire determination target cylinder, and, when the engine rotational speed in the expansion stroke of the misfire determination target cylinder is lower by the predetermined amount or more, it is determined that a misfire has occurred.

22. A misfire determination method for an internal combustion engine that is coupled to a transmission via a hydraulic power transmission equipped with a lock-up clutch, wherein the misfire determination method determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire, the misfire determination method comprising:
making a first misfire determination in which a misfire determination is made on the basis of whether, when the lock-up clutch is in a non-lock-up state, the rotation fluctuation pattern of the internal combustion engine substantially coincides with a first rotation fluctuation pattern specific to occurrence of a misfire in the non-lock-up state; and
making a second misfire determination in which a misfire determination is made on the basis of whether, when the lock-up clutch is in a lock-up state, the rotation fluctuation pattern of the internal combustion engine substantially coincides with a second rotation fluctuation pattern specific to occurrence of a misfire in the lock-up state.

23. The misfire determination method according to claim 22, further comprising:
making a specific pattern determination as to whether the rotation fluctuation pattern of the internal combustion engine in the lock-up state substantially coincides with a specific rotation fluctuation pattern that is specific to occurrence of a misfire; and
when it is determined that the rotation fluctuation pattern of the internal combustion engine substantially coincides with the specific rotation fluctuation pattern in the specific pattern determination made by the specific rotation fluctuation pattern determination unit, executing a misfire determination on the basis of whether the rotation fluctuation pattern of the internal combustion engine substantially coincides with the second rotation fluctuation pattern.

24. The misfire determination method according to claim 22, wherein
the second rotation fluctuation pattern is smaller in variation of a rotation fluctuation than the first rotation fluctuation pattern.

25. A misfire determination method for an internal combustion engine that is coupled to a transmission via a hydraulic power transmission equipped with a lock-up clutch, wherein the misfire determination method determines that there is a possibility that a misfire has occurred when a rotation fluctuation amount of the internal combustion engine exceeds a predetermined threshold, and makes a misfire determination by determining whether a rotation fluctuation pattern of the internal combustion engine is a pattern specific to occurrence of a misfire, the misfire determination method comprising:
calculating a rotation fluctuation amount from a difference between an engine rotational speed in an expansion stroke of a misfire determination target cylinder for which it is determined that there is a possibility that the misfire has occurred and an engine rotational speed in an expansion stroke of another cylinder, and then making a first misfire determination in which occurrence of a misfire is determined on the basis of whether a variation pattern of the rotation fluctuation amount substantially coincides with a predetermined misfire determination pattern;
when it is not determined that a misfire has occurred in the first misfire determination, making an engine rotational speed determination in which it is determined whether an engine rotational speed in the expansion stroke of the misfire determination target cylinder when the lock-up clutch is in the lock-up state is lower than a predetermined threshold; and
when it is determined in the engine rotational speed determination that the engine rotational speed in the expansion stroke of the misfire determination target cylinder is lower than the predetermined threshold, making a second misfire determination in which it is determined whether a misfire has occurred on the basis of the difference between the engine rotational speed in the expansion stroke of the misfire determination target cylinder and the engine rotational speed in the expansion stroke of the another cylinder.

* * * * *

UNITED STATES PATENT AND TRADEMARK OFFICE
CERTIFICATE OF CORRECTION

PATENT NO. : 8,281,650 B2
APPLICATION NO. : 12/500018
DATED : October 9, 2012
INVENTOR(S) : Kiyotaka Kushihama et al.

It is certified that error appears in the above-identified patent and that said Letters Patent is hereby corrected as shown below:

In the Specification

Col. 30, line 23: replace "$\Delta NE$" with --$\Delta NE1$--;

Col. 36, line 48: remove "," after "so";

Col. 37, line 13: replace "threshold (N)" with --threshold (N1)--.

Signed and Sealed this
Fifteenth Day of October, 2013

Teresa Stanek Rea
*Deputy Director of the United States Patent and Trademark Office*